United States Patent
Curry et al.

(10) Patent No.: US 7,379,587 B2
(45) Date of Patent: May 27, 2008

(54) SYSTEMS AND METHODS FOR IDENTIFYING REGIONS WITHIN AN IMAGE HAVING SIMILAR CONTINUITY VALUES

(75) Inventors: Donald J. Curry, San Mateo, CA (US); Asghar Nafarieh, Menlo Park, CA (US); Doron Kletter, Menlo Park, CA (US)

(73) Assignee: Xerox Corporation, Norwalk, CT (US)

( * ) Notice: Subject to any disclaimer, the term of this patent is extended or adjusted under 35 U.S.C. 154(b) by 715 days.

(21) Appl. No.: 10/776,515

(22) Filed: Feb. 12, 2004

(65) Prior Publication Data

US 2005/0180628 A1  Aug. 18, 2005

(51) Int. Cl.
G06K 9/00 (2006.01)
G06K 9/34 (2006.01)
G06K 9/36 (2006.01)

(52) U.S. Cl. .................. 382/164; 382/232; 382/302

(58) Field of Classification Search ............. 382/165, 382/164

See application file for complete search history.

(56) References Cited

U.S. PATENT DOCUMENTS

| | | | |
|---|---|---|---|
| 4,849,914 A | 7/1989 | Medioni et al. | |
| 5,311,328 A * | 5/1994 | Murata | 358/447 |
| 5,392,139 A * | 2/1995 | Murata | 358/529 |
| 5,477,346 A * | 12/1995 | Murata | 358/529 |
| 5,515,452 A | 5/1996 | Penkethman et al. | |
| 5,583,659 A | 12/1996 | Lee et al. | |
| 5,745,596 A | 4/1998 | Jefferson | |
| 5,832,112 A * | 11/1998 | Funada et al. | 382/181 |
| 5,900,953 A | 5/1999 | Bottou et al. | |
| 6,058,214 A | 5/2000 | Bottou et al. | |
| 6,324,305 B1 | 11/2001 | Holladay et al. | |
| 6,343,154 B1 | 1/2002 | Bottou et al. | |
| 6,400,844 B1 | 6/2002 | Fan et al. | |
| 6,633,670 B1 | 10/2003 | Matthews | |
| 7,171,047 B2 * | 1/2007 | Grinchuk et al. | 382/199 |
| 2003/0095698 A1 * | 5/2003 | Kawano | 382/132 |
| 2003/0189579 A1 * | 10/2003 | Pope | 345/660 |
| 2004/0001632 A1 * | 1/2004 | Adachi | 382/224 |
| 2004/0008901 A1 * | 1/2004 | Avinash | 382/260 |
| 2004/0081355 A1 * | 4/2004 | Takahashi | 382/165 |
| 2004/0114815 A1 * | 6/2004 | Shibaki et al. | 382/233 |
| 2004/0165785 A1 * | 8/2004 | Monobe et al. | 382/268 |

(Continued)

FOREIGN PATENT DOCUMENTS

| | | |
|---|---|---|
| EP | 0 712 094 A2 | 5/1996 |
| EP | 1 006 716 A2 | 6/2000 |

OTHER PUBLICATIONS

R. De Queiroz, "Compression of Compound Documents," *IEEE*, Oct. 1999, pp. 209-213.

(Continued)

*Primary Examiner*—Jingge Wu
*Assistant Examiner*—Max Shikhman
(74) *Attorney, Agent, or Firm*—Oliff & Berridge, PLC

(57) ABSTRACT

A blob identifier uses edge continuity signal to analyze how to combine the current pixel into an existing blob or into the background image, or start a new blob. The blob identifier outputs a list of blob identifiers on a line-by-line basis.

16 Claims, 28 Drawing Sheets

U.S. PATENT DOCUMENTS

2004/0175037 A1* 9/2004 Guleryuz .................. 382/180
2004/0179738 A1* 9/2004 Dai et al. .................. 382/218

OTHER PUBLICATIONS

U.S. Appl. No. 10/187,499, filed Jul. 1, 2002, Curry et al.
U.S. Appl. No. 10/188,026, filed Jul. 1, 2002, Curry et al.
U.S. Appl. No. 10/188,249, filed Jul. 1, 2002, Curry et al.
U.S. Appl. No. 10/188,277, filed Jul. 1, 2002, Curry et al.
U.S. Appl. No. 10/188,157, filed Jul. 1, 2002, Curry et al.
U.S. Appl. No. 10/612,250, filed Jul. 1, 2003, Curry et al.
U.S. Appl. No. 10/612,057, filed Jul. 1, 2003, Curry et al.
U.S. Appl. No. 10/612,234, filed Jul. 1, 2003, Curry et al.
U.S. Appl. No. 10/612,461, filed Jul. 1, 2003, Curry et al.
U.S. Appl. No. 10/612,062, filed Jul. 1, 2003, Curry et al.
U.S. Appl. No. 10/612,261, filed Jul. 1, 2003, Curry et al.
U.S. Appl. No. 10/612,246, filed Jul. 1, 2003, Curry et al.
U.S. Appl. No. 10/612,368, filed Jul. 1, 2003, Curry et al.
U.S. Appl. No. 10/612,248, filed Jul. 1, 2003, Curry et al.
U.S. Appl. No. 10/612,063, filed Jul. 1, 2003, Curry et al.
U.S. Appl. No. 10/612,064, filed Jul. 1, 2003, Curry et al.
U.S. Appl. No. 10/612,084, filed Jul. 1, 2003, Curry et al.
U.S. Appl. No. 10/776,612, filed Feb. 12, 2004, Curry et al.
U.S. Appl. No. 10/776,514, filed Feb. 12, 2004, Curry et al.
U.S. Appl. No. 10/776,608, filed Feb. 12, 2004, Curry et al.
U.S. Appl. No. 10/776,602, filed Feb. 12, 2004, Curry et al.
U.S. Appl. No. 10/776,620, filed Feb. 12, 2004, Curry et al.
U.S. Appl. No. 10/776,603, filed Feb. 12, 2004, Curry et al.
U.S. Appl. No. 10/776,509, filed Feb. 12, 2004, Claassen et al.
U.S. Appl. No. 10/776,508, filed Feb. 12, 2004, Curry et al.
U.S. Appl. No. 10/776,516, filed Feb. 12, 2004, Curry et al.

* cited by examiner

SYSTEMS AND METHODS FOR IDENTIFYING REGIONS WITHIN AN IMAGE HAVING SIMILAR CONTINUITY VALUES

This invention is related to U.S. patent applications Ser. Nos. 10/776,612, 10/776,514, 10/776,608, 10/776,602, 10/776,603, 10/776,620, 10/776,509, 10/776,508 and 10/776,517, filed on an even date herewith and incorporated by reference in their entireties.

BACKGROUND OF THE INVENTION

1. Field of Invention

This invention is directed to analyzing an image to identify regions within the image that have similar continuity values.

2. Related Art

Documents scanned at high resolutions typically require very large amounts of storage space. Furthermore, a large volume of image data requires substantially more time and bandwidth to move around, such as over a local or wide area network, over an intranet, an extranet or the Internet, or other distributed networks.

Documents, upon being scanned using a scanner or the like, are typically defined using an RGB color space, e.g., in raw RGB format. However, rather than being stored in this raw scanned RGB format, the document image data is typically subjected to some form of data compression to reduce its volume, thus avoiding the high costs of storing such scanned RGB document image data.

Run-length compression schemes, such as Lempel-Ziv (LZ), do not perform particularly well on scanned image data or, in general, image data having high spatial frequencies. In contrast, while lossy methods, such as JPEG, work fairly well on continuous tone and other high spatial frequency image data, lossy methods generally do not work particularly well on text and/or line art image data, or, in general, lower spatial frequency image data.

One approach to satisfying the compression needs of data, such as the different types of image data described above, has been to use an encoder pipeline that uses a mixed raster content (MRC) format to describe the data. The image data, such as for example, image data defining a composite image having text intermingled with color and/or grayscale information, is segmented into two or more planes. These planes are generally referred to as the background plane and the foreground planes. A selector plane is generated to indicate, for each pixel in the composite image, which of the image planes contains the actual image data that should be used to reconstruct the final output image. Segmenting the image data into planes in this manner tends to improve the overall compression of the image, because the data can be arranged into different planes such that each of the planes are smoother and more compressible than is the original image data. Segmentation also allows different compression methods to be applied to the different planes. Thus, the most appropriate compression technique for the type of data in each plane can be applied to compress the data of that plane.

SUMMARY OF THE DISCLOSURE

Unfortunately, some image document formats, such as the portable document format (PDF), do not fully support such three-layer mixed raster content decompositions of an original document. As a result, when attempting to print or otherwise render a document that has been compressed and stored as a mixed raster content image data file using such image document formats, the document either cannot be rendered at all, or contains objectionable artifacts upon rendering.

This invention provides systems and methods for analyzing image data to identify regions having similar image characteristics.

This invention separately provides systems and methods for identifying regions having similar edge polarity or continuity.

This invention separately provides systems and methods for identifying regions having similar characteristics based on edge polarity and/or continuity of pixels adjacent to an edge of the region.

This invention separately provides systems and methods for identifying regions bounded by a closed curve that has a constant edge polarity over its perimeter.

This invention separately provides systems and methods for identifying regions within a scan line of the image data that have similar edge polarity and/or continuity values to pixels appearing in adjacent locations within the scan line and within an immediately preceding scan line.

This invention separately provides systems and methods for identifying the regions within a scan line that potentially belong to a single region or blob within the image based on identification values associated with adjacent portions of the image data in the current and an immediately preceding scan line.

This invention separately provides systems and methods for determining how to treat a current pixel of a current scan line based on edge continuity values of adjacent pixels within the current scan line and adjacent pixels within an immediately preceding scan line.

This invention separately provides systems and methods for a comparator that compares an edge continuity value of a pixel of each line to edge continuity values of pixels within a neighborhood of the pixel to generate compare results, and an assigner that assigns a blob identification of a blob to the pixel based on the compare results to associate the pixel with the blob.

These and other features and advantages of various exemplary embodiments of systems and methods according to this invention are described in, or are apparent from, the following detailed description of various exemplary embodiments of the systems and methods according to this invention.

BRIEF DESCRIPTION OF DRAWINGS

Various exemplary embodiments of systems and methods of this invention will be described in detail, with reference to the following figures, wherein.

DETAILED DESCRIPTION OF EXEMPLARY EMBODIMENTS

Various exemplary embodiments of systems and methods according to this invention automatically process scanned and/or printed color documents to produce small, highly-compressed image data files that accurately capture the original document content. According to various exemplary embodiments of systems and methods according to this invention, output files are generated in accordance with the mixed raster content (MRC) representation, which is now included in both TIFF and PDF standards, as well as the PostScript standard.

Figure 1:
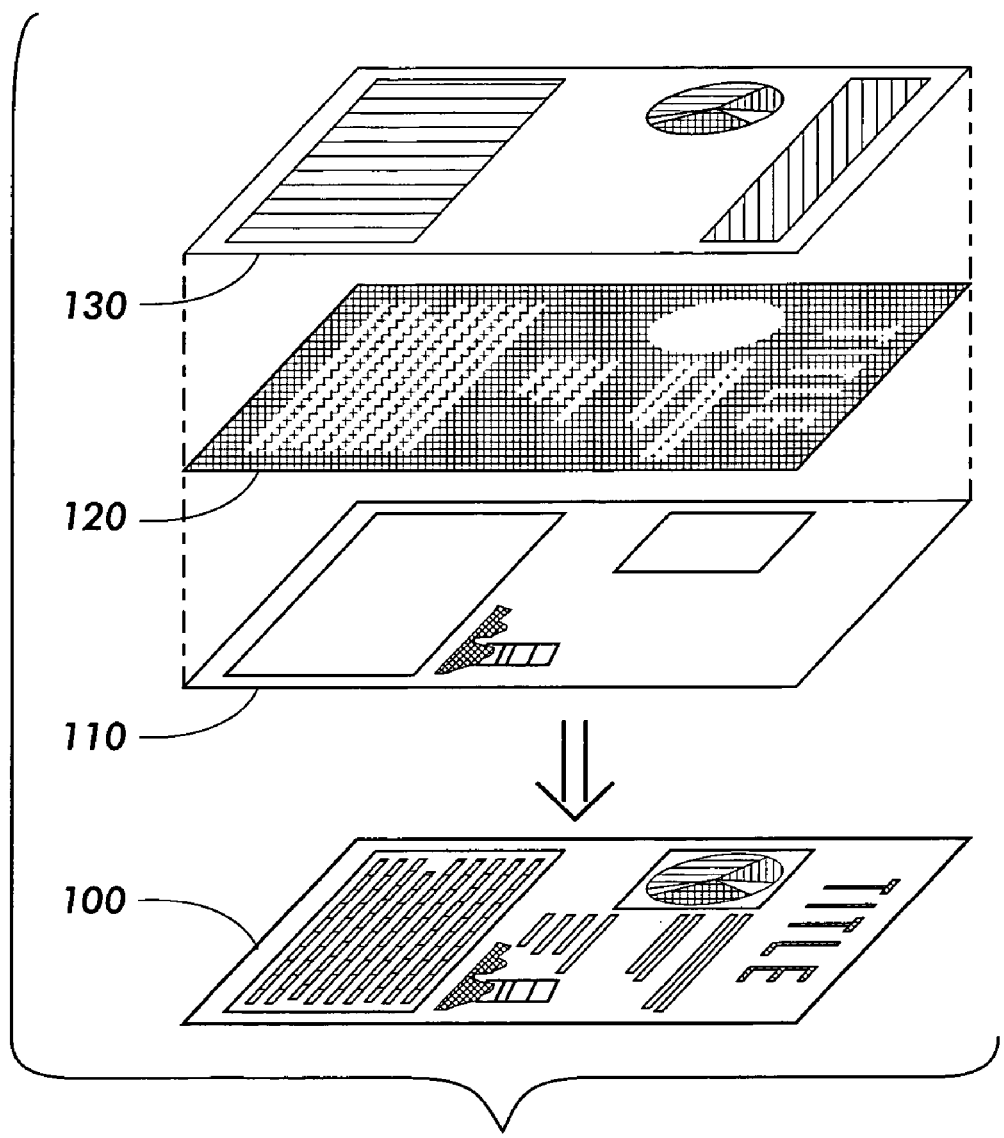
FIG. 1 shows one exemplary embodiment of the foreground, background and selector planes of the three-layer mixed raster content format and the resulting rendered document image.

FIG. 1 shows one exemplary embodiment of a three-layer mixed raster content image data. As shown in FIG. 1, a document image 100 to be rendered using the mixed raster content format is generated using a background plane 110, a foreground plane 130, and a selector plane 120. A fourth, non-image data plane can also be included in the mixed raster content image data file. This fourth plane often contains rendering hints which can be used by a rendering engine, such as Adobe Acrobat or the Acrobat Reader, to provide additional instruction on how particular pixels are to be rendered.

As shown in FIG. 1, the selector plane 120 is used to mask undifferentiated regions of color image data stored on the foreground plane 130 onto the background plane 110 to form the rendered image 100. In particular, the selector plane 120 contains high spatial frequency information for regions otherwise having slowly changing color information. In effect, regions whose color changes relatively slowly, if at all, are placed onto the foreground plane 130. The shapes of those regions are then embedded into the selector plane 120. In contrast, regions having high color frequency, e.g., colors whose values change more significantly over very small spatial extents, are stored as continuous tone image data on the background plane 110. When the image 100 is to be generated, the color information stored in the foreground plane 130 has spatial or shape attributes applied to it based on the binary information stored in the selector plane 120 and the resulting shaped color information is combined onto the background plane 110 to form the reconstructed image 100.

U.S. patent application Ser. Nos. 10/187,499; 10/188,026; 10/188/249; 10/188,277; 10/188,157; 10/612,250; 10/612,057; 10/612,234; 10/612,461; 10/612,062; 10/612,261; 10/612,246; 10/612,368; 10/612,248; 10/612,063; 10/612,064 and 10/612,084, each incorporated herein by reference in its entirety, disclose in greater detail various aspects of the process for decomposing document image data into the various planes 110-130.

However, the mixed raster content format, as outlined above with respect to FIG. 1, is not fully supported by all image document formats. In various exemplary embodiments of systems and methods according to this invention, rather than using the three-layer format outlined above with respect to FIG. 1, image data is decomposed into a background plane and a plurality of binary foreground planes. This is illustrated in detail in FIG. 2.

Figure 2:
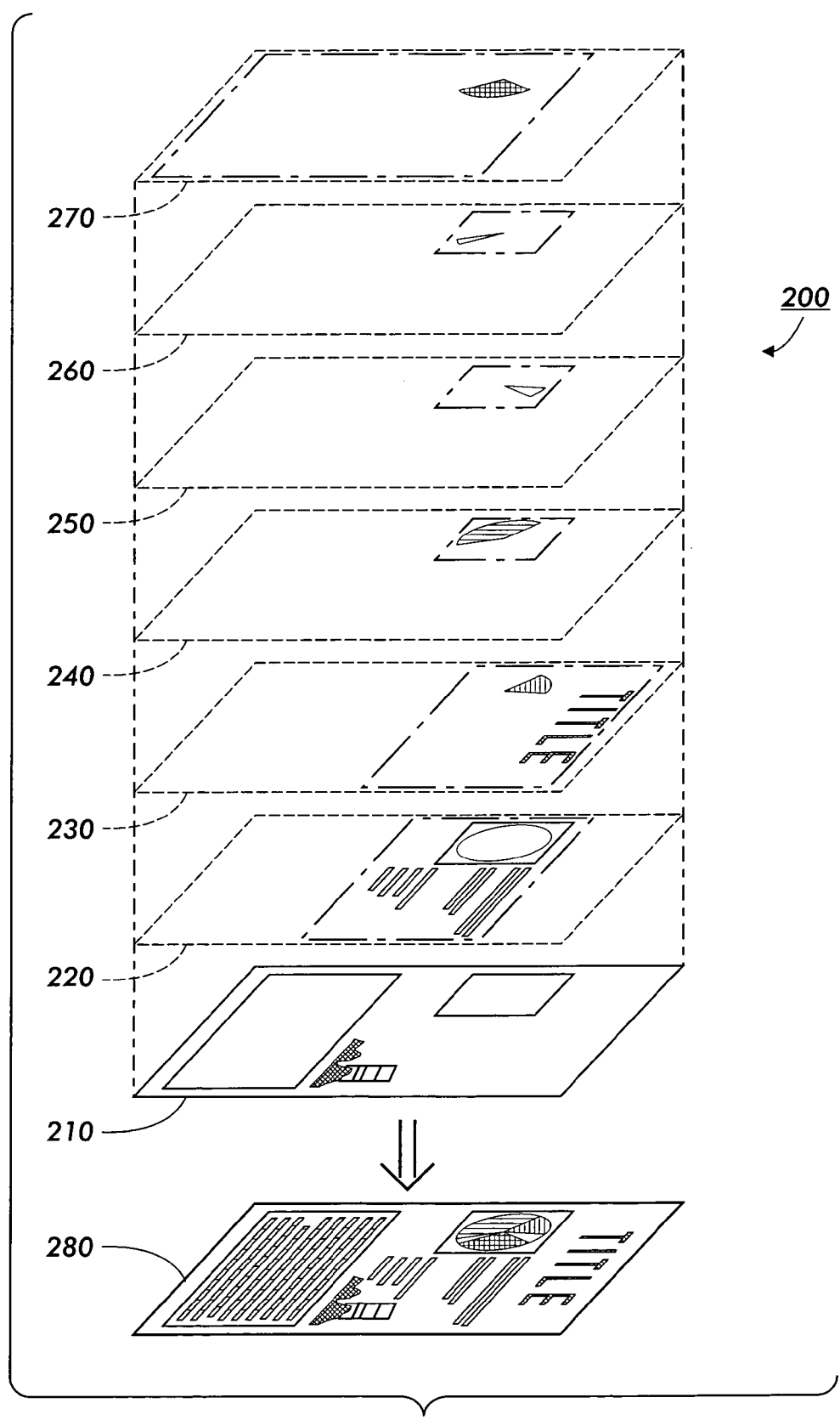
FIG. 2 illustrates one exemplary embodiment of a multiple binary foreground image planes and the resulting document image according to this invention.

As shown in FIG. 2, a document image 200 is decomposed into a background continuous tone or grayscale plane 210 and, for example, six binary foreground planes 220-270. Each of the binary foreground planes 220-270 defines the spatial extents of low spatial frequency color image data to be combined onto the background plane 210. However, unlike the three-layer mixed raster content shown in FIG. 1, rather than obtaining the color data from a separate foreground plane, each of the multiple binary foreground planes 220-270 has a specific color associated with that plane. The image data is separated into a number of distinct color values, six in this example, where each of the six color values is associated with a particular binary foreground plane. In addition, the pictorial and other color information not lifted to the plurality of foreground planes, if any, are left on the color background plane 210. Thus, the image data is decomposed to form the background plane 210 and the multiple binary foreground planes 220-270.

It should be appreciated that, in this situation, the image data in any of the multiple binary foreground planes 220-270 does not overlap the image data in any other one of the multiple binary foreground planes 220-270. As a result, each of the binary foreground planes 220-270 can be individually combined with the background plane 210 without regard to order or sequence. When each of the multiple binary foreground planes 220-270 is combined with the background plane 210 by applying the color value associated with that binary foreground plane to the background plane 210 according to the binary data on that binary foreground plane, the resulting image 280 is obtained.

Figure 3:
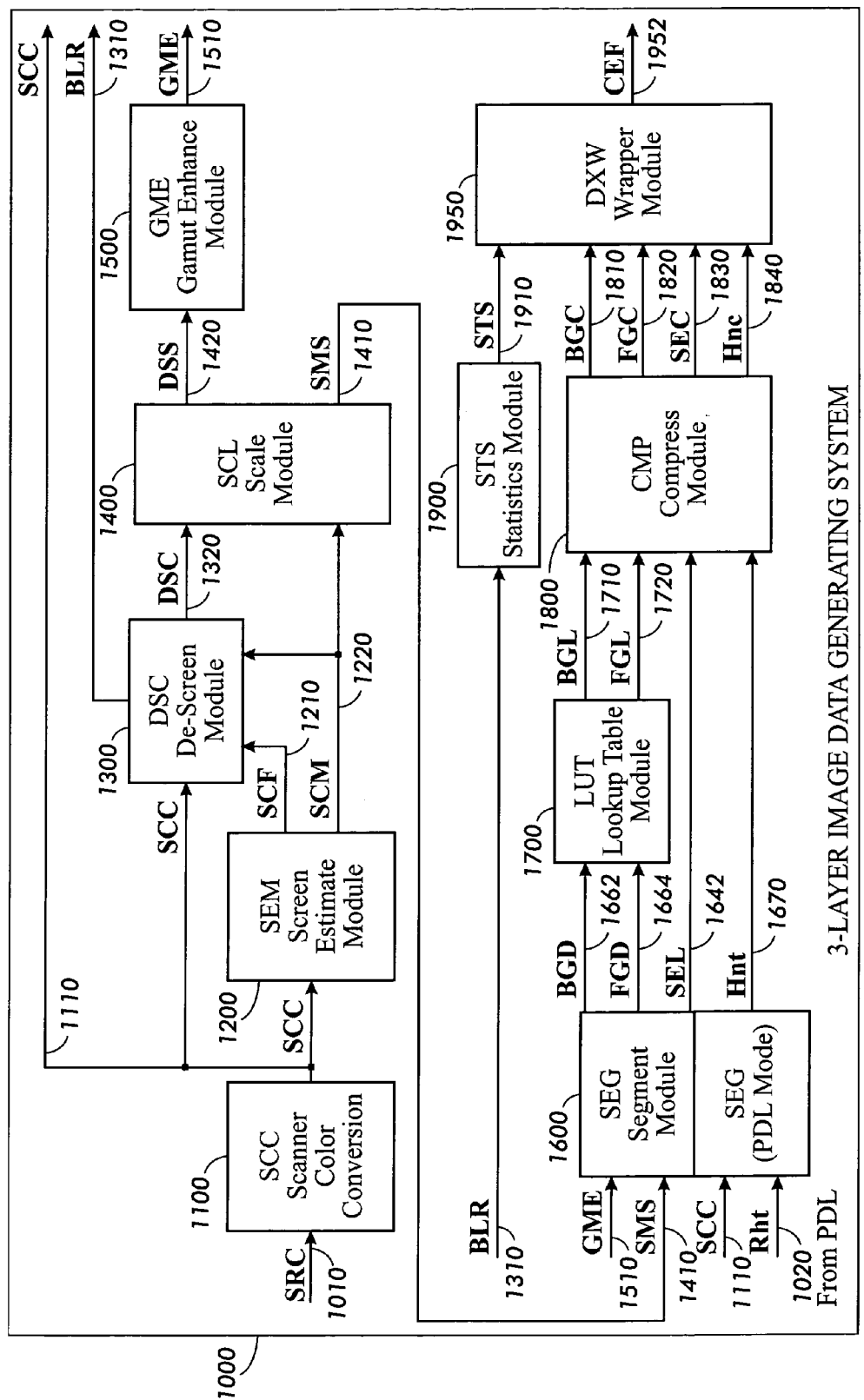
FIG. 3 illustrates one exemplary embodiment of a three-layer image data generating system.

FIG. 3 shows one exemplary embodiment of a three-layer image data generating system 1000, as described in the incorporated 499; 026; 249; 277; 157; 250; 057; 234; 461; 062; 261; 246; 368; 248; 063; 064 and 084 applications. As shown in FIG. 3, scanner image data SRC is input on a signal line 1010 to a scanner color conversion module 1100. In general, the scanner image data SRC will typically be in a red-green-blue (RGB) color space. However, the conversion of the scanner image data into the three-layer format is typically best performed using a luminance and chroma based color space, such as LAB or YCC, as it is more suitable for segmentation. It should be further appreciated that the LAB or YCC color spaces could be accurately computed or linearly approximated depending on the circumstances and desired color fidelity. Accordingly, the scanner color conversion module 1100 outputs scanner color converted SCC image data, which is typically LAB or YCC, data over a signal line 1110 to a screen estimation module 1200, a descreen module 1300, and a segment module 1600. The detailed description provided in the incorporated 234 application and other ones of the incorporated applications discusses this conversion with respect to both LAB and YCC color spaces.

The scanned color converted image data SCC is input by the screen estimate module 1200, which estimates halftone frequencies and magnitudes, if any, in various regions of the converted image data. This information is usable when removing halftoning from the scanned color converted image data SCC. The screen estimate module 1200 outputs, for each pixel in the image data, an estimated screen frequency SCF over a signal line 1210 to the descreen module 1300. The screen estimate module 1200 also outputs, for each pixel in the image data, an estimated screen magnitude signal SCM over a signal line 1220 to the descreen module 1300 and to a scale module 1400.

The descreen module 1300 inputs the scanner color converted SCC image data from the scanner color conversion module 1100, and the estimated screen frequency signal SCF and the screen magnitude signal SCM from the screen estimate module 1200. The descreen module 1300 outputs a blur signal BLR over a signal line 1310 to a statistics module 1900 and outputs a descreened image data signal DSC over a signal line 1320 to the scale module 1400.

The scale module 1400 scales the screen magnitude SCM and descreen DSC signals to the desired output resolution and size, such as for reduction enlargement and/or different printer resolution. The scale module 1400 outputs a scaled screen magnitude signal SMS over a signal line 1410 to the segment module 1600. The scale module 1400 also outputs a scaled descreened image data signal DSS over a signal line 1420 to a gamut enhance module 1500. The gamut enhance module 1500 inputs the scaled descreened image data signal DSS and outputs an enhanced gamut image data signal GME over the signal line 1510 to the segment module 1600. It should be appreciated that the incorporated 234 and 261 applications provide more details regarding the operation of the scanned color conversion module 1100. Similarly, the incorporated 084 application provides greater details on the operation of the screen estimate module 1200, while the incorporated 499, 026 and 064 applications provide greater details regarding the descreen module 1300 and the incorporated 461 application provides greater details on the gamut enhance module 1500.

As shown in FIG. 3, the SCC, SMS and GME signals are input over the signal lines 1110, 1410 and 1510, respectively, to the segment module 1600. In addition, a rendering hint signal Rht is input over a signal line 1020 when the image data to be converted is obtained from an image data file that stores image data written using a page description language (PDL). In particular, as shown in FIG. 3, the SCC and Rht signals are input only to the PDL mode portion of the segment module 1600, while the SMS and the GME signals are input to the segment module 1600 for scanned images in non-PDL mode. The segment module 1600 segments the image data represented by the gamut enhanced image data signal GME based on the scaled image data signal SMS to generate a background image data signal BGD and a foreground image data signal FGD, which are output respectively on the signal lines 1662 and 1664 to a look-up table module 1700. The segment module 1600 also outputs a selector plane image data signal SEL to a compress module 1800 over a signal line 1642. Finally, if the segment module 1600 was provided with a rendering hint signal Rht, the segment module 1600 also outputs a hint image data plane signal Hnt over a signal line 1670 to the compressed module 1800.

The look-up table module 1700 inputs the background and foreground data signals BGD and FGD, respectively, over the signal lines 1662 and 1664 and converts them from one color space into a second color space, such as, for example, from the internal YCC color space to the output device-independent LAB color space. The look-up table module 1700 outputs the color space converted background and foreground data signals BGL and FGL, respectively, over the signal lines 1710 and 1720 to the compress module 1800. The compress module 1800 compresses each of the background plane, the foreground plane, the selector plane, and the hint plane, if generated, separately using compression techniques particularly adapted to the types of data stored on those planes. The compress module 1800 outputs a compressed background image plane signal BGC over a signal line 1810 to a wrapper module 1950. Likewise, the compress module 1800 outputs a compressed foreground data plane signal FGC over a signal line 1820, a compressed selector plane signal SEC over a signal line 1830 and a compressed rendering hint plane signal Hnc over a signal line 1840 to the wrapper module 1950.

In parallel with the look-up table module 1700 and the compress module 1800, the blur signal BLR is input over the signal line 1310 to a statistics module 1900. The statistics module 1900, based on the blur signal BLR, generates a statistics signal STS, which is output over a signal line 1910 to the wrapper module 1950. The wrapper module 1950 then creates a single data file containing each of the various compressed data planes, based on the statistics signal STS. The statistics information STS is very small and therefore is typically not compressed. The statistics information is used for automatic background suppression, neutral detect, auto image enhancement, and various other enhancement techniques. In various exemplary embodiments, this single data file is in a common exchange format (CEF), and is output on the signal line 1952 to a downstream process. It should be appreciated that the common exchange format (CEF) file is not intended to limit the possible data file formats only to the common exchange format, but rather is intended to encompass within its scope any known or later-developed generalized data format, including the PostScript format and the portable document format (PDF).

It should be appreciated that the incorporated 057 application provides greater details regarding the page description mode of the segment module 1600. Likewise, the incorporated 249, 277, 157, 250, 246, 368, 248 and 063 applications provide greater details about the operation of the segment module 1600 in its entirety. The incorporated 062 application provides greater details regarding the look-up table module 1700, while the incorporated 234 application provides greater details regarding the statistics module 1900.

It should be appreciated that, in various exemplary embodiments, the three-layer image data generating system 1000 can be implemented as software executing on a programmed general purpose computer. Likewise, the three-layer image data generating system 1000 can also be implemented on a special purpose computer, a programmed microprocessor or microcontroller and peripheral integrated circuit elements, and ASIC or other integrated circuit, a digital signal processor (DSP), a hardwired electronic or logic circuit, such as a discrete element circuit, a programmable logic device, such as a PLD, PLA, FPGA or PAL, or the like. In general, any device that is capable of implementing the functionality disclosed herein and in the incorporated 499; 026; 249; 277; 157; 250; 057; 234; 461; 062; 261; 246; 368; 248; 063; 064 and 084 applications can be used to implement the three-layer image data generating system 1000. Each of the various signal lines outlined above in FIG. 3 connecting the various modules and the like can be direct signal line connections or can be software connections implemented using an implication programming interface or the like. It should be appreciated that any appropriate hardware, firmware or software elements or data structures can be used to implement one or more of the various modules and/or signal lines outlined above with respect to FIG. 3.

It should be understood that each of the circuits, routines, applications, modules or the like outlined above with respect to FIG. 3 can be implemented as software that is stored on a computer-readable medium and that is executable on a programmed general purpose computer, a programmed special purpose computer, a programmed microprocessor, a programmed digital signal processor or the like. Such a computer-readable medium includes using a carrier wave or the like to provide the software instructions to a processing device. It should also be understood that each of the circuits, routines, applications, objects, procedures, managers and/or modules outlined above with respect to FIG. 3 can be implemented as portions of a suitably programmed general purpose computer. Alternatively, each of the circuits, routines, applications, objects, procedures, managers and/or modules shown in FIG. 3 can be implemented as physically distinct hardware circuits within an ASIC, using a digital signal processor DSP, using an FPGA, a PLD, a PLA and/or a PAL, or using discrete logic elements or discrete circuit elements. The particular form the circuits, routines, applications, objects, procedures, managers and/or modules shown in FIG. 3 will take is a design choice and it will be obvious and predictable to those skilled in the art. It should be appreciated that the circuits, routines, applications, objects, procedures, managers and/or modules shown in FIG. 3 do not need to be of the same design.

It should be appreciated that a routine, an application, a manager, a procedure, an object, and/or a module, or the like, can be implemented as a self-consistent sequence of computerized steps that lead to a desired result. These steps can be defined by and/or in one or more computer instructions stored in a computer-readable medium, which should be understood to encompass using a carrier wave or the like to provide the software instructions to a processing device. These steps can be performed by a computer executing the instructions that define the steps. Thus, the terms "routine", "application", "manager", "procedure", "object" and/or "module" can refer to, for example, any appropriately-designed circuit, a sequence of instructions, a sequence of instructions organized with any programmed procedure or programmed function, and/or a sequence of instructions organized within programmed processes executing in one or more computers. Such routines, applications, managers, procedures, objects and/or modules, or the like, can also be implemented directly in circuitry that performs a procedure. Further, the data processing described with respect to FIG. 3 can be performed by a computer executing one or more appropriate programs, by special purpose hardware designed to perform the method, or any combination of such hardware, firmware and software elements.

Figure 4:
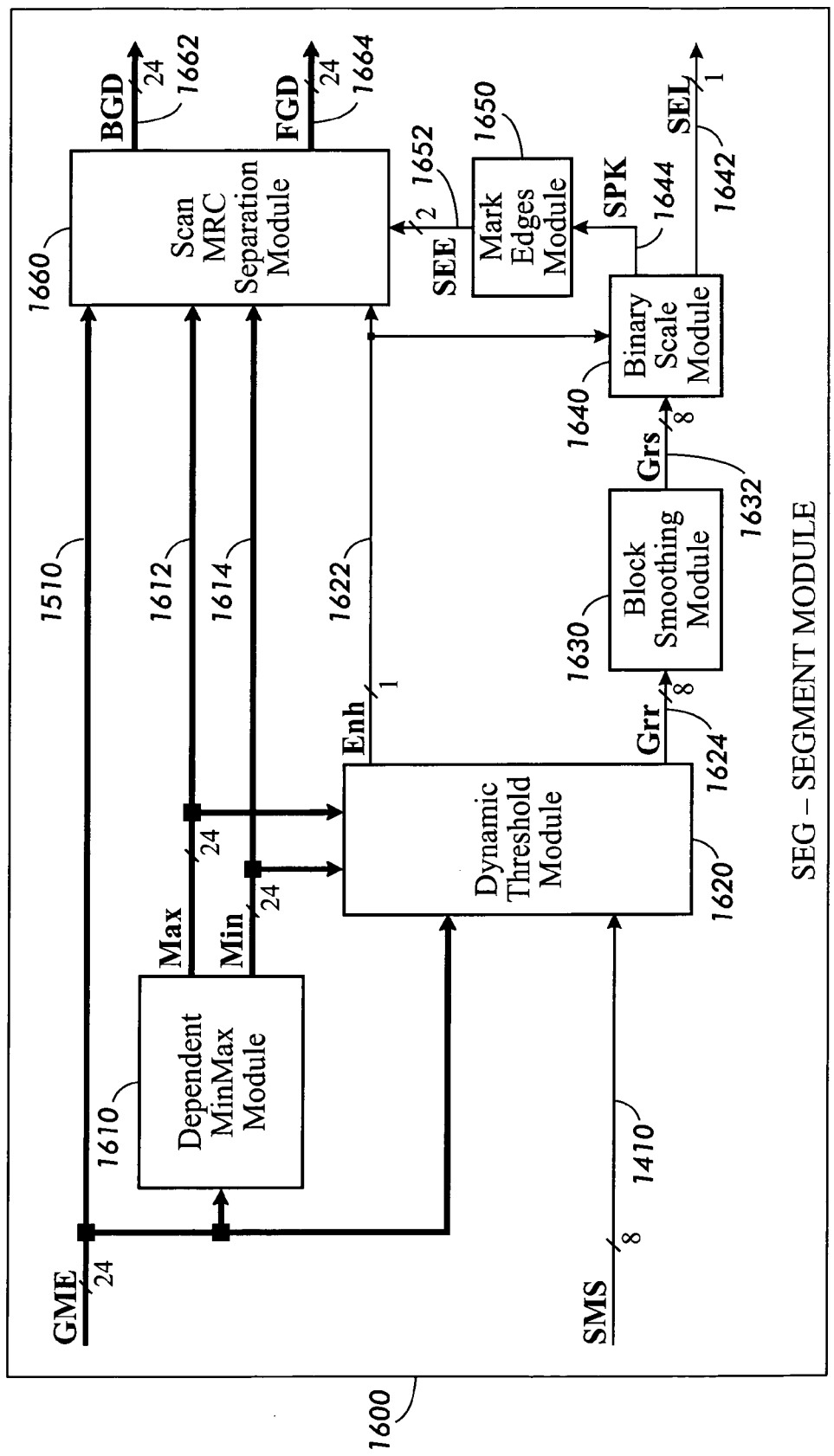
FIG. 4 illustrates one exemplary embodiment of a segment module of the three-layer image data generating system of FIG. 3.

FIG. 4 illustrates in greater detail one exemplary embodiment of the segment module 1600 shown in FIG. 3. As shown in FIG. 4, the segment module 1600 inputs the gamut enhanced image data signal GME over the signal line 1510 and provides it to each of a dependent min-max module 1610, a dynamic threshold module 1620 and a scan MRC separation module 1660. As shown in FIG. 4, the segment module 1600 also inputs the scaled screen magnitude signal SMS, if available, over the signal line 1410 to the dynamic threshold module 1620.

The dependent min-max module 1610 inputs the gamut enhanced image data signal GME over the signal line 1510 and outputs, for each pixel in the input image data, a local maximum image value signal MAX over a signal line 1612 and a local minimum image value signal MIN over a signal line 1614 to the dynamic threshold module 1620 and to the scan MRC separation module 1660. That is, for each pixel in the image being converted, a window defining a neighborhood around that pixel is applied to that pixel and maximum and minimum image values of pixels within that window are determined and identified as the dependent maximum and dependent minimum image values for that pixel of interest. This is described in greater detail in the incorporated 249 and 246 applications.

The dynamic threshold module 1620 inputs the gamut enhanced image data signal GME over the signal line 1510, the scaled screen magnitude signal SMS, if available, over the signal line 1410, the dependent maximum signal MAX and the dependent minimum signal MIN over the signal lines 1612 and 1614. The dynamic threshold module 1620 outputs an enhance control signal Enh over the signal line 1622 to the scan MRC separation module 1660 and to a binary scale module 1640. The dynamic threshold module 1620 also outputs a raw gray level selector signal Grr over a signal line 1624 to a block smooth module 1630. The block smooth module 1630 filters the raw gray signal Grr and outputs a smooth gray selector signal Grs over a signal line 1632 to the binary scale module 1640.

The binary scale module 1640 inputs the enhanced image data signal Enh over the signal line 1622 and the smoothed grayscale signal Grs over the signal line 1632 and outputs the binary selector plane data signal SEL over the signal line 1642.

The binary scale module 1640 generates the binary selector signal SEL, which forms the selector plane SEL 120 of the Common Exchange Format (FIG. 1). The binary selector signal SEL controls the MRC separation into foreground FGD and background BGD planes. In order to provide high quality separation, the binary selector signal SEL can be generated at higher multiples of the input scanner resolution. Image data is typically scanned at a fixed resolution, such as 300 or 600 dots per inch, for example. In order to improve text and line-art quality, the binary selector signal SEL can be generated and outputted at higher resolution (for example, 1200 dots per inch). The amount of SEL upsampling is typically, though not limited to, a binary power-of-two integer such as 1, 2, 4, . . . , etc. When higher resolution is used (i.e., scale up by 2 or more), multiple binary SEL bits are generated for each input pixel. These bits are packed together as the packed selector signal SPK, and sent sequentially to the output. For instance, when the selector is up-sampled by 2×, the packed selector SPK output will contain four bits for each input pixel, and thus SPK is now effectively at twice the input resolution. The binary scale module 1640 outputs the packed selector signal SPK over the signal line 1644 to the mark edges module 1650.

The mark edges module 1650 analyzes the bit pattern of the packed selector signal SPK, which can be at the same or higher multiple of the input resolution. The Mark edges module 1650 extracts the information relevant to MRC separation from the packed selector signal SPK. This information is based on counting the number and polarity of the higher resolution edges corresponding to one input image pixel. The information is conveyed to the MRC separation module by means of the selector edge extract SEE signal. The mark edges module 1650 inputs the packed selector signal SPK 1644 and outputs a selector edge extract signal SEE 1652 to the scan MRC separation module 1660. Image pixel intensity polarity is a relative concept that compares the intensity of a given pixel or group (including a row) of pixels with another pixel or group of pixels. For two groups of pixels, the group having the higher intensity has a positive polarity with respect to the group having the lower pixel intensity, whereas the lower pixel intensity group has a lower polarity than the higher intensity pixel group. U.S. Pat. No. 5,515,452, for example, provides an explanation of edge polarity.

The scan MRC separation module 1660 inputs the gamut enhanced image data signal GME over the signal line 1510, the dependent maximum and minimum signals MAX and MIN over the signal lines 1612 and 1614, the enhanced image data signal Enh over the signal line 1622 and the selector edge extract signal SEE over the signal line 1652. The scanned MRC separation module 1660, based on these signals, separates the gamut enhanced image data signal GME into the background plane signal BGD and the foreground plane signal FGD.

It should be appreciated that the incorporated 249, 277 and 368 applications provide greater details for the operation of the dynamic threshold module 1620. The incorporated 063 application provides greater detail regarding the operation of the block smooth module 1630. The incorporated 157 and 248 applications provide greater detail on the operation of the binary scale and mark edges modules 1640 and 1650, while the incorporated 157 application also provides greater details regarding the operation of the scan MRC separation module 1660.

Figure 5:
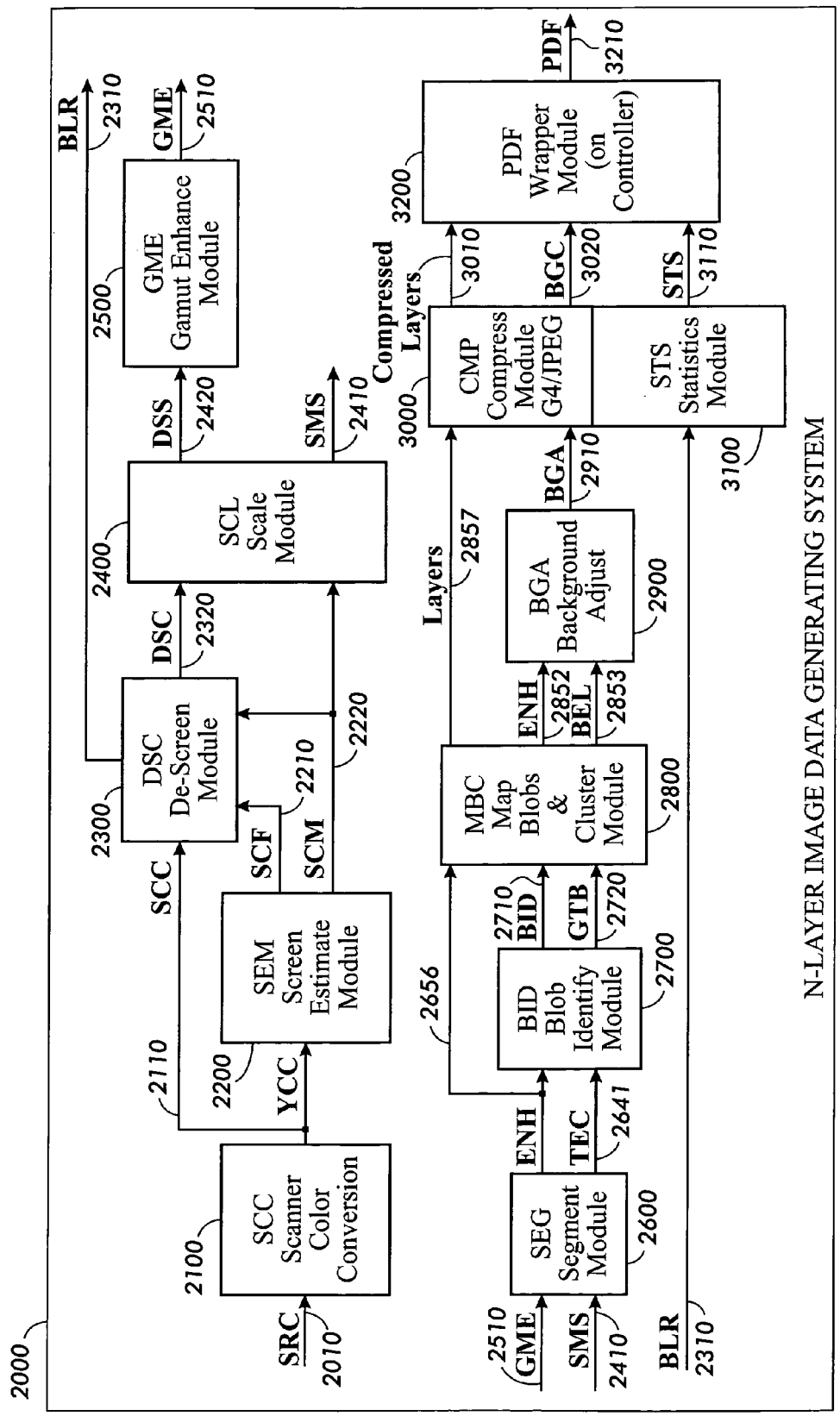
FIG. 5 illustrates one exemplary embodiment of an N-layer image data generating system according to this invention.

FIG. 5 illustrates one exemplary embodiment of an N-layer image data generating system 2000 according to this invention. The N-layer image data generating system 2000 may be a xerographic marking device, a marking device, a digital photocopier, an ink-jet printer and the like. As shown in FIG. 5, the N-layer image data generating system 2000 inputs the scanner signal SRC over a signal line 2010 to a scanner color conversion module 2100. The scanner color conversion module 2100 outputs the scanner color converted signal SCC over a signal line 2110 to a screen estimate module 2200 and a descreen module 2300. The screen estimate module 2200 outputs the estimated screen frequency signal SCF over a signal line 2210 to the descreen module 2300 and outputs the estimated screen magnitude signal SCM over a signal line 2220 to the descreen module 2300 and to a scale module 2400. The descreen module 2300 outputs the blur signal BLR over a signal line 2310 to a statistics module 3100 and the descreened image data signal DSC over a signal line 2320 to the scale module 2400. The scale module 2400 outputs the scaled screen magnitude signal SMS over a signal line 2410 to the segment module 2600 and the scaled descreened image data signal DSS over a signal line 2420 to the gamut enhance module 2500. The gamut enhance module 2500 outputs the gamut enhanced image data signal GME over a signal line 2510 to the segment module 2600. It should be appreciated that each of the modules and signal lines 2010-2510 are generally identical to those described and outlined above with respect to FIG. 3 and in the incorporated 499; 026; 249; 277; 157; 250;

057; 234; 461; 062; 261; 246; 368; 248; 063; 064 and 084 applications and thus will not be described in further detail.

As shown in FIG. 5, the N-layer image data generating system 2000, in place of the segment model 1600 and the look-up table module 1700 and the related signal lines of the three-layer image data generating system 1000, includes a different segment module 2600, a blob identifying module 2700, a map blobs and cluster module 2800 and a background adjust module 2900. However, as also shown in FIG. 5, while the N-layer image data generating system 2000 also includes a compress module 3000, a statistics module 3100 and a PDF wrapper module 3200, these elements operate generally similarly to, but not necessarily identically to, the corresponding modules 1800, 1900 and 1950 outlined above with respect to FIG. 3.

In particular, as shown in FIG. 5, the segment module 2600 inputs only the gamut enhanced image data signal GME over the signal line 2510 and the scaled screen magnitude signal SMS over the signal line 2410. The segment module 2600 processes these signals and generates a tri-state edge continuity signal TEC, which is output over a signal line 2641 to the blob identifying module 2700. The segment module 2600 also outputs the enhanced image data signal ENH over a signal line 2656 to the blob identity module 2700 and the map blobs and cluster module 2800. The blob identifying module 2700 inputs the tri-state edge continuity signal TEC and the enhanced image data signal ENH over the signal lines 2641 and 2656, respectively, and converts them into a blob ID signal (BID) and a global table of blobs GTB. Each of these signals is output over the signal lines 2710 and 2720, respectively, to the map blobs and cluster module 2800.

The map blobs and cluster module 2800 inputs the enhanced image data signal ENH over the signal line 2656, the blob ID signal BID over the signal line 2710 and the global table of blobs signal GTB over the signal line 2720 and assigns various blobs to different ones of the multiple binary foreground planes depending in part on the particular colors associated with each of the different planes and the different blobs. The map blobs and cluster module 2800 also determines the extents of the various binary foreground layers, as each binary foreground layer does not need to extend over the full size of the image data being converted. This occurs, for example, when all the blobs of one binary foreground plane are located only in one-half of the document being converted, such that the other half of that binary foreground plane will always be empty. Since the other half of that binary foreground plane will always be empty, it is not necessary to compress or otherwise maintain the other half of that binary foreground plane. Consequently, the size of that binary foreground plane can be adjusted accordingly.

The map blobs and cluster module 2800 outputs the binary data for each of the binary foreground layers over a signal line 2851 to the compress module 3000. The map blobs and cluster module 2800 also outputs a binary selector signal BEL over a signal line 2853, which is a union of all binary foreground masks, and passes the enhanced color signal ENH over a signal line 2852 to the background adjust module 2900. The background adjust module 2900 adjusts the background of the background image data signal BG and outputs an adjusted background image data signal BGA to the compress module 3000 over a signal line 2910.

The background adjust module 2900 adjusts the background grayscale layer to fill in the regions, that will be replaced by data from various ones of the binary foreground planes when the image is recombined, with data that maximizes the compressibility of the background grayscale plane. The adjusted background grayscale plane signal BGA is output over the signal line 2910 to the compression module 3000.

The compress module 3000, like the compress module 1800, compresses each of the binary foreground layers received over the signal line 2851 and the background image data signal BGA received over the signal line 2910 differentially, using a compression routine that is appropriate for the particular type of data being compressed, to generate compressed image data for the binary foreground layers and the background plane.

The compress module 3000 then outputs the compressed binary foreground layers to the PDF wrapper 3200 over the signal line 3010, and the compressed background signal BGC over the signal line 3020 to the PDF wrapper 3200.

In parallel, the blur signal BLR is input over the signal line 2310 to the statistics module 3100, which operates generally similarly to the statistics module 1900 outlined above with respect to FIG. 3. The statistics signal STS is output over a signal line 3110 to the PDF wrapper 3200. Since the amount of statistical data gathered is small, it is typically not compressed. The PDF wrapper 3200 inputs the compressed layers signals over the signal line 3010, the compressed background signal BGC over the signal line 3020 and the statistics signal STS over the signal line 3110 and combines them into an n-layer PDF file (PDF) that is output to a downstream process over a signal line 3210.

It should be appreciated that, in various exemplary embodiments, the N-layer image data generating system 2000 can be implemented as software executing on a programmed general purpose computer. Likewise, the N-layer image data generating system 2000 can also be implemented on a special purpose computer, a programmed microprocessor or microcontroller and peripheral integrated circuit elements, and ASIC or other integrated circuit, a digital signal processor (DSP), a hardwired electronic or logic circuit, such as a discrete element circuit, a programmable logic device, such as a PLD, PLA, FPGA or PAL, or the like. In general, any device that is capable of implementing the functionality disclosed herein and in the incorporated 499; 026; 249; 277; 157; 250; 057; 234; 461; 062; 261; 246; 368; 248; 063; 064 and 084 applications can be used to implement the N-layer image data generating system 2000. Each of the various signal lines outlined above in FIG. 5 connecting the various modules and the like can be direct signal line connections or can be software connections implemented using an implication programming interface or the like. It should be appreciated that any appropriate hardware, firmware or software elements or data structures can be used to implement one or more of the various modules and/or signal lines outlined above with respect to FIG. 5.

It should be understood that each of the circuits, routines, applications, modules or the like outlined above with respect to FIG. 5 can be implemented as software that is stored on a computer-readable medium and that is executable on a programmed general purpose computer, a programmed special purpose computer, a programmed microprocessor, a programmed digital signal processor or the like. Such a computer-readable medium includes using a carrier wave or the like to provide the software instructions to a processing device. It should also be understood that each of the circuits, routines, applications, objects, procedures, managers and/or modules outlined above with respect to FIG. 5 can be implemented as portions of a suitably programmed general purpose computer. Alternatively, each of the circuits, routines, applications, objects, procedures, managers and/or modules shown in FIG. 5 can be implemented as physically distinct hardware circuits within an ASIC, using a digital signal processor DSP, using an FPGA, a PLD, a PLA and/or a PAL, or using discrete logic elements or discrete circuit elements. The particular form the circuits, routines, applications, objects, procedures, managers and/or modules shown in FIG. 5 will take is a design choice and it will be obvious and predictable to those skilled in the art. It should be appreciated that the circuits, routines, applications, objects, procedures, managers and/or modules shown in FIG. 5 do not need to be of the same design.

It should be appreciated that a routine, an application, a manager, a procedure, an object, and/or a module, or the like, can be implemented as a self-consistent sequence of computerized steps that lead to a desired result. These steps can be defined by and/or in one or more computer instructions stored in a computer-readable medium, which should be understood to encompass using a carrier wave or the like to provide the software instructions to a processing device. These steps can be performed by a computer executing the instructions that define the steps. Thus, the terms "routine", "application", "manager", "procedure", "object" and/or "module" can refer to, for example, any appropriately-designed circuit, a sequence of instructions, a sequence of instructions organized with any programmed procedure or programmed function, and/or a sequence of instructions organized within programmed processes executing in one or more computers. Such routines, applications, managers, procedures, objects and/or modules, or the like, can also be implemented directly in circuitry that performs a procedure. Further, the data processing described with respect to FIG. 5 can be performed by a computer executing one or more appropriate programs, by special purpose hardware designed to perform the method, or any combination of such hardware, firmware and software elements.

Figure 6:
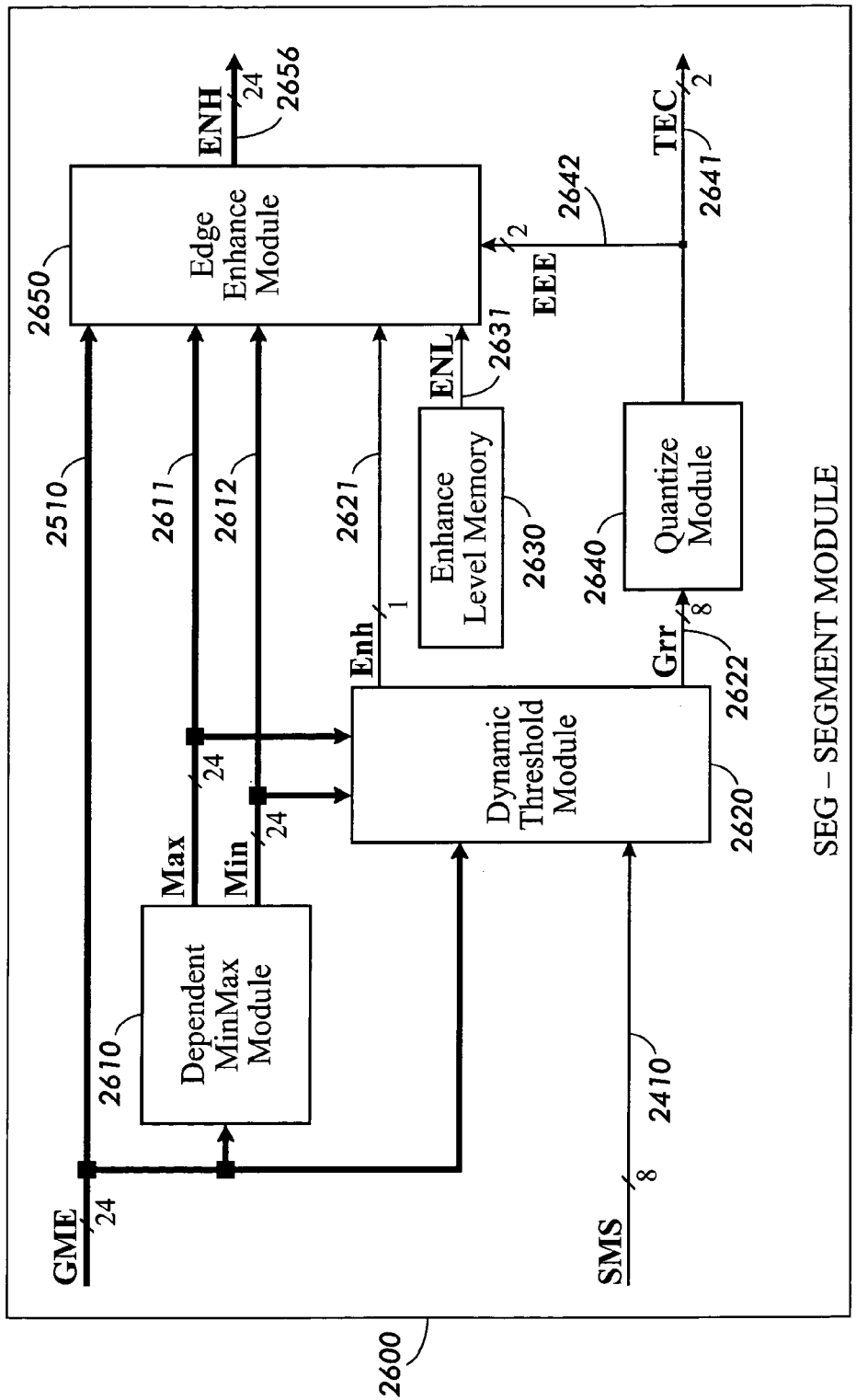
FIG. 6 illustrates one exemplary embodiment of a segment module of the N-layer image data generating system of FIG. 5 according to this invention.

FIG. 6 illustrates in greater detail one exemplary embodiment of the segment module 2600 of the N-layer image data generating system 2000 shown in FIG. 5. As shown in FIG. 6, the gamut enhanced image data signal GME is input over the signal line 2510 to a dependent min-max module 2610 and a gradient parameter generator, for example, a dynamic threshold module 2620. Similarly, the scaled screen magnitude signal SMS, if available, is input over the signal line 2410 to the dynamic threshold module 2620. The dependent min-max module 2610 and the dynamic threshold module 2620 operate similarly to the dependent min-max module 1610 and the dynamic threshold module 1620 of the segment module 1600 illustrated in FIG. 4. Thus, the structure and operation of these modules will not be described further.

As shown in FIG. 6, the dependent min-max module 2610 outputs a maximum value signal MAX and a minimum value signal MIN over a pair of signal lines 2611 and 2612, respectively, to the dynamic threshold module 2620 and to an edge enhance module 2650. The dynamic threshold module 2620 outputs the enhanced image data signal Enh over a signal line 2621 to the edge enhance module 2650 and outputs a raw grayscale selector signal Grr over a signal line 2622 to a quantize module 2640.

In various exemplary embodiments, the measured dependent minimum and maximum values MIN and MAX are measured by the dependent min-max module 2610 in some neighborhood region such as, for example, a 7-by-7 window of pixels, around a current pixel of interest. The dependent maximum value for the current pixel of interest is the image value of the pixel in the window that has the highest luminance value. The dependent minimum value is the image value of the pixel in the window that has the lowest luminance value. The chroma channels of the MIN and MAX signals are typically not involved with the minimum or maximum operation, but rather represent the corresponding chroma values of the image pixel having the brightest or darkest luminance values within the given window region (hence the label "dependent"). In general, the dependent maximum and minimum signals MAX and MIN are 24-bit, three-component vector signals, corresponding to the three orthogonal axes of a suitable color space. It should be appreciated that any color space can be used, although some color spaces, such as for example, LAB, YCC, XYZ and the like, are more convenient, since the luminance can be found in these color spaces by examining only one of the three components.

The dynamic threshold module 2620 uses the image values of the identified pixels to apply adaptive thresholding to the gamut enhanced image data signal GME. In particular, the dynamic threshold module 2620 determines a dependent threshold and a dependent normalized value for the pixel of interest. The dependent threshold is determined, in various exemplary embodiments, as the average or mid-point of the MAX and MIN values for the current pixel of interest, while the dependent normalized value is, in various exemplary embodiments, determined as the difference between the MAX and MIN values for the current pixel of interest. It should be appreciated that the operation of the dynamic threshold unit 2620 is generally identical to that described and outlined above with respect to FIG. 3 and in the incorporated 249, 277, 157, 250, 246, 368, 248 and 063 applications and thus will not be described in further detail.

It should be appreciated that, in various exemplary embodiments, the dynamic threshold module 2620 and the quantized module 2640 can be combined into a single module that inputs the gamut enhanced signal GME and the dependent maximum and minimum signals MAX and MIN and outputs the tri-state edge continuity signal TEC.

In such exemplary embodiments, the absolute value of the dependent normalized signal is compared to a contrast threshold. In various exemplary embodiments, the contrast threshold is 1, although it could have any desired value. If the absolute value for the dependent normalized signal is less than the contrast threshold, the value for the tri-state edge continuity signal TEC for the current pixel of interest is set to 0. If the absolute value of the dependent normalized signal is greater than or equal to the contrast threshold, the value for the tri-state edge continuity signal TEC for the current pixel of interest is set to +1 or −1, depending on whether the value of the gamut enhanced image data signal GME for the current pixel of interest is greater than, or less than, the dynamic threshold value. In various embodiments, the tri-state edge continuity signal TEC is used to identify blobs and does not require checking of all interior pixels for color continuity.

The quantize module 2640 converts the 8-bit raw grayscale selector signal Grr into the tri-state edge continuity signal TEC, which is output over the signal line 2641 to the blob identifying module 2700. The 2-bit tri-state edge continuity signal is also output over a signal line 2642 as a selector edge extract signal EEE to the edge enhance module 2650. The edge enhance module 2650 also inputs an enhance level signal ENL over a signal line 2631 and the gamut enhanced image data signal GME over the signal line 2510. Based on all of the signals input to the edge enhance module 2650, the edge enhance module 2650 outputs the color enhanced image data signal ENH over the signal line 2656 to both the blob identifying module 2700 and the map blobs and cluster module 2800, as shown in FIG. 5.

As outlined above, the incorporated 249 and 246 applications provide greater detail regarding the dependent min-max module 2610. Likewise, the incorporated 249, 277 and 368 applications provide greater detail regarding the dynamic threshold module 2620.

As outlined above, the quantize module 2640 inputs the 8-bit raw grayscale selector signal Grr over the signal line 2622 and converts that 8-bit signal into a two-bit, tri-state-valued signal TEC. Table 1 illustrates how the Grr value, which, in various exemplary embodiments, ranges from −128 to +127, is converted into the tri-state edge continuity signal TEC that is output over the signal line 2641 and the EEE signal that is output over the signal line 2642 to the edge enhance module 2650.

TABLE 1

Grr to TEC Quantization

| Grr value | Interpretation | TEC value | semantic interpretation |
|---|---|---|---|
| +127 | Strong positive edge | +1 | H |
| . . . | Strong positive edge | +1 | |
| +2 | Strong positive edge | +1 | |
| +1 | Weak positive edge | 0 | 0 |
| 0 | No edge | 0 | |
| −1 | Weak negative edge | 0 | |
| −2 | Strong negative edge | −1 | L |
| . . . | Strong negative edge | −1 | |
| −128 | Strong negative edge | −1 | |

In this particular exemplary embodiment, the tri-state edge continuity signal TEC is at the same resolution as the input image. If, however, higher text and line-art quality is sought, the tri-state edge continuity TEC can be generated at binary integer multiple of the scan resolution. The method and manner for increasing the TEC resolution is similar to that described above in connection with the packed selector signal SPK.

As shown in Table 1, the tri-state edge continuity signal TEC has three values, namely, −1, 0, and +1. In the case the tri-state edge continuity signal TEC is at the scanner resolution, the selector edge extract signal EEE corresponds to the same values as TEC. The semantic interpretation of the TEC values uses L, 0, and H in place of the values—1, 0 and +1 of the tri-state edge continuity signal TEC. As shown in Table 1, the 0 values for the tri-state edge continuity signal TEC and the selector edge continuity signal EEE correspond to weak edges or no edge in the raw gray selector signal Grr, e.g., to the range of [−1 to +1] in the Grr signal values, inclusive. In contrast, strong positive edges with values greater than +1 for the raw gray selector signal Grr are converted to the +1 value (or 'H') for the tri-state edge continuity signal TEC and selector edge extract signal EEE. Finally, strong negative edges with values less than −1 for the raw gray selector signal Grr are mapped to the −1 value (or 'L') for the tri-state edge continuity signal TEC and selector edge extract signal EEE. The edge enhance module 2650, which is shown in greater detail in FIG. 8, uses the H, 0 and L values of the selector edge extract signal EEE to determine which of the various color signals GME, MAX or MIN will be output as the enhanced image data signal ENH.

Figure 7:
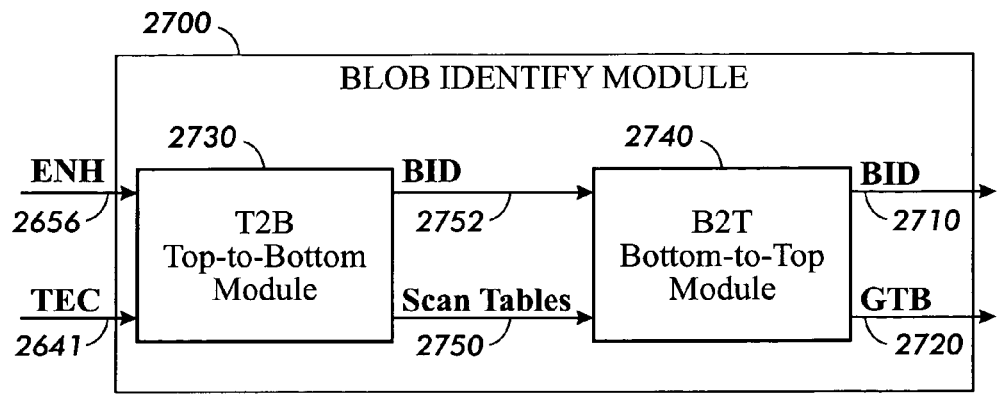
FIG. 7 illustrates a first exemplary embodiment of a blob identification module of the N-layer image data generating system of FIG. 5 according to this invention.

FIG. 7 illustrates a first exemplary embodiment of a blob identification module 2700 according to this invention. In general, the blob identifying module 2700 inputs the 24-bit enhanced image data signal ENH over the signal line 2656 and the 2-bit tri-state edge continuity signal TEC over the signal line 2641. The blob identifying module 2700 segments the input enhanced image data into blobs, each of which may be suitable for representation on a separate one of the multiple binary foreground planes. The blob identifying module 2700 operates by assigning, on a pixel-by-pixel basis, each pixel of the image, in turn, to a previously identified blob, to a new blob, or to the background grayscale image plane. The blob identifying module 2700 separates the images into blobs to ensure that each blob has a continuous strong edge and is either completely inside or completely outside of every other blob. In various exemplary embodiments, the blob identifying module 2700 operates by comparing, for a current pixel of interest and a number of surrounding pixels, i.e., the context pixels, the values of the tri-state edge continuity signal TEC for these pixels. In various exemplary embodiments, the blob identifying module 2700 applies a few simple rules to identify independent regions, i.e., blobs, which are guaranteed to not be partially overlapped, thus simplifying the task of assigning different areas, i.e., blobs, of the image to different ones of the multiple binary foreground planes and determining the proper fill of the background layer.

The blob identifying module 2700, based on the value of the tri-state edge continuity signal TEC for the current pixel of interest and for a number of adjacent pixels, labels each pixel with a blob ID that will be used in subsequent processing. Once the blob identifying module 2700 has grouped regions of pixels of the image into different blobs by assigning them different blob IDs, the blob identifying module 2700 outputs the blob ID signal BID and the global table of blobs signal GTB to the map blobs and cluster module 2800. The map blobs and cluster module 2800 refines the blob identification to identify bad blobs, check the good and bad blobs to ensure they are in fact truly good or bad blobs, and remove bad blobs from the global table of blobs signal GTB and merge their pixels into the background plane.

As shown in FIG. 7, in this first exemplary embodiment of the blob identifying module 2700, the blob identifying module 2700 includes a top-to-bottom module 2730 and a bottom-to-top module 2740. In particular, the tri-state edge continuity signal TEC on the signal line 2641 and the enhanced image data signal ENH on the signal line 2656 are input to the top-to-bottom module 2730. The top-to-bottom module 2730 analyzes (compares) the tri-state edge continuity signal TEC and the enhanced image data signal ENH for each pixel, along with the tri-state edge continuity signal TEC, the enhanced image data signal ENH and previously-assigned blob identification values BID for one or more context pixels that are adjacent to the pixel being analyzed, i.e., the pixel of interest. As the top-to-bottom module 2730 analyzes each pixel in turn in raster scan order, the top-to-bottom module 2730 continuously updates the blob identification values BID assigned to previous pixels based on the tri-state edge continuity value TEC, and the enhanced image data values ENH, to create an initial assignment of blobs appearing in each scan line of the enhanced image data ENH. It should be appreciated that, in various exemplary embodiments, as each scan line is processed, a separate scan table for that scan line is generated. After the last pixel of a particular scan line has been analyzed, and after the scan table for that scan line updated appropriately during the analysis of the subsequent scan line, that scan table is output on the signal line 2750 to the bottom-to-top module 2740. A portion of the blob identification signal BID, corresponding to that scan line, is similarly output on the signal line 2752 to the bottom-to-top module 2740.

The bottom-to-top module 2740, once it has received the last scan line table for the last scan line from the top-to-bottom module 2730, begins analyzing the scan tables, starting with the scan table for the last scan line and moving upward, to combine the one-dimensional blobs appearing in each scan table to form two-dimensional blobs, depending on the blob ID values BID and the color values of the pixels within the one-dimensional blobs that are to be combined to form the two-dimensional blobs. As each such two-dimensional blob is completed, it is added to the global table blobs signal GTB, which is output over the signal line 2720 to the map blobs and cluster module 2800. Likewise, the blob ID signal BID corresponding to the blobs identified in the global table blobs signal GTB, is output over the signal line 2710 to the map blobs and cluster module 2800.

Figure 8:
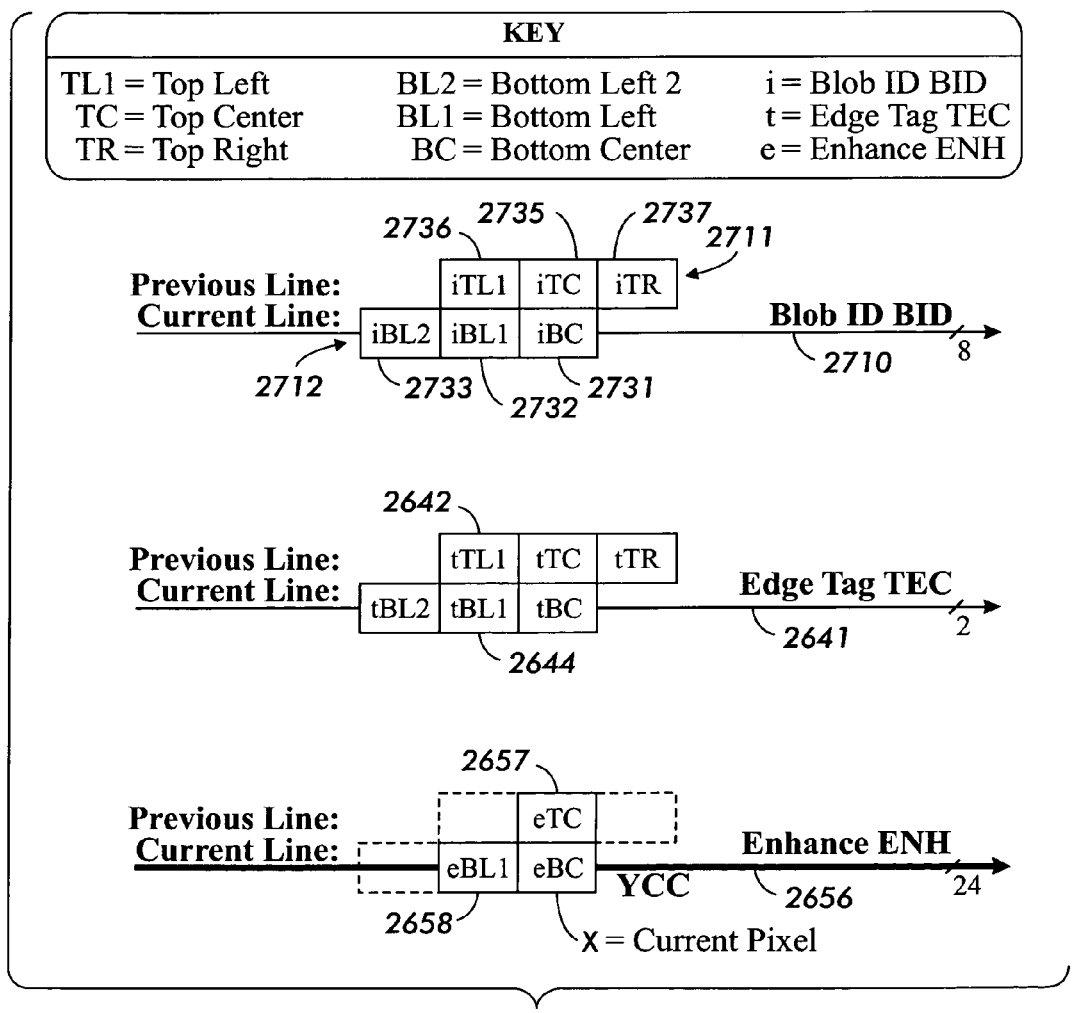
FIG. 8 illustrates a first exemplary embodiment of the current pixel and the context pixels and the data that is used for each of those pixels in one exemplary embodiment of the top-to-bottom module of FIG. 7 according to this invention.

FIG. 8 illustrates one exemplary embodiment of the context pixels surrounding a current pixel of interest, and the particular signals, that are used by the top-to-bottom module 2730 to determine the scan table for the current scan line, i.e., the local table of blobs signal. As shown in FIG. 8, for a current pixel of interest 2731, the context pixels include a left-adjacent pixel 2732 and a second left-adjacent pixel 2733 that is adjacent to the left adjacent pixel 2732. It should be appreciated that the current pixel of interest 2731 and the left-adjacent pixels 2732 and 2733 are within the current scan line being analyzed. Three additional context pixels, including a top-adjacent pixel 2735, a top-left-adjacent pixel 2736 and a top-right-adjacent pixel 2737, which are pixels within a previous scan line, are also included in the context pixels that are adjacent to the current pixel of interest 2731.

It should be appreciated that not all of these context pixels need be used. For example, the top-left-adjacent and top-right-adjacent context pixels 2736 and 2737 are used to avoid consuming a large number of blob IDs for diagonally-oriented lines or edges that occur within the image data. In particular, because of the way the blobs are combined, regions which should be in a single blob, but which extend diagonally relative to the image axes, tend to be treated as separate blobs by the top-to-bottom module 2730. While these blobs will be combined into a single blob by the bottom-to-top module 2740, is often preferable, especially if there are hardware or and/or software limits on the number of blobs that can be identified within any single scan line, to use the top-left-adjacent or the top-right-adjacent context pixels to permit blobs in the current scan line to be appropriately merged with blobs in the previous scan line that are diagonally adjacent to the current pixel of interest. Similarly, the second left-adjacent pixel can also be used to ensure that blobs that have a single intervening pixel, i.e., the left-adjacent pixel 2732, between the two pixels 2731 and 2733, when intended to be part of the same blob, do not result in two different blobs being identified. Thus, these additional context pixels allow fewer blob identification values to be consumed. However, if the number of blob identification values is not critical or otherwise desirably limited, these additional context pixels can be omitted if desired.

As shown in FIG. 8, the tri-state edge continuity value TEC for each of the current pixel of interest 2731 and each of the context pixels 2732-2737 is used by the top-to-bottom module 2730 when determining the blob ID value iBC for the current pixel of interest 2731. As also shown in FIG. 8, the top-to-bottom module 2730 uses the previously-assigned blob identification values BID for the context pixels 2732-2737 when determining which blob ID value BID to assign to the current pixel of interest 2731. Finally, in this first exemplary embodiment, the top-to-bottom module 2730, in certain circumstances, uses the enhanced image data values ENH for the left-adjacent pixel 2732 and the top-adjacent pixel 2735 when determining which blob ID value BID to assign to the current pixel of interest 2731. Thus, as shown in FIG. 8, the top-to-bottom module 2730, at any time, uses a previous line portion 2711 and a current line portion 2712 of the blob identification signal BID, a previous line portion 2743 and a current line portion 2644 of the tri-state edge continuity signal TEC, and a previous line portion 2657 and a current line portion 2658 of the enhanced image data signal ENH.

As shown in FIG. 8, in this exemplary embodiment, the context data includes three pixel values from the previous line 2711 of the blob ID signal BID and three pixel values from the previous line 2643 of the tri-state edge continuity signal TEC, as well as the values for the two previous pixels in the current line 2712 of the blob ID signal BID and of the tri-state edge continuity signal TEC, as well as the tri-state edge continuity value TEC of the current pixel 2731. Thus, there are a total of five blob ID values BID and six tri-state edge continuity values TEC for the current pixel of interest 2731 and the context pixels 2732-2737 that can be used.

In addition, the top-to-bottom module 2730 uses the three color values from the enhanced image data signal ENH output on the signal line 2656. It should be appreciated, as outlined above, that the enhanced image data signal ENH is a full-color non-sub-sampled color signal, which is, in various exemplary embodiments, in a YCC color space. However, as indicated above, in various exemplary embodiments the color values of only the current pixel 2731 and of the left-adjacent and top-adjacent pixels 2732 and 2735 are used. This occurs because the majority of the blob ID value BID assignments for the current pixel of interest 2731 are made by the top-to-bottom module based solely on the tri-state edge continuity values TEC of the current pixel of interest 2731 and of the context pixels 2732-2737. However, in a few cases, the top-to-bottom module uses the enhanced image data values ENH for the left-adjacent and the top-adjacent pixels 2732 and 2735 to check the color consistency of the blobs associated with the left-adjacent and the top-adjacent pixels 2732 and 2735 of the current pixel of interest 2731.

Figure 9:
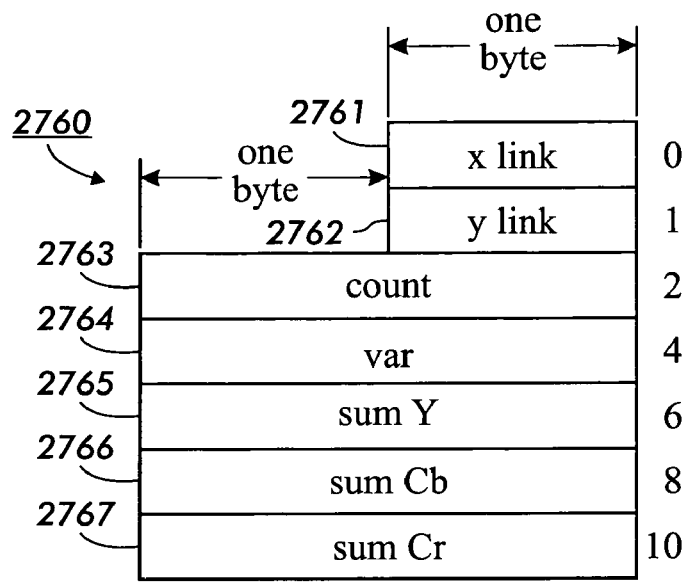
FIG. 9 illustrates a first exemplary embodiment of a scan table entry generated by the top-to-bottom module according to this invention.

FIG. 9 shows one exemplary embodiment of a scan table entry 2760, i.e., an entry in the local table of blobs, for a given blob ID value. As shown in FIG. 9, in this first exemplary embodiment, each scan table entry 2760 includes a 1-byte x-link value 2761 and a 1-byte y-link value 2762. Each scan table entry 2760 also includes 2-byte values 2763-2767 that respectively indicate a count of pixels within the current scan line that have been assigned the corresponding blob ID value, an accumulated measure of the blob color variance, a sum of the blob pixel luminance values, a sum of the first blob pixel chrominance values, and a sum of the second blob pixel chrominance values. The x-link 2761 is an index or pointer that points to a next horizontally-linked blob. Similarly, the y-link 2762 is an index or pointer that points to a vertically linked blob that appears in the subsequent scan line at the locations below the current blob. The operation and use of the x-links 2761 and y-links 2762 will be described in greater detail below with respect to FIG. 15.

It should be appreciated that, in various exemplary embodiments according to this invention, the x-link field 2761 is used to point to another scan table entries 2760 of the same scan table 2750 that is linked to the current scan table entry 2760 as being part of the same blob. Similarly, the y-link field 2762 in each scan table entry 2760 is used to point to a scan table entry 2760 appearing in a scan table 2750 for an immediately following scan line to the scan line associated with the scan table 2750 containing that scan table entry 2760. Like the x-links 2761, each y-link 2762 is used to point to another scan table entry 2760 that contains a blob that is vertically adjacent to the blob contained in the current scan table entry 2760, and thus is part of the same blob.

It should be appreciated that, in various exemplary embodiments, the values for the x-link fields 2761, when the scan table entry 2760 containing those fields is first initialized, are set to the blob ID value BID of that scan table entry 2760. Thus, when a scan table entry 2760 is first initialized, the x-table field 2761 of that scan table entry 2760 point to that scan table entry 2760. When a scan table entry 2760 is updated to have its x-link field 2761 updated to point to another scan table entry 2760, that other scan table entry 2760 has its x-field 2761 updated to point back to that first scan table entry 2760. Thus, the x-link fields 2761 for a set of linked scan table entries 2760 are circular.

The top-to-bottom module 2730 generates one scan table 2750 for each scan line, and delivers the generated collection of scan tables 2750 to the bottom-to-top module 2740 for further processing. Each scan table 2750, and thus each scan line, may contain up to 255 ($2^8-1$) valid blob identifications, and thus 255 separate scan table entries 2760. The 256th valid blob identification, corresponding to the "00" scan table entry, has a blob identification value for the current scan line of "0", and is reserved in each scan table 2750 for pixels assigned to the background grayscale plane. As shown in FIG. 9, in this first exemplary embodiment each scan table entry 2760 in the scan table 2750 occupies 12 bytes of memory.

It should be appreciated that each table entry 2760, as shown in FIG. 9, within a particular scan table 2750 is equivalent to one group of pixels, within the scan line that corresponds to that scan table, that form a region or blob having similar image characteristics. The basic image characteristics that define a region or blob are that the pixels belonging to that region or blob agree in edge continuity and have approximately the same color. However, it should be appreciated that the pixels in a given blob within a given scan line do not have to be contiguous.

The three sums of the luminance and the first and second chrominance values stored in the fields 2765, 2766 and 2767 are used in a subsequent module to determine the average blob color. The x-link and y-link values stored in the fields 2761 and 2762 allow blobs to be temporarily linked until the linked blobs can be processed or merged together as necessary by the top-to-bottom module 2730, as outlined above, or the bottom-to-top module 2740, which is discussed in greater detail below.

Figure 10:
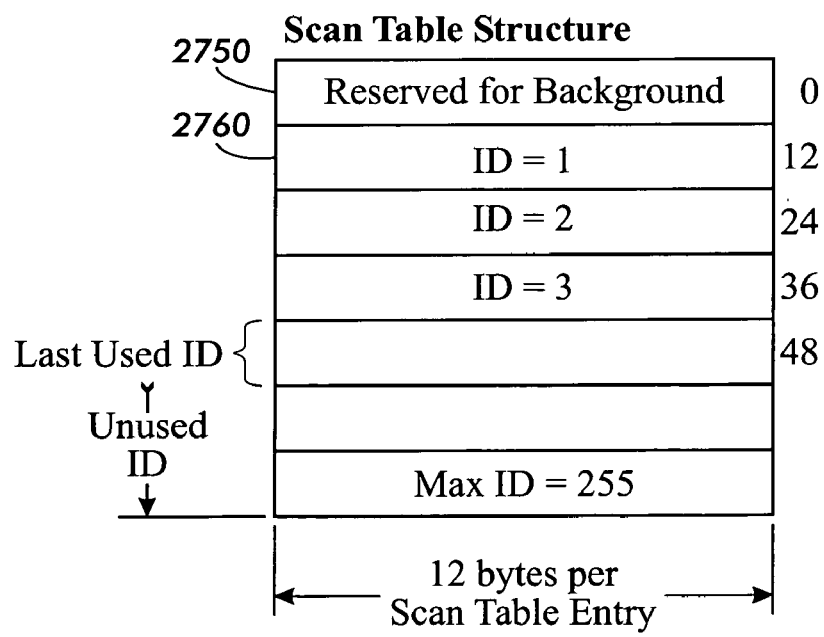
FIG. 10 illustrates a first exemplary embodiment of the structure of the scan table or local table of blobs generated by the top-to-bottom module according to this invention.

FIG. 10 illustrates one exemplary embodiment of the scan table structure 2750 as output by the top-to-bottom module 2730 over the signal line 2754 to the bottom-to-top module 2740. As shown in FIG. 10, in this first exemplary embodiment, each scan table structure 2750, which corresponds to a particular scan line in the enhanced image data signal ENH, comprises 3,072 bits of memory. As shown in FIG. 10, the scan table structure 2750 is divided into 256 12-byte scan table entries 2760, where each scan table entry 2760 is assigned a specific blob ID value. Thus, the zeroth-eleventh bytes of the scan table structure 2750 correspond to the scan table entry 2760 that is assigned the blob ID "0" for this scan line, while the twelfth-twenty third bits correspond to the scan table entry 2760 that is assigned the blob ID value "1", and so on.

The content of each scan table structure 2750 is created by the top-to-bottom module 2730 as it processes the corresponding scan line of the enhanced image data ENH in raster-scan order, for example, from a left side of the enhanced image data ENH to a right side of the enhanced image data ENH. However, it should be appreciated that the top-to-bottom module 2730 can operate along the same principles as outlined herein from right to left. Likewise, the top-to-bottom module 2730, rather than operating from top to bottom, can operate from bottom to top. In this case, the previous scan line would appear under, rather than over, the final current scan line in FIG. 8. In this case, the bottom-to-top module 2740 would actually operate from top to bottom to convert the local scan tables or local table of blobs 2750 into the final global of table of blobs GTB.

As various pixels along the scan line are analyzed, new blob ID values BID may be allocated as needed. In this case, in FIG. 10, a new set of data, as a new scan table entry 2760, would be added to the scan table structure 2750 at the set of 12 bytes that immediately follow the last used 12-byte scan table entry 2760. As the top-to-bottom module 2730 analyzes each subsequent pixel as the current pixel of interest, some of the previously-allocated blob ID values BID may be merged together, with only one such blob ID value BID surviving, or one or more blob ID values may be removed altogether, such as, for example, when the corresponding pixels are added to the background grayscale plane. It should be appreciated that the new blob ID values BID are, in various exemplary embodiments, allocated in a manner that is similar to a stack mechanism, with the unused blob IDs, i.e., unused scan table entries 2760, at the bottom of the stack. In this case, when a particular blob ID value BID is lost by merging the pixels corresponding to that blob into another blob, that blob ID value BID is marked as unused by so marking the corresponding scan table entry 2760. In various exemplary embodiments, the blob ID values BID can be altered relative to the scan table entries 2760 to ensure that the various blob ID values are used continuously.

Figure 11:
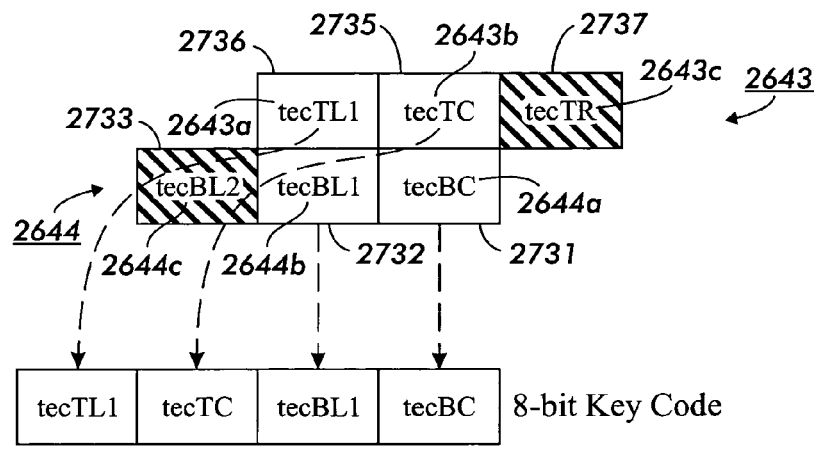
FIG. 11 illustrates how the key code that is usable to determine the action code for the current pixel is generated from the tri-state edge continuity values for the current pixel and three surrounding context pixels.

FIG. 11 illustrates one exemplary embodiment of how the 2-bit tri-state edge continuity values 2644A-2644C and 2643A-2643C of the tri-state edge continuity signal TEC for the current pixel interest 2731 and for the context pixels 2732-2737 can be used to form an 8-bit key code that can be used, for example, by using a look-up table, to identify the particular action to be taken to assign the current pixel interest 2731 with the blob ID value iBC shown in FIG. 8. As shown in FIG. 11, in various exemplary embodiments, only the 2-bit tri-state edge continuity values 2744A, 2644B, 2643A and 2643B for the current pixel interest 2731, in the left-adjacent pixel 2732, the top-adjacent pixel 2735 and the top-left-adjacent pixel 2736 are used to form the 8-bit key code.

The tri-state edge continuity signal TEC may use a 2-bit value "01" to indicate a strong positive edge, a 2-bit value "10" to indicate no edge, and a 2-bit value "11" to indicate a strong positive edge. Thus, it should be appreciated that a value of "00" for the 2-bit tri-state edge continuity value is not valid.

TABLE 2

| Action Code | Action Name | Meaning |
| --- | --- | --- |
| 00 | ActError | Invalid action (error) |
| 01 | ActMrgBgd | Merge to Background |
| 02 | ActMrgLft | Merge Left |
| 03 | ActMrgDia | Merge Diagonal |
| 04 | ActMrgTop | Merge with Top |
| 05 | ActMrgBth | Merge Both |
| 06 | ActMrgChk | Merge Check |
| 07 | ActNewBlb | Assign New Blob |

Table 2 illustrates one exemplary embodiment of seven potential actions, which the 8-bit key code, when generated as shown in FIG. 1, can be used to indicate, that can be taken relative to the current pixel of interest 2731, the left-adjacent pixel 2732, the top-adjacent pixel 2735 and/or the top-left-adjacent pixel 2736, to assign the current pixel of interest 2731 with a blob identification value BID and/or to update the previously assigned blob ID values BID of the left-adjacent pixel 2732, the top-adjacent pixel 2735 and/or the top-left-adjacent pixel 2736. As shown in Table 2, when the action code is "01", the action taken to the pixel of interest 2731, and possibly to one or more of the context pixels 2732-2737, is "Merge to Background". The other actions include "Merge Left", having an action code of "02", "Merge Diagonal", having an action code of "03", "Merge with Top", having an action code of "04", "Merge with Both (left and top)", having an action code of "05", "Merge Check", which merges based on similarity of color values and has an action code of "06" and "Assigns a New Blob" identification value, having an action code of "07". The particular actions taken against the blob IDs for the current pixel interest 2731 and/or one or more of the context pixels 2732-2737 will be described in greater detail below.

TABLE 3

| Key Code | Action Table |
|---|---|
| 00000000 | ActError (0) |
| 00000001 | ActError (0) |
| 00000010 | ActError (0) |
| . | . |
| . | . |
| . | . |
| 01010101 | ActMrgBth (5) |
| . | . |
| . | . |
| 11111111 | ActMrgBth (5) |

Table 3 illustrates one exemplary embodiment of an action table according to this invention. As shown in Table 3, for a given 8-bit key code, the action table indicates which of the actions outlined above in Table 2 is to be taken given that combination of four 2-bit tri-state edge continuity values TEC for the current pixel of interest 2731 and the adjacent context pixels 2732, 2735 and 2736.

The action table shown in Table 3 contains the 3-bit action code that is to be applied to the current pixel of interest 2731, and which possibly may affect the blob ID values BID associated with one or more of the context pixels 2732-2737. In various exemplary embodiments, the action table shown in Table 3 is implemented as a look-up table. In this case, the key code is assembled from the tri-state edge continuity values TEC of the current pixel of interest 2731 and the context pixels 2732, 2735 and 2736, as shown in FIG. 11 and outlined above. The 8-bit key code is then used as an address to the look-up table storing the action table. Using the 8-bit key code as an address, the corresponding action is output from the action table and executed by the top-to-bottom module 2730 to assign the current pixel of interest 2731 to a currently active blob, to the background plane, or with a new blob ID value BID. The particular action each key code is assigned to is, in various exemplary embodiments, pre-loaded into the action table in accordance the best action to apply based on a pattern matching technique.

It should be appreciated that, in Table 3, there are only 81 valid action key code values of the 256 possible key codes, due to the tri-state edge continuity signal TEC having only three possible values for each of the four 2-bit portions used to create the 8-bit key code. Thus, rather than there being $2^8$, or 256, possible valid actions, there are only $3^4$, or 81, valid 8-bit key codes that do not result in the action error code. That is, any 8-bit key code that has the value "00" for any of the first and second, third and fourth, fifth and sixth, or seventh and eighth bit pairs indicates that the tri-state edge continuity value TEC for one of the pixels 2731, 2732, 2735 or 2736 was not properly defined. This is shown in Table 3, where the 8-bit codes "0000000" and the like correspond to the "00" or "invalid action (error)" action code.

As will be described in greater detail below, the merge function takes as arguments a current line blob index value idB, which is a pointer to a scan table entry 2760 of the scan table 2750 for the current scan line, a previous line blob index value idT, which is a pointer to a scan table entry 2760 of the scan table 2750 for the previous scan line, the x-link 2761 of the scan table entry 2760 of the current line scan table 2750 pointed to by the current line blob index idB and the y-link 2762 of the scan table entry 2760 of the previous line scan table 2750 pointed to by the previous line blob index idT. In particular, the current line blob index idB is set to the blob ID value BID of an active and valid blob contained within one of the scan table entries 2760 of the scan table 2750 for the current line based on the particular action the 8-bit key code is associated with. Similarly, the previous line blob index value idT is set to the blob ID value BID of an active and valid blob contained within one of the scan table entries 2760 of the scan table 2750 for the previous scan line. The merge function, in various situations, uses the y-link field 2762 of the scan table entry 2760 within the scan table 2750 for the previous line pointed to by the previous line blob index value idT. Similarly, the merge function, in various situations, uses the x-link field 2761 in the scan table entry 2760 of the scan table 2750 for the current line pointed to by the index value idB.

As indicated above, there are seven valid actions that can be performed to determine the blob ID value BID to be assigned to the current pixel of interest 2731 and possibly to update or alter the blob ID values BID assigned to one or more of the context pixels 2132-2137. When the action code is "01", the Merge to Background action is performed to merge at least the current pixel 2731 into the grayscale background plane, by assigning the grayscale background blob ID value "00" to the current pixel 2731. As indicated above, this is the blob ID value reserved for the background plane. The Merge to Background action is performed when the tri-state edge continuity value TEC of the current pixel 2731 disagrees with the tri-state edge continuity values TEC of the neighboring context pixels 2732, 2735 and 2736 and the tri-state edge continuity values TEC of the neighboring context pixels 2732, 2735 and 2736 are not all the same value, i.e., when all three tri-state edge continuity values TEC appear in some combination for the current pixel of interest 2731 and the context pixels 2732, 2735 and 2736. In addition to setting the blob ID value BID of the current pixel of interest 2731 to the background plane value "00", the blob ID image BID at the current pixel location is correspondingly set to 0, indicating a background pixel at that location of the blob ID image BID.

In addition, because the tri-state edge continuity value TEC of the current pixel of interest 2731 and the tri-state edge continuity values TEC of at least two of the context pixels 2732, 2735 and 2736 all disagree, the regions or blobs that contain those context pixels that are directly above and to the left of the current pixel of interest 2731, i.e., the left-adjacent context pixel 2732 and the top-adjacent context pixel 2735, are "eliminated" by setting the blob ID value BID for all pixels of those blobs to the background plane value "00" as well. In particular, in various exemplary embodiments, this is accomplished by writing "0"s into each field of the scan table entry 2760 for the blob ID values BID associated with the left-adjacent pixel 2732 in the scan line table 2750 for the current line and for the top-adjacent pixel 2736 for the scan table 2750 for the previous line. Furthermore, if either of those scan table entries 2760 for the blobs containing those pixels are linked to other blobs via the x-link value 2761, the corresponding blobs so linked are also removed. This process repeats until the entire chain of linked blobs in the various scan line tables 2750 for the various scan lines are eliminated.

If the action code is "02", the "Merge Left" action is performed to merge the current pixel of interest 2731 into the same blob as the blob containing the left-adjacent pixel 2732. In particular, the Merge Left action sets the current line blob index value idB to the blob ID value BID of the left-adjacent context pixel 2732. The previous line blob index value idT is set to "−1" to indicate it is not valid to the merge function. As a consequence, when the merge function is invoked, the blob ID value BID for the current pixel of interest 2731 is set to the blob ID value BID of the left-adjacent pixel 2732, as will be discussed in detail below.

When the action code is "03", the Merge Diagonal action is performed so that the current pixel will be merged into the blob that contains the top-left-adjacent pixel 2736. In particular, the "Merge Diagonal" action, before invoking the merge function, sets the current line blob index value idB to the blob ID value of the left-adjacent pixel 2732 and the previous line blob index value idT to the blob ID of the top-adjacent pixel 2735. The merge function is then performed for the current pixel of interest 2731 based on the current and previous line index values idB and idT as set forth above. Then, in the Merge Diagonal action, the current line blob index value idB is set to "−1", the previous line blob index value idT is set to the blob ID value BID for the top-left-adjacent pixel 2736, and the merge function is re-invoked. This effectively merges the current pixel of interest 2731 into the blob that contains the top-left-adjacent pixel 2736.

When the action code is "04", the Merge with Top action is performed. The Merge with Top action causes the current pixel of interest 2731 to be merged into the same blob that contains the top-adjacent pixel 2735. In particular, the Merge with Top action sets the previous line blob index value idT for the previous line to the blob ID of the top-adjacent pixel 2735. The Merge with Top action also sets the current line blob index value idB to the invalid value "−1". The current merge function is then invoked to merge the pixel into the blob containing the top-adjacent pixel 2735.

The Merge with Both action code is invoked when the tri-state edge continuity value TEC of the current pixel of interest 2731 agrees with the tri-state edge continuity values TEC for each of the left-adjacent pixel 2732 and the top-adjacent pixel 2735. Effectively, the current pixel of interest 2731 acts to connect two previously-separated blobs that have turned out to be different portions of the same blob. When the action code is "05", the Merge with Both action merge is performed to the current pixel of interest 2731 and the two blobs that contained the two left-adjacent and top-adjacent pixels 2732 and 2735, respectively, into a single blob. In particular, the Merge with Both action sets the current line blob index value idB for the current scan line to the blob ID value BID for the left-adjacent pixel 2732, and sets the previous line blob index value idT for the previous scan line to the blob ID value BID for the top-adjacent pixel 2735.

When the action code is "06", the Merge Check action is performed. The Merge Check action is used when the tri-state edge continuity values TEC of the current pixel of interest 2731 and the three context pixels 2732, 2735 and 2736 indicate that a weak edge has occurred at at least one of the context pixels 2731, 2732, 2735, and 2736. The Merge Check action is effectively a conditional merge operation that merges the pixels based on how closely the colors of the enhanced image data signal ENH for the current pixel 2731 match those of the top-adjacent and left-adjacent pixels 2735 and 2732. It should be appreciated that, in this first exemplary embodiment, this is the action that permits the actual colors to affect the way in which the blob ID value BID is associated with the current pixel of interest 2731.

In the Merge Check action, the left-adjacent pixel and the top-adjacent pixel 2732 and 2735 are checked to see whether each of those pixels have a non-zero blob ID value associated with them, i.e., are not part of the background plane. If both of the top-adjacent pixel 2735 or the left-adjacent pixel 2732 have a "00" blob ID value, and thus are not associated with any blob, but are part of the background plane, then there is nothing to check. In this case, the current pixel 2731 is assigned the blob ID value of the background plane. That is, the blob ID for the current pixel of interest 2731 is set to "00". It should be appreciated that the Merge Check action is a frequent shortcut that can speed up the performance of the top-to-bottom module.

If either of the blob ID values BID for the left-adjacent and the top-adjacent pixels 2732 and 2735 are actually set to a non-zero blob ID value BID, the sums of the absolute values of the color differences between the enhanced image data value ENH for the current pixel of interest 2731 and the enhanced image data values ENH for the top-adjacent pixel 2735 is determined. It should be appreciated that, in this determination, the values of all three color components are used to determine the sum of the absolute values of the color difference. Similarly, the sum of the absolute values of the color differences between the enhanced image data value ENH of the current pixel 2731 and the enhanced image data value ENH of the left-adjacent pixel 2732 is determined.

In various exemplary embodiments, the larger of the two sums of the absolute values is selected as the variance measure that is stored in the variance field 2764 within the corresponding scan table entry 2760. It should be appreciated that, by using absolute values, it is possible to reduce or ideally avoid having to perform multiplication operations. In various exemplary embodiments, the variance value is then normalized by multiplying the variance value by a constant scale factor and then shifting the results eight positions to the right, which effectively divides the scaled variance measure by 256. In addition, the current line blob index value idB for the current line is set to the blob ID value BID of the left-adjacent pixel 2732. Likewise, the previous line blob index value idT for the previous line is set to the blob ID value BID of the top-adjacent pixel 2735. The blobs are then merged as outlined below.

When the action code is "07", the Assign New Blob action is performed to assign a currently unused blob ID value BID to the current pixel of interest. This occurs when the tri-state edge continuity values TEC of the current pixel of interest 2731 and of the context pixels 2732-2737 indicate that the current pixel of interest may be the first pixel of the new blob. In this Assign New Blob action, the current pixel 2731 is first analyzed to determine if the current pixel 2731 could be part of an already-existing blob that contains, of the various context pixels 2732-2737, only the top-right-adjacent pixel 2737 that lies in the previous scan line or the second left-adjacent pixel 2733 that lies in the current scan line. This check is performed because the 8-bit key code used to select action code is determined based on the tri-state edge continuity signals TEC of only the current pixel of interest 2731 and the context pixels 2732, 2735 and 2736, and thus excludes the tri-state edge continuity values TEC of the top-right-adjacent pixel 2733 and the second left-adjacent pixel 2733.

In particular, if the tri-state edge continuity value of the current pixel of interest 2731 is the same as the tri-state edge continuity value TEC of the top-right-adjacent pixel 2737, the previous line blob index value idT for the previous scan line is set to the blob ID value BID of the top-right-adjacent pixel 2737. Similarly, if the tri-state edge continuity value TEC of the current pixel of interest 2731 is the same as the tri-state edge continuity value TEC of the second-left pixel 2733, the current line blob index value idB for the current scan line is set to the blob ID value BID of the second-left context pixel 2733. If the tri-state edge continuity value TEC of the top-right-adjacent pixel 2737 or the second-left-adjacent pixel 2733 is different from the tri-state edge continuity value TEC of the current pixel of interest 2731, the previous line blob index value idT for the previous scan line or the current line blob index value idB for the current scan line, respectively, is set to, or remains at, "−1", indicating that these context pixels do not represent valid blobs. The merge function is then used to create the new blob ID value for the current pixel of interest 2731 and to enter the data for the new blob into an unused scan table entry 2760 in the scan line table 2750 for the current scan line.

The merge function performed by the top-to-bottom module 2730, as indicated above, uses the current and previous line blob index values idB and idT for the current pixel of interest 2731 to determine how to merge the current pixel of interest 2731 into the background plane or one of the previously defined blobs, or to start a new blob with the current pixel of interest 2731. It should be appreciated that, in various exemplary embodiments, the merge function gives priority to merging the current pixel of interest 2731 with blobs containing the top-adjacent pixels 2735-2737 over the blobs containing the left-adjacent pixels 2735-2737. The merge function is executed by first checking to see if the previous line blob index value idT for the previous scan line is empty, i.e., is set to "0". If the top index value idT is not empty, the scan table entry 2760 for the blob ID value BID contained in the previous line blob index value idT is checked to determine if that blob is horizontally linked. If not, the merge function removes the scan table entry 2760 for the blob pointed to by the current line blob index idB from the current line scan table 2750. Similarly, the merge function checks the current line blob index value idB for the current line to determine if it is empty, i.e., set to "0". If the current line blob index idB is empty, or, if not empty, the blob pointed to by the index value idB is not horizontally linked, the scan table entry 2760 for the blob pointed to by the previous line blob index value idT in the previous scan line is removed from the previous scan line table 2750.

However, if both of the previous and current line blob index values idT and idB for the previous and current scan lines point to valid blobs, i.e., point to valid scan table entries 2760 in the corresponding scan line tables 2750, the merge function merges the blobs defined in the two scan table entries 2760 pointed to by the current and previous line blob index values idB and idT together into a single blob. It should be appreciated that the merging process can have several cases, depending on if those scan table entries 2760 contain any valid data in their x-link and/or y-link fields 2761 and 2762.

If the scan table entry 2760 in the previous line scan table 2750 pointed to by the previous line blob index value idT contains a non-zero value in its y-link field 2761, then that scan table entry 2760 has already been linked to another scan table entry 2760 in the current line scan table 2750. In this case, the scan table entry 2760 in the current line scan table 2750 is selected and merged with the scan table entry 2760 of the current line scan table 2750 that is pointed to by the current line blob index value idB, thus forming a horizontal link between these two scan table entries 2760 using the x-link fields 2761 in the two scan table entries 2760. As indicated above, since the list of x-link values in the various linked scan table entries 2760 is circular, the x-link fields 2761 of both of the scan table entries 2760 must be updated to preserve this circularity.

For example, for a given pixel of interest 2731, the previous line blob index value idT is 2 and the current line blob index value idB is 6. That is, idT=2 and idB=6. This indicates that the second scan table entry 2760 in the previous line scan table 2750 is to be merged with the sixth scan table entry 2760 of the current line scan table 2750. If, for example, the second scan table entry 2760 in the previous line scan table 2750 has a value of "3" in its y-link field 2762, the y-link field 2761 in the second scan table entry 2760 for the previous line scan table 2750 is linked to the third scan table entry 2760 in the current line scan table 2750. In this case, the merger can be accomplished by connecting the third and sixth scan table entries 2760 of the scan table 2750 for the current line through their x-link fields 2761.

In this case, there are three possibilities for the value of the x-link field 2760 in the sixth scan table entry 2760 of the scan table 2750 for this current line, namely, the x-link field 2761 of this scan table entry 2760 points to itself, points to a third scan table entry in the current scan table 2750, or points to the background plane. The x-link field 2761 of the sixth scan table entry 2760 will point to the background plane when the value stored in the x-link field 2761 is "0". In this case, the merger cannot be performed. Instead, both of the second scan table entry 2760 of the scan table 2750 of the previous scan line and the sixth scan table entry 2760 of the scan table 2750 of the current line must be removed from the corresponding scan tables 2750. As indicated above, this removal is accomplished by writing 12 bytes of "0" in the corresponding scan table entries 2760.

If the sixth scan table entry 2760 pointed to by the current line blob index value idB was not horizontally connected to any other scan table entry 2760, then the x-link field 2761 of that scan table entry 2760 should contain the block ID value BID of that scan table entry 2760, due to the circular nature of the x-links. In this case, the blob ID values BID contained in the x-link fields 2761 of those two scan table entries 2760 within the same scan table 2750 are switched. As a result, each of these two scan table entries 2760 of the scan table 2750 for the current scan line point to each other, via the values stored in their x-link fields 2761.

In a third case, if the sixth scan table entry 2760 of the scan table 2750 of the current scan line, which is pointed to by the current line blob index value idB, already contains a link to another scan table entry 2760 in the scan table 2750 of the current scan line, as indicated by the value in its x-link field 2761, then, to merge the third scan table entry 2760 of the scan table 2750 of the current scan line, which is pointed to by the y-link field 2762 of the second scan table entry 2760 of the scan table 2750 of the previous scan line, the list of circular x-link values must be modified to include this third scan table entry 2760. In particular, the x-link field 2761 of the sixth scan table entry 2760, which originally pointed to the other scan table entry 2760 of the scan table 2750 of the current scan line is modified to point to the third scan table entry 2760. Then, the x-link field of the third scan table entry 2760 is modified to point to the other scan table entry 2760 originally pointed to by the x-link field 2761 of the sixth scan table entry 2760. The merge function then returns the blob ID value BID of the third scan table entry 2760. In various exemplary embodiments, this scan table entry 2760 is selected because it is linked to this circular list of scan table entries 2760 by the y-link of the scan table entry 2760 of the previous scan line pointed to by the previous line blob index value idT.

In the above-outlined situation, the scan table entry 2760 pointed to by the previous line blob index value idT had a value in its y-link field that pointed to another scan table entry 2760 in the current scan line. In other situations, however, the scan table entry 2760 in the previous line scan table 2750 will have a y-link value that does not point to any valid scan table entry 2760 in the current line scan table 2750. In this case, the merger proceeds by forming a vertical link from the scan table entry 2760 in the scan table 2750 in the previous line scan table 2750 pointed to by the previous line blob index value idT to the scan table entry 2760 of the scan table 2750 for the current line pointed to by the current line blob index value idB, by changing the y-link field 2762 of the scan table entry 2760 pointed to by the previous line blob index value idT to point to the scan table entry 2760 pointed by the current line blob index value idB.

If the x-link field 2761 of that scan table entry 2760 pointed to by the previous line blob index value idT happens to point only to itself, then nothing else needs to be done. However, if the scan table entry 2760 pointed to by the previous line blob index value idT happens to have a value in its x-link field 2761 that points to another scan table entry 2760 in the scan table 2750 for the previous scan line, then each such scan table entry 2760 in that circular list of x-linked scan table entries 2760 that includes the scan table entry 2760 pointed to by the previous line blob index value idT must all have their y-link fields 2762 updated to point to the scan table entry 2760 of the scan table 2750 for the current scan line that is pointed to by the current line blob index value idB. The merge function then returns the blob ID value BID of the scan table entry 2760 pointed to by the current line blob index value idB as the blob ID value BID of the merged entity.

When the merge function inputs the current and previous line blob index values idB and idT, but the previous line blob index value idT is set to "−1", while the current line blob index value idB has a non-zero, non-negative value, then there is a valid blob that includes the left-adjacent pixel 2732 but no valid blob includes the top-adjacent pixel 2735. In this case, the merge function can merge the current pixel of interest 2731 only with the blob that includes the left-adjacent pixel 2732. Accordingly, the merge function returns the blob ID value BID of the scan table entry 2760 that contains the left-adjacent pixel 2732 as the blob ID value BID for the current pixel of interest 2732. In particular, this is simply performed by returning the current line blob index value idB as the blob ID value BID for the current pixel of interest 2731.

In contrast, if the merge function is invoked with the current line blob index value idB set to "−1" and the previous line blob index value idT having a non-zero, non-negative value, then there is a valid blob that includes the top-adjacent pixel 2735, but no value blob contains the left-adjacent pixel 2732. In this case, the merge function will first check to determine if the scan table entry 2760 pointed to by the previous line blob index value idT in the scan table 2750 for the previous scan line points to another scan table entry 2760 in the scan table 2750 for the current scan line, i.e., has a non-zero value in the y-link field 2762. If so, the blob ID value for the scan table entry 2760 in the scan table 2750 for the current scan line that is pointed to by the y-link field 2762 of the scan table 2760 that is pointed to by the previous line blob index value idT is returned as the blob ID value BID for the current pixel of interest.

In contrast, if the scan table entry 2760 pointed to by the previous line blob index value idT does not point to a scan table entry 2760 in the scan table 2750 for the current scan line, i.e., does not have a valid value in its y-link field 2762, then the merge function assigns a new blob ID value to the current pixel of interest 2731, and thus creates a new scan table entry 2760 in the scan table 2750 for the current scan line. The merge function also sets the y-link field of the scan table entry 2760 pointed to by the previous line blob index value idT to point to this new scan table entry 2760 in the scan table 2750 for the current scan line. Finally, the merge function sets the x-link for the new scan table entry 2760 in the scan table 2750 for the current scan line to point to itself and returns the blob ID value of this new scan table entry 2760 as the blob ID value BID for the current pixel of interest 2731.

If both of the current and previous blob index values idT and idB are set to "−1", then there are no valid blobs to merge with the current pixel of interest 2731 that contain either the top-adjacent pixel 2735 or the left-adjacent pixel 2732. In this case, the merge function creates a new scan table entry 2760 in the scan table 2750 for the current scan line, assigns a new blob ID value to that scan table entry 2760, sets the x-link field 2761 to that new blob ID value so that that scan table entry 2760 points to itself, and returns the new blob ID value as the blob ID value BID for the current pixel of interest 2731.

It should be appreciated that the merge function may be called twice. The first time the merge function is called, the merge function is always called with the current and previous blob index values idB and idT set as outlined above for the particular action code that is used to invoke the merge function. However, if the action code that is used to invoke the merge function is the Merge Diagonally action code, the merge function is called for a second time. During this second call of the merge function, the current line blob index value idB is set to "−1" and the previous line blob index value idT is set to the blob ID value BID for the top-left adjacent pixel to merge the current pixel of interest 2731 with the top-left-adjacent pixel 2736.

It should also be appreciated that the value returned by the merge function is used to set the value in the blob ID image BID for the location in the blob ID image BID of the current pixel of interest 2731. As outlined above, the blob ID image BID is an 8-bit grayscale image that contains a blob index value at each pixel location. As indicated above, the background grayscale plane is indicated by a blob index value of 0 at the pixel locations that are merged into the background grayscale plane. The other locations in the blob ID image contain the blob ID values BID assigned in the corresponding scan table 2750 to the blob that contains that pixel location.

Once the merge operation regarding the current pixel of interest 2731 returns a blob ID value BID for the current pixel of interest 2731, the various fields 2763-2767 in the current scan table entry 2760 for that blob ID value BID must be updated. As indicated above, if the blob ID value returned by the merge function is 0, i.e., the background plane, these fields 2763-2767 are cleared. In contrast, if a non-zero value is returned, the various fields in the scan table entry 2760 corresponding to that blob ID value BID returned by the merge function that should be updated include the pixel count field 2763, which is increased by 1 to indicate that the current pixel of interest 2731 is contained within that blob. The variance value stored in the variance field 2764 is updated based on the variance for the current pixel of interest 2731. The luminance value for current pixel of interest 2731 is added to the running sum stored in the field 2765, while the first chrominance value of the current pixel 2731 is added into the running sum stored in the field 2766 and the second chrominance value of the current pixel 2731 is added into the running sum stored in the field 2767.

It should be appreciated that, in various exemplary embodiments, if the pixel count stored in the pixel count field 2763 exceeds 128, one or more of the above-indicated fields can be renormalized by shifting the 2-byte values stored in those fields one place to the right, i.e., by dividing by 2, to prevent overflow.

Figure 12:
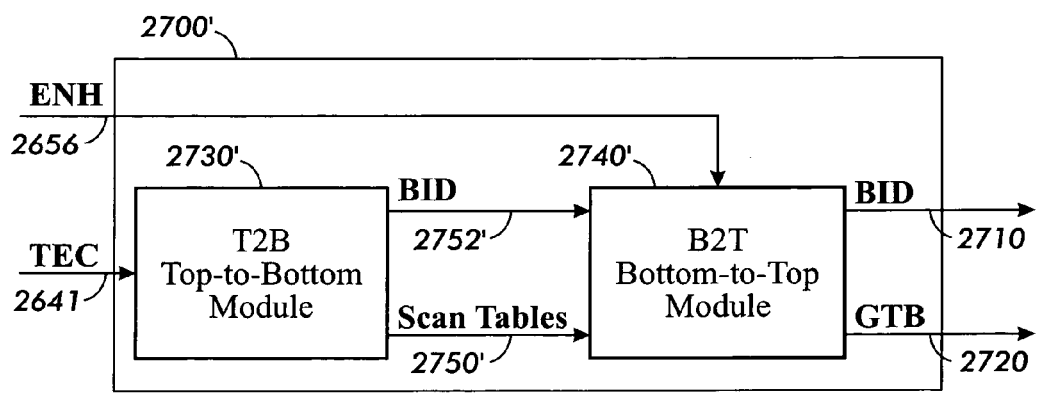
FIG. 12 illustrates a second exemplary embodiment of a blob identification module of the N-layer image data generating system of FIG. 5 according to this invention.

FIG. 12 shows a second exemplary embodiment of a blob identification module 2700' of the N-layer image data generating system 2000 shown in FIG. 5 according to this invention. As shown in FIG. 12, the second exemplary embodiment of the blob identification module 2700' is generally similar in structure to the first exemplary embodiment of the blob identification module 2700 shown in FIG. 7. However, in the second exemplary embodiment of the blob identification module 2700' shown in FIG. 12, the enhanced image data signal ENH on the signal line 2656 is input to the bottom-to-top module 2740' rather than being input to the top-to-bottom module 2730.

Figure 13:
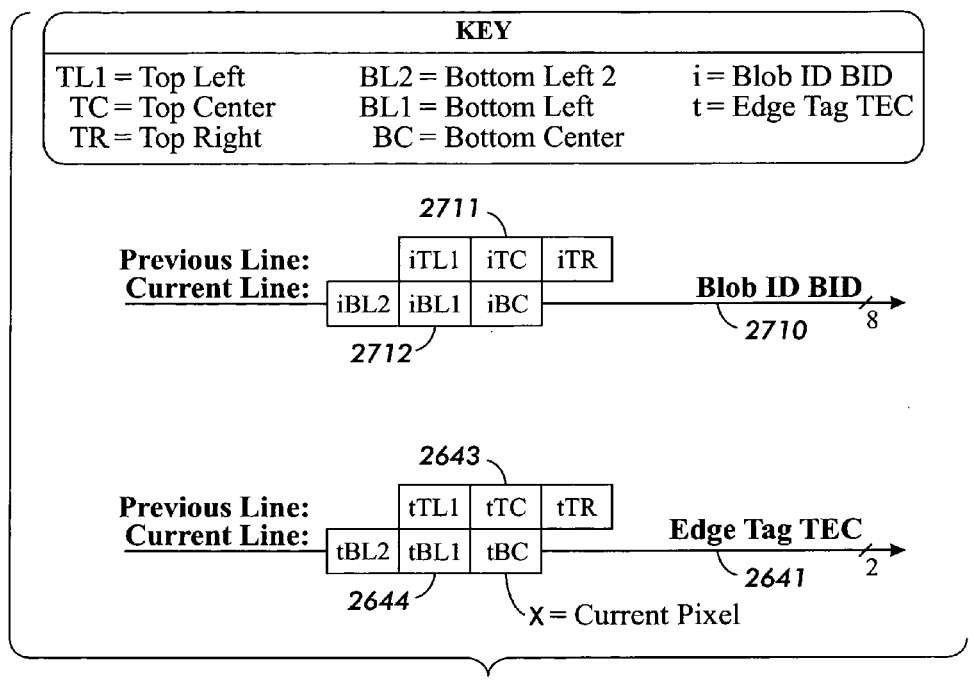
FIG. 13 illustrates a second exemplary embodiment of the current pixel and the context pixels and the data that is used for each of those pixels in one exemplary embodiment of the top-to-bottom module of FIG. 12 according to this invention.
Figure 14:
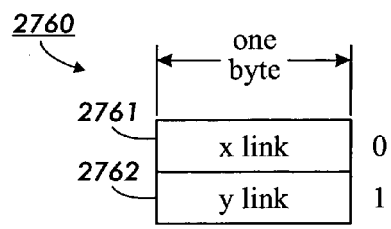
FIG. 14 illustrates a second exemplary embodiment of a scan table entry generated by the top-to-bottom module according to this invention.

Accordingly, it should be appreciated that the processing outlined above with respect to FIGS. 7 and 8, while generally the same in the second exemplary embodiment of the blob identification module 2700', operates without reference to the enhanced image data signal ENH. This is shown in FIG. 13, which shows the data for the various context pixels 2732-2737 and the current pixel of interest 2731 without reference to the enhanced image data values ENH shown in FIG. 8. Likewise, as shown in FIG. 14, the structure of the scan table entries 2760 can be significantly reduced, because the color data for the various pixels in the image data are no longer handled by the top-to-bottom module 2730', but are instead handled in the bottom-to-top module 2740'. Thus, as shown in FIG. 14, the scan table entry 2760 can be reduced to merely the x-link field 2761 and the y-link field 2762.

Additionally, because the color data for the pixels forming the blob is not contained in the scan table entries 2760, it is no longer necessary to update those values as part of the merging process as outlined above. In particular, the second exemplary embodiment of the blob identification module 2700' operates substantially similarly to the first exemplary embodiment of the blob identification module 2700 shown in FIG. 7. For example, except as noted below, the second exemplary embodiment of the blob identification module 2700' uses the same action codes as set forth in Table 2 and the same key code to action look up table, as shown in Table 3, and generates the key code in the same way as shown in FIG. 11. Furthermore, in general, the various actions outlined above with respect to the first exemplary embodiment of the blob identification module 2700 are the same in the second exemplary embodiment of the blob identification module 2700', except for the merge check action.

As outlined above, the merge check action in the first exemplary embodiment of the blob identification module 2700 operates based on the similarities between the color values for the current pixel of interest 2731 and the context pixels 2732, 2735 and 2736.

In contrast, in the second exemplary embodiment of the top-to-bottom module 2730' shown in FIG. 12, in the Merge Check action, the left-adjacent pixel 2732 and the top-adjacent pixel 2735 are checked to see whether both of those pixels have non-zero blob ID values BID associated with them, i.e., are not part of the background plane. If both of the top-adjacent pixel 2735 and the left-adjacent pixel 2732 have a "00" blob ID value, and thus are not associated with any blob, but are part of the background image plane, then there is nothing to check. In this case, the current pixel 2731 is assigned the blob ID value of the background plane. That is, the blob ID for the current pixel of interest 2731 is set to "00". It should be appreciated that, as in the first exemplary embodiment of the blob identification module 2700, the Merge Check action in this second exemplary embodiment of the blob identification module 2700' is a frequent shortcut that can speed up the performance of the top-to-bottom module 2730. In particular, this portion of the Merge Check action is extremely likely, since it occurs everywhere there are no edges and the pixel is part of the background area.

In this second exemplary embodiment of the top-to-bottom module 2730', if the blob ID values BID for either the left-adjacent pixel 2732 or the top-adjacent pixel 2735 are non-zero, then the merge function is called with the current line blob index value idB set to the blob ID value BID of the left-adjacent pixel 2732, if it is non-zero, or to −1 if it is, and the previous line blob index value idT is set to the blob ID value BID of the top-adjacent pixel 2735, if it is non-zero, or to −1 if it is, then from this point, the Merge with Top, Merge Left and/or Merge Check actions proceeds similarly to the Merge Both action.

Figure 15:
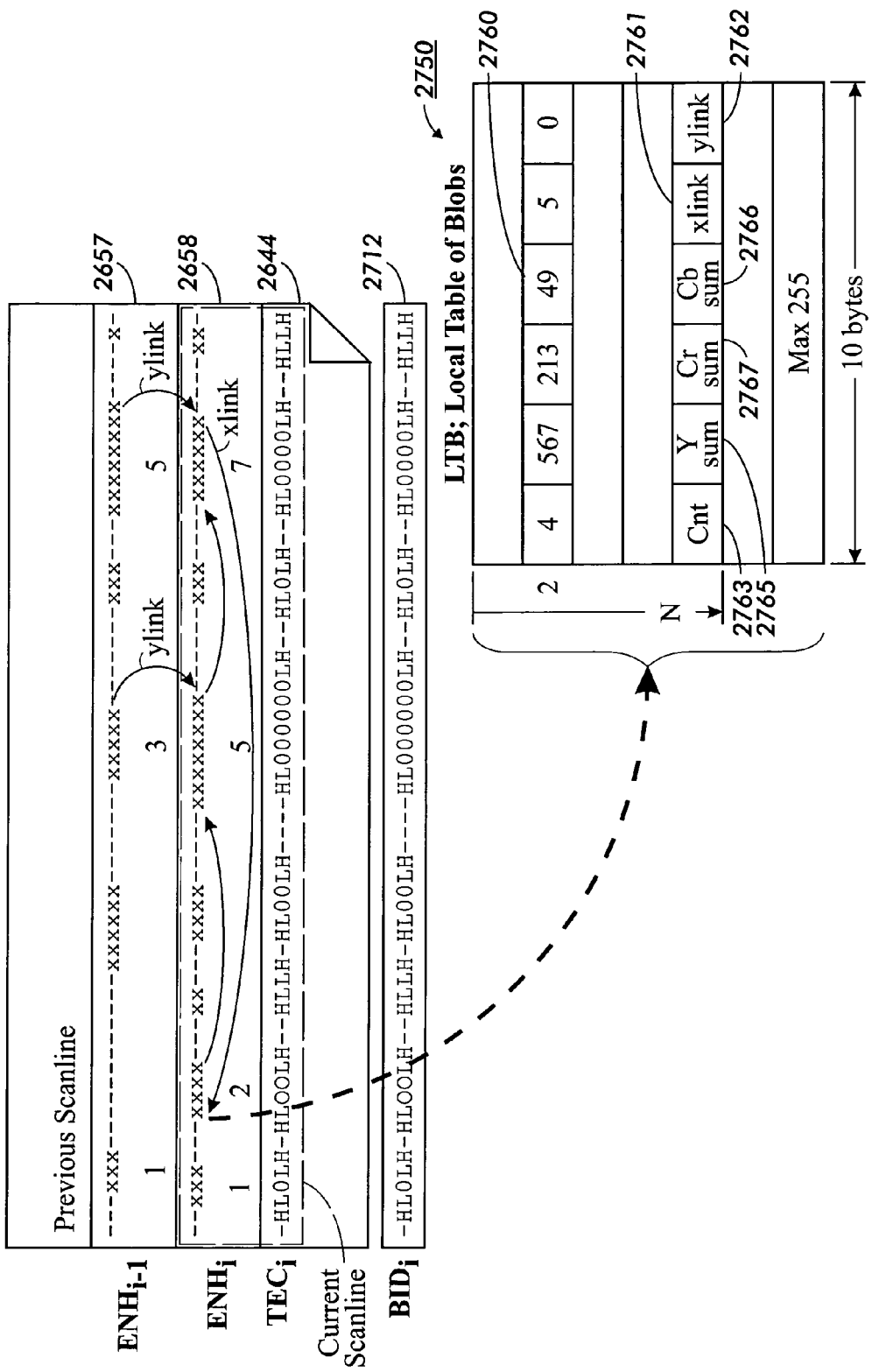
FIG. 15 illustrates one exemplary embodiment of the interrelationships between blobs identified within a current scan line and blobs identified within a previous scan line, the related tri-state edge continuity values, blob ID values, x links and y links, and the scan table according to this invention.

FIG. 15 illustrates how the x-link and y-link fields 2761 and 2762 operate to link blobs occurring in the scan table 2750 for the current line 2658 and the scan tables 2750 for the previous line 2657. FIG. 15 also shows the portion of the blob ID image BID 2712 for the current scan line 2658. Finally, FIG. 15 shows the local table of blobs or scan table 2750 for the current scan line 2758 and a particular scan table entry 2760 for the blob having the blob ID "2" for the current scan line 2758. FIG. 15 also shows the tri-state edge continuity values TEC for the pixels occurring in the current scan line 2658 that result in the blobs shown for the current scan line 2658 in FIG. 15.

As shown in FIG. 15, a previous scan line 2657 has a number of blobs identified in it, represented by the "x" characters. Furthermore, as shown in FIG. 15, for this previous scan line 2657, the blob having the blob index "3" contains, in the corresponding scan table entry 2760, the value "5" in the y-link field 2762, indicating that that blob is linked to the blob having the blob ID "5" in the current scan line 2658. Similarly, the blob having the blob index "5" in the previous scan line 2657 has a value of "7" in its y-link field 2762, indicating that is linked to the seventh blob of the current scan line 2658.

Similarly, in the current scan line 2658, 8 different blobs are identified. In particular, the blobs having the blob IDs "2", "5", and "7", are linked together through the x-link fields 2761 of the corresponding scan table entries 2760. In particular, the scan table entry 2760 for the blob having the blob ID "2" in the current scan line 2658 is shown in FIG. 5. As shown in this scan table entry 2760, the value 5 in the x-link field 2761 indicates that this blob is linked to the blob having the blob ID "5". Similarly, FIG. 15 indicates that the x-link field 2761 of the scan table entry 2760 corresponding to this fifth blob has a value of 7, indicating that the fifth blob is itself linked to the seventh blob. Finally, the scan table entry 2760 for the blob having the blob ID "7" has the value "2" in its x-link field 2761, indicating that that blob is connected to the second blob. Thus, the blobs 2, 5 and 7 are circularly linked via the x-link field 2761 in their respective scan table entries 2760.

Figure 16:
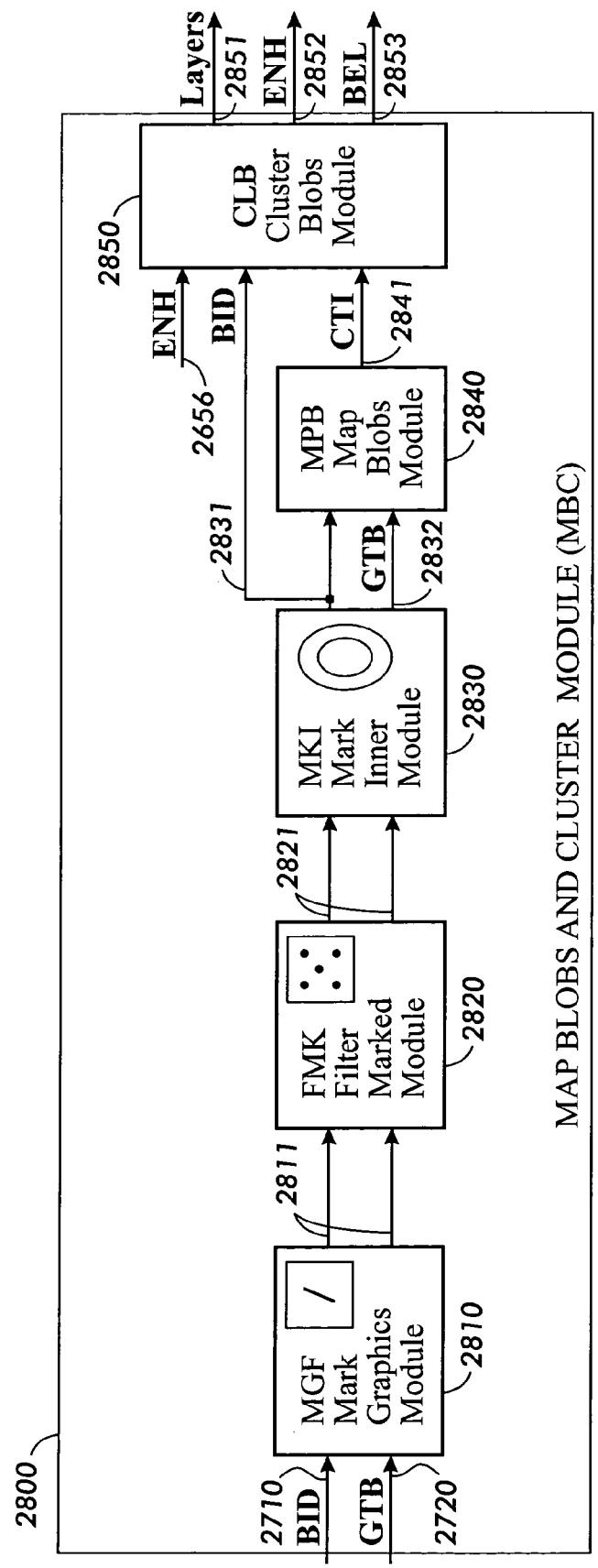
FIG. 16 illustrates one exemplary embodiment of a map blobs and cluster module of the N-layer image data generating system of FIG. 5 according to this invention.

FIG. 16 illustrates in great detail one exemplary embodiment of the map blobs and cluster module 2800. As shown in FIG. 16, the blob ID signal BID is input over a signal line 2710 and the global table of blobs signal GTB is input over a signal line 2720 to a mark graphics module 2810. The mark graphics module 2810 selects each identified blob in turn and marks that blob as a bad blob if certain conditions exist. For example, the blob can be marked as a bad blob if (1) the blob area of that blob is too small; or (2) if too few pixels of that blob are on, i.e., have non-zero color values; or (3) if the aspect ratio, i.e., the ratio of the width to the height of the blob bounding box, indicates that that blob is too narrow either vertically or horizontally, or the like. It should be appreciated that blobs can be marked as bad for any number of reasons and that this list is intended to be neither exhaustive nor limiting. The mark graphics module 2810 then outputs the blob ID signal BID and the global table of blobs signal GTB, as modified to flag the bad blobs, over the signal lines 2811 to a filter marked blobs module 2820.

The filter marked blobs module 2820 analyzes the global table of blobs to identify bad blobs that are surrounded by neighboring good blobs. Likewise, the filter marked blobs module 2820 also analyzes the global table of blobs to identify good blobs that are surrounded by neighboring bad blobs. These isolated good and bad blobs are analyzed to determine if they have similar characteristics as the neighboring bad or good blobs, respectively. If so, the isolated bad blobs will be changed to good blobs. Similarly, if isolated good blobs have similar characteristics as the neighboring bad blobs, they are also changed to bad blobs. The filter marked blobs module 2820 then removes the bad blobs from the global table of blobs, releases their blob IDs and merges the bad blobs into the background color plane. The blob ID signal BID and the global table of blobs signal GTB, as modified by the filter marked blobs module 2820, are then output on the signal lines 2821 to the marked inner blobs module 2830.

The mark inner blobs module 2830 identifies blobs that are fully contained within other blobs, such as the blobs that form the insides of the letters "o" and "e". In various exemplary embodiments, any such inner blob is merged into the background grayscale plane and its blob ID number released. In various other exemplary embodiments, the color values of that blob are analyzed to determine if that inner blob should be merged into the background. If so, as above, the inner blob is merged into the background color plane and its blob ID number released. Otherwise, that blob continues to be an active blob. It should be appreciated that, because of the way the values of the tri-state edge continuity signal TEC operates, it is generally sufficient to test one horizontal row extending through the two blobs to determine if one blob is fully inside another blob.

Figure 23:
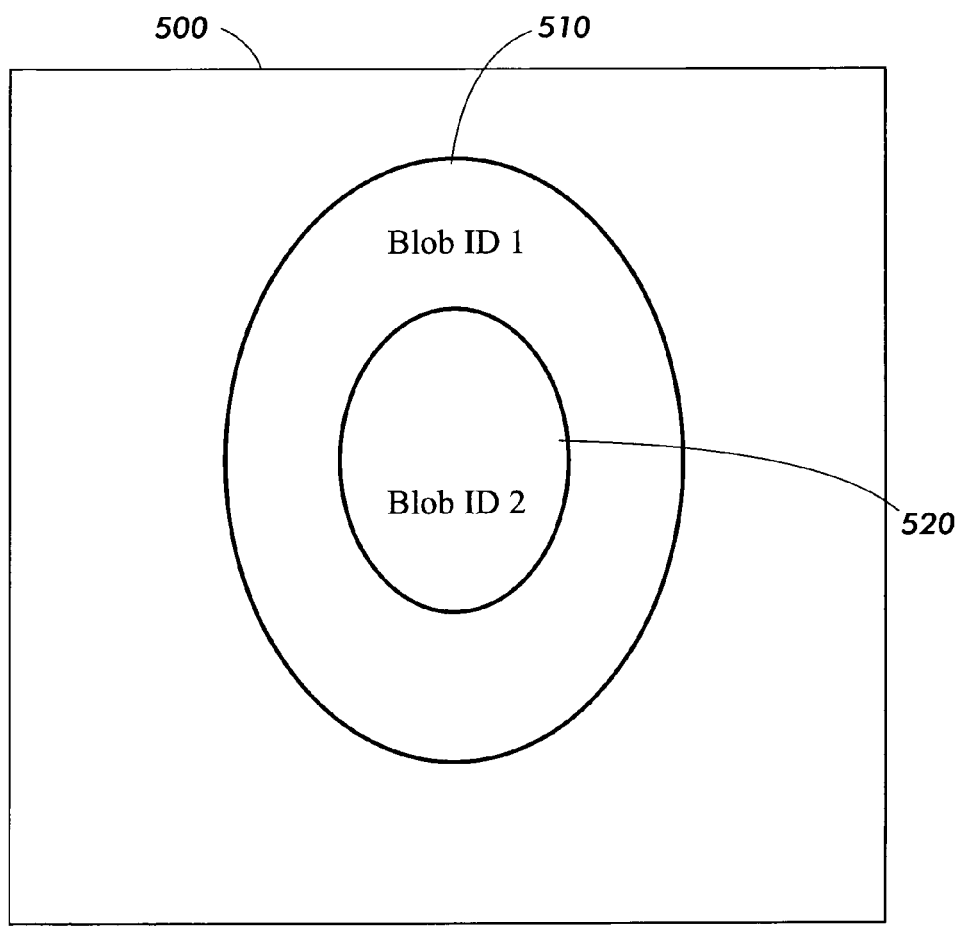
FIG. 23 illustrates how one valid blob can be inside another valid blob.

For example, referring to FIG. 23, to determine that blob 2 is fully contained inside of blob 1, all of blob 2 pixels must be investigated to verify that they all are indeed inside of blob 1. This test can be very time consuming especially if blob 2 is large (as it must be checked if inside of any other blob). However, in accordance with the properties of the particular segmenter of this invention, both blob 1 and 2 are guaranteed to have consistent edge continuity along their perimeter (for otherwise they would not have been identified as blobs). This important property can be leveraged to greatly simplify the inside blob testing. The test procedure is as follows: Blob 2 top and bottom bounding box coordinates are used to calculate the line position halfway in the middle of blob 2. This one line is then traveled, starting from the leftmost pixel of the outer blob 1, to the rightmost blob 1 pixel as defined by the blob 1 bounding box. The test then uses a simple state machine to track the blob IDs of the pixels on this one line. It basically looks for a sequence of blob 1 pixels, followed by a sequence of blob 2 pixels and then blob 1 again for blob 2 to succeed as inside of blob 1. Any out of order ID of either blob 1 or 2 or any other blob will fail the inside test. Clearly, this requires far fewer computations then checking each and every possible pixel combination.

The blob ID signal BID and the global table of blocks signal GTB, as further modified by the mark inner blobs module 2830, is output over the signal lines 2831 and 2832, respectively, to the map blobs module 2840. The blob ID signal BID is also output over the signal line 2831 to the cluster blobs module 2850.

The map blobs module 2840 generates a blob-to-color index by clustering together all blobs of similar color. In one particular embodiment of this invention, an Octal tree method of clustering is used. In another embodiment of this invention, a second Hierarchical binary tree clustering method is used. Regardless of the specific clustering technique, the blobs for the entire page are classified into a typically smaller number of unique representative colors, which are then used as the colors of the multiple binary foreground planes.

It should be appreciated that the classification method of blobs may be based on the color properties alone, as is the Octal tree method, or alternatively may be based on both the color and spatial properties, as is the Hierarchical binary tree method. The Octal tree method has the advantage of producing the smallest number of multiple foreground planes since it groups together similar color blobs regardless of where they are on the page. In contrast, the Hierarchal binary tree method will only group together blobs if they have similar colors and they are close to each other. Thus, for example, one red character on the top of the page can be placed in a separate foreground plane even if it has the same color as another red character on the bottom of the page. Even though the Hierarchical binary tree method may produce more foreground planes than the Octal tree method, it may still produce a smaller file size, particularly when the color clusters are compact and sparsely populated throughout the page. The main reason for the difference in file size is due to all the intermediate pixels between the top and bottom characters that waste no compression space in the Hierarchical binary tree method.

Figure 24:
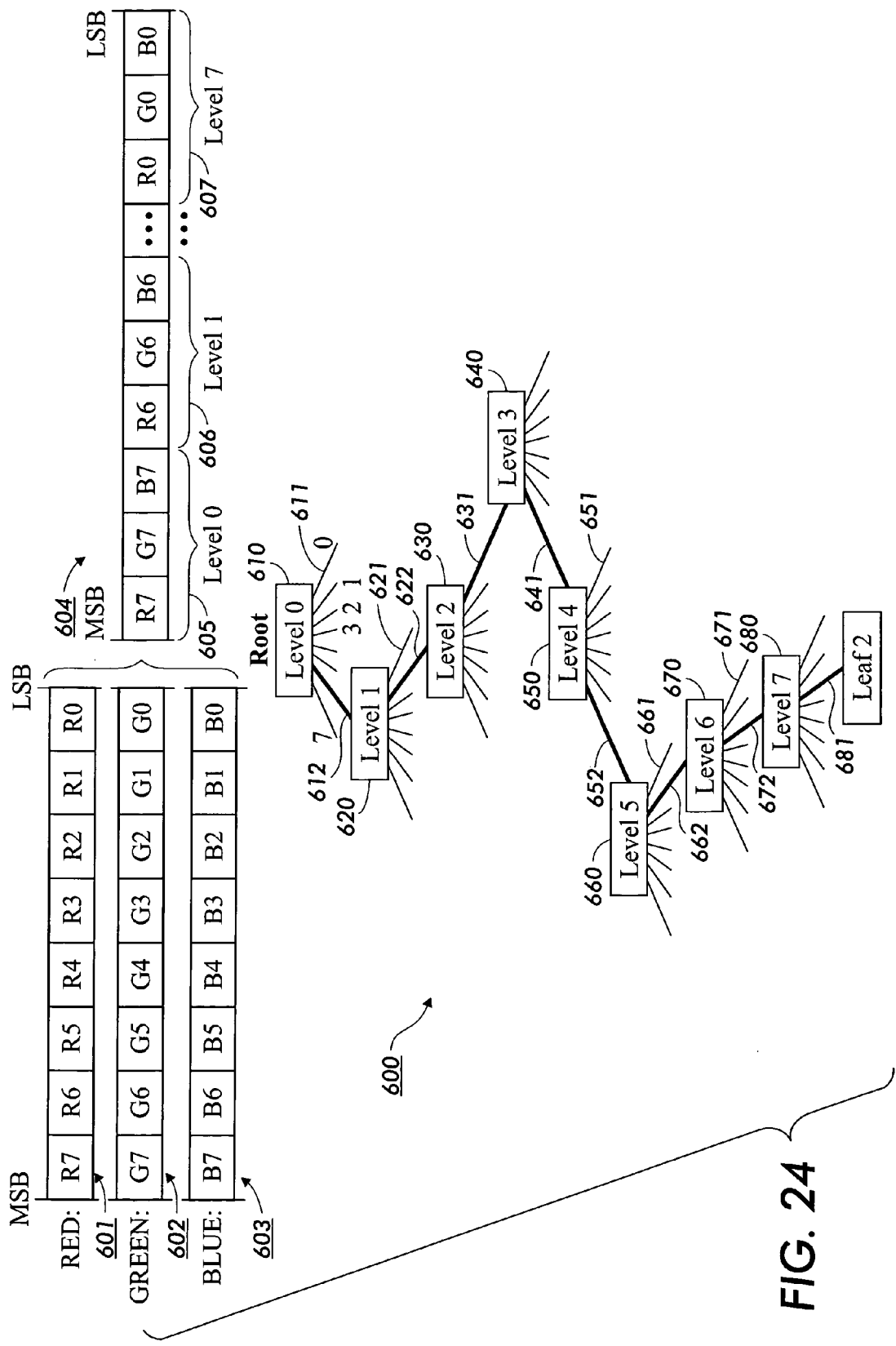
FIG. 24 illustrates one exemplary embodiment of the data structures for storing the color information used in various exemplary embodiments of the multiple binary foreground planes according to this invention and for a tree data structure generatable from the color data.
Figure 25:
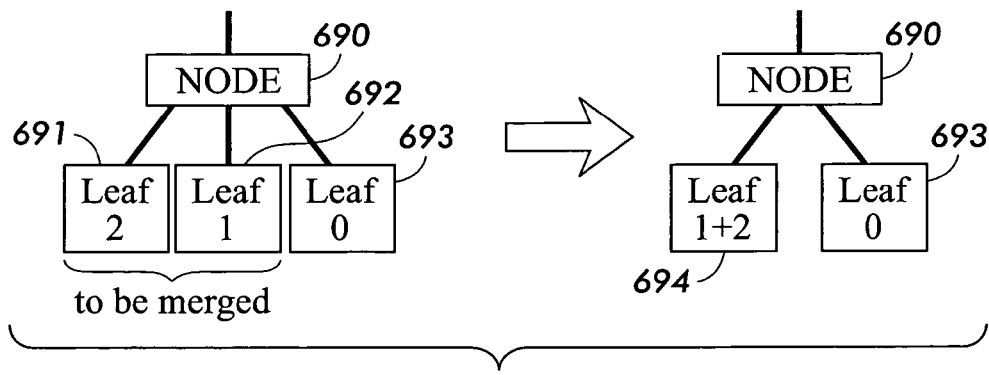
FIGS. 25 and 26 illustrate various techniques for combining the tree structure shown in FIG. 15 to reduce the number of leaf nodes in the trees.
Figure 26:
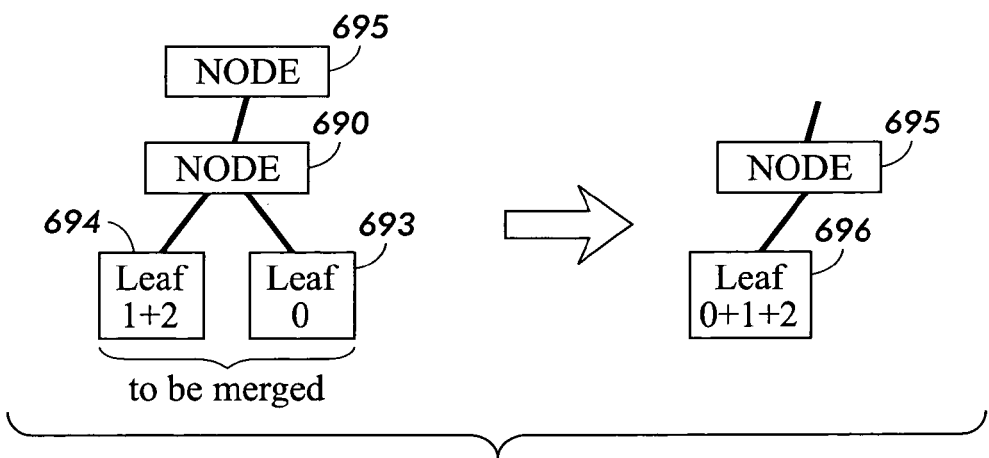

In one embodiment, the blob classification process builds an Octal tree for the remaining good blobs. This is described in further detail with respect to FIGS. 24-26. The map blobs module 2840 then outputs the generated Octal tree over the signal line 2841 to the cluster blobs module 2850. FIG. 24, which is described in greater detail below, illustrates how the enhanced color image data signal ENH is analyzed to generate the Octal tree and the blob-to-color index. In various exemplary embodiments, as illustrated in FIGS. 25 and 26, the map blobs module 2840 creates the Octal tree and then prunes the Octal tree. In such exemplary embodiments, each remaining leaf in the Octal tree represents a different layer of the multiple binary foreground layers.

In various exemplary embodiments, there may be a desired maximum number of possible binary foreground layers, for example, 128. The map blobs module 2840 clusters the leaves of the Octal tree that have similar colors together to ensure that there are no more than the maximum number of allowable leaves remaining in the Octal tree. The map blobs module 2840 then outputs the color-to-index signal CTI over a signal line 2841 to the cluster blobs module 2850.

The cluster blobs module 2850 inputs the generated color-to-index signal CTI over the signal line 2841, the block ID signal BID over the signal line 2831 and the enhanced image data signal ENH over the signal line 2856. The cluster blobs module 2850, based on the blob IDs and the colors-to-index signal CTI, merges blobs having sufficiently similar colors into specific ones of the plurality of binary foreground layers. That is, the cluster blobs module 2850 combines, for each different binary foreground layer, any blobs that have the layer ID of the color associated with that binary foreground layer into that binary foreground layer. The cluster blobs module 2850 generates the binary selector signal BEL over a signal line 2853 which is the union of all the binary foreground masks. In addition, it also passes the enhanced color signal ENH over a signal line 2852 to the background adjust module 2900, and the various determined binary foreground planes over the signal line 2851 to the compress module 3000.

Figure 17:
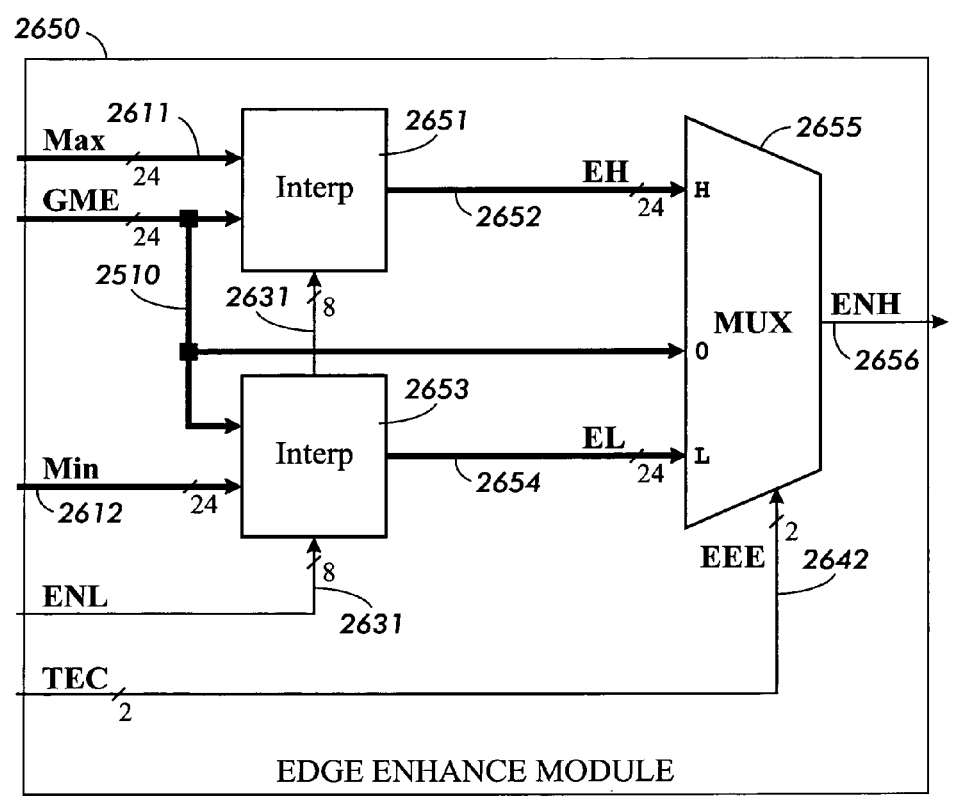
FIG. 17 illustrates one exemplary embodiment of an edge enhancement module of the segment module of FIG. 6 according to this invention.

FIG. 17 illustrates in greater detail one exemplary embodiment of the edge enhancement module 2650 shown in FIG. 6. As shown in FIG. 17, the edge enhanced module 2650 includes first and second interpolation modules 2651 and 2653 and a multiplexer 2655. The first interpolation module 2651 inputs the dependent maximum signal MAX over the signal line 2611 and the gamut enhanced image data signal GME over the signal line 2510 and the enhancement level signal ENL over the signal line 2631 from an enhancement level memory 2630. In contrast, the second interpolation module 2653 inputs the dependent minimum signal MIN over the signal line 2612, as well as the gamut enhanced image data signal GME over the signal line 2510 and the enhancement level signal ENL over the signal line 2631. The first and second interpolation modules 2651 and 2653 act to create edge enhanced image data from the gamut enhanced image data signal GME by making, on a pixel-by-pixel basis, the gamut enhanced image data signal GME brighter or darker, respectively. In particular, the first interpolation module 2651 generates, on a pixel-by-pixel basis, a brighter gamut enhanced image data signal EH as:

$$EH = [GME + (MAX - GME)(ENL/256)].$$

In contrast, the second interpolation module 2653 generates, on a pixel-by-pixel basis, a darker gamut enhanced image data signal EL as:

$$EL = [GME + (MIN - GME)(ENL/256)]$$

Each of the brighter and the darker image data signals EH and EL are output, along with the original gamut enhanced image data signal GME to the multiplexer 2655. The multiplexer 2655 also inputs the tri-state edge continuity signal TEC as selector edge extract signal EEE.

As shown in FIG. 17, the multiplexer 2655 uses the selector edge extract signal EEE as a control signal to select, on a pixel-by-pixel basis, between the original gamut enhanced image data signal GME and the brighter or darker image data signals EH or EL, respectively. In particular, referring back to Table 1, H values for the selector edge extract signal EEE are used to select the EH signal, while L values for the selector edge extract signal EEE are used to select the EL signal. The zero value for the selector edge extract signal EEE are used to select the original gamut enhanced image data signal GME. The multiplexer 2655, based on the value of the EEE signal, outputs the selected one of the EH signal, the gamut enhanced image data signal GME or the EL signal as the enhanced image data signal ENH over the signal line 2656.

It should be appreciated that the enhanced image data signal ENH output on the signal line 2656 is made brighter relative to the original gamut enhanced image data signal when there is a strong positive edge, while it is made darker relative to the original gamut enhanced image data signal if there is a strong negative edge. Finally, there is no enhancement, by outputting the original gamut enhanced image data signal GME, if there is not a strong positive or a strong negative edge or if there is at most a weak edge.

Figure 18:
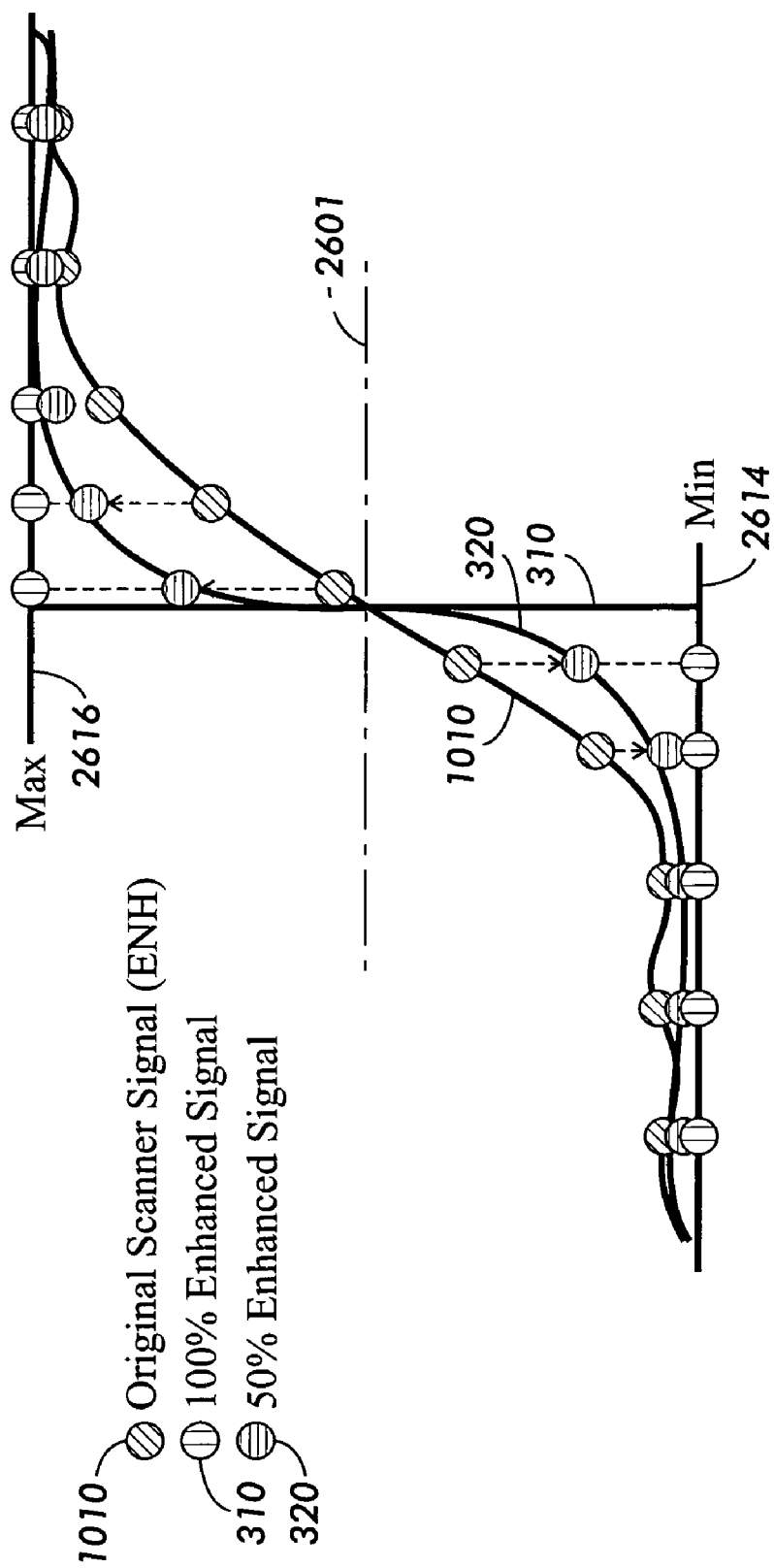
FIG. 18 is a graph illustrating an original scanner signal and various enhanced signals derived from the original scanner signal.

FIG. 18 shows the effect of the enhancement level signal ENL input on the signal line 2631 to the first and second interpolation modules 2651 and 2653. As shown in FIG. 18, for the original gamut enhanced image data signal GME, as represented by the diagonally cross hatched values in FIG. 18, when the enhancement level signal ENL has a value of 50%, or 128 for an 8-bit signal, values below the threshold value 2601 are moved toward the minimum value 2614 but at most part way, while values above the threshold 2601 are moved partially towards the maximum value 2616, resulting in the 50% enhanced signal 320. In contrast, for a 100% enhanced signal, which results in the fraction ENL/256 used in the two equations outlined above to have a value of 1, the values of the original gamut enhanced signal GME are driven fully to the minimum value 2614, while all the values above the threshold 2610 are driven fully toward the maximum value 2616. This occurs, because, in the two equations outlined above, when the fraction ENL/256 is 1, the values for the gamut enhanced image data signal GME in the two equations cancel out, leaving only the value for the dependent maximum signal MAX and the value for the dependent min signal MIN in the two equations.

Figure 19:
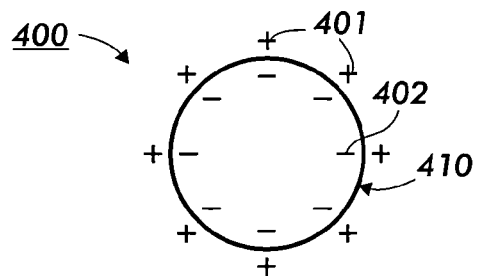
FIGS. 19-22 illustrate various valid and invalid blobs according to this invention.

FIGS. 19-22 illustrate four different potential types of blobs that may be encountered by the blob identification module 2700. FIG. 19 illustrates a valid single blob 400. As shown in FIG. 19, the blob 400 is defined by a strong edge 410 that defines a closed curve and is bounded on one side of the closed curve by +1 values for the tri-state edge continuity signal TEC and on the other side by −1 values for the tri-state edge continuity signal TEC. The closed curve 410 thus separates the pixels 402 that are in the interior of the blob 410 from pixels 401 that are outside of the blob 400.

It should be appreciated that, as shown in FIG. 19, a blob is thus any group of pixels that is defined by a closed curve and that is bounded by a strong edge on all sides. That is, the closed curve or strong edge is defined by a set of connected pixels that have the same value of the tri-state edge continuity signal TEC on one side of the edge and a different but same value of the tri-state edge continuity signal TEC for the pixels on the other side of the edge. Accordingly, the values for the tri-state edge continuity signal TEC for the pixels on each side of the edge 410 must not stop or change sign.

Figure 20:
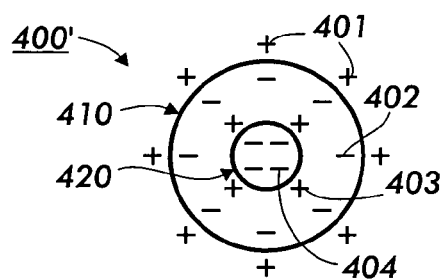

FIG. 20 illustrates a blob pair 400', where a first blob contains a second blob. As shown in FIG. 20, the closed curve or edge 410 defining the first blob is defined by +1 values for the tri-state edge continuity signal for the exterior pixels 401, while the interior pixels 402 have a value of −1 for the tri-state edge continuity signal TEC. In contrast, for the second closed curve 420 that defines the second blob, the pixels on the exterior of that closed curve 420, which are also the interior pixels 402, have values of +1 for the tri-state edge continuity signal TEC, while the pixels 404 on the interior of the closed curve 420 have values of −1 for the tri-state edge continuity signal. FIG. 20 thus illustrates that it is not necessary that all of the pixels on the interior of a single blob have the same value for the tri-state edge continuity signal TEC.

Figure 21:
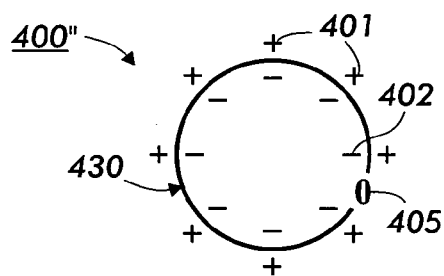

FIG. 21 illustrates a potential blob 400″ that has an edge or curve 430 that is not closed. That is, as shown in FIG. 21, while most of the pixels 401 on the exterior of the curve 430 have +1 values for the tri-state edge continuity signal TEC, at least one pixel 401 has a value of 0 for the tri-state edge continuity signal TEC. Similarly, while most of the interior pixels 402 have values of −1 for the tri-state edge continuity signal TEC, at least one pixel 402 in the interior has a value of 0 for the tri-state edge continuity signal TEC. Accordingly, because the edge 430 of the potential blob 400″ stops, such that the blob 400″ is not bounded by strong edge on all sides, the potential blob 400″ is merged into the background grayscale plane. In various exemplary embodiments, this is done by marking all of the pixels identified with this blob with a background grayscale plane blob ID. In various exemplary embodiments, this background blob ID is 0, i.e., a minimum possible value or a maximum possible value.

Figure 22:
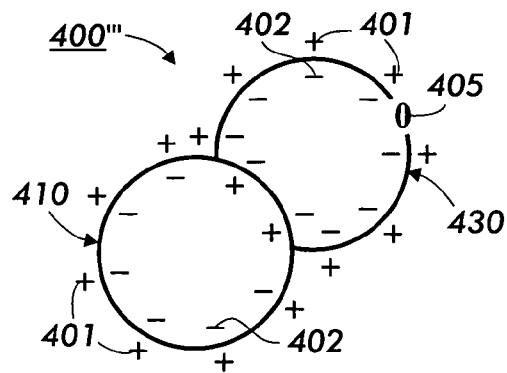

FIG. 22 shows a pair of potential blobs 400‴. As shown in FIG. 22, a first one of the blobs 400‴ is bounded by a closed curve or strong edge 410, while the other one of the blobs 400‴ has a broken edge or open curve 430. Thus, it is clear that the second blob of the pair of blobs 400‴ is not a valid blob. However, even though the first one of the pair of blobs 400‴ shown in FIG. 22 has a closed curve, i.e., is bounded by a strong edge 410 on all sides, the values of the tri-state edge continuity signal TEC for the pixels 402 on the interior side of the edge 410 change sign. In particular, as shown in FIG. 22, for the interior pixels 406, the pixels on the other side of the edge 410, i.e., the pixels 402 that are in the interior of the open curve 430 that are adjacent to the pixels 406, are darker in color than the color of the pixels 406. Accordingly, the tri-state edge continuity signal values for these pixels 406 is +1. In contrast, the rest of the pixels 402 on the interior of the closed curve 410 have colors that are darker than the adjacent pixels on the exterior of this blob. Thus, these pixels 402 have values for the tri-state edge continuity signal TEC of −1 rather than +1. Because the value of the tri-state edge continuity signal TEC for these interior pixels 402 and 406 changes, the first one of the pair of blobs 400‴, while bounded by the closed curve 410, is also not a valid blob.

FIG. 23 illustrates how the blob IDs are assigned for pixels within different blobs when one blob is fully contained within another blob. As shown in FIG. 23, all the pixels of the interior blob 520 get a blob ID of 2. This is intuitive, as all the pixels of this interior blob 520 are contiguous and thus form a simple closed curve. In contrast, the blob 510 is annular-shaped and thus has pixels that are separated from other pixels of this same blob 510 by pixels of the blob 520. It should be appreciated that the above-outlined process for assigning blob IDs, as outlined in Table 2, easily deals with this situation so that complexly-shaped blobs, such as blobs forming the letters "Y" or "R", or the like, will not be divided unnecessarily into multiple blobs.

FIG. 24 illustrates one exemplary embodiment of a Octal tree and how the Octal tree corresponds to the three color component vectors of the enhanced image data signal ENH. As shown in FIG. 24, the three color vectors 601, 602 and 603 each comprise 8 bits of data extending from a left-most most significant bit to a right-most least significant bit. It should be appreciated that, while FIG. 24 shows the three color components of the 24-bit color vector as red, green and blue components, the technique described herein with respect to FIG. 24 can be used with any three-dimensional color space, regardless of whether the color axes are red, green and blue, as shown in FIG. 24, or are LAB, YCC, XYZ or any other known or later-developed device-independent or device-dependent color space components.

As shown in FIG. 24, the three independent color components 601, 602 and 603 of the 24-bit fill-color, three-component color vector are first reorganized into a single 24-bit word. This 24-bit word is divided into eight separate 3-bit nibbles or levels 604. Each 3-bit nibble or level 604 is formed by gathering the bits of the same degree of significance from each of the three different components 601-603 and ordering them, generally in the same order, such that the three most significant bits are in a first nibble or zeroth level 605, the three second most significant bits are in a second nibble or first level 606 and the three least significant bits are in an eighth nibble or seventh level 607. As such, each 3-bit nibble defines eight possible values for each level.

It should be appreciated that, in various exemplary embodiments, the map blobs module 2840 operates to generate and prune the Octal tree as set forth in the following description.

As shown in FIG. 24, a Octal tree 600 can be generated from the eight 3-bit nibbles such that a root node 610, corresponding to the first nibble or zeroth level 605, will have eight different branches 611, each corresponding to one possible 3-bit value for that first nibble.

It should be appreciated that each different identified blob in the global table of blobs signal GTB will be converted in this way. As such, each different blob will have one of the eight possible 3-bit values for the three most significant bits of the three components of the color value associated with that blob. For each of the eight 3-bit values that occur in the identified blobs for the first nibble 605, a further, second nibble or first level node is added at the end of that branch 611, such as for the branch 612 corresponding to the 3-bit value "101." For each such branch 611 having a first level or second nibble node 620, the second nibble 606 of each identified blob is selected. Thus, there are again eight different 3-bit values that can occur in that second nibble 606 that will need to have nodes added to that first level node 620, depending on the value of those three bits. For example, as shown in FIG. 24, for the eight branches 621 extending from the first level node 620, a second level node 630 will need to be added to the end of those branches 621, such as the branches 622 where a blob has a color value corresponding to the zeroth level 3-bit value of the first level node 620 and a first level value corresponding to the second level node positioned at the end of the branch 622, such as, for example, the level 1 value "010."

Thus, as shown in FIG. 24, the third nibble or second level node 630 will have eight branches 631 extending from it. Similarly, each fourth nibble or third level node 640 will have eight branches 641 extending from it. Likewise, each of the fifth, sixth, seventh and eighth nibbles will have a node 650, 660, 670 and 680, respectively at the end of one of the branches 641, 651, 661 and 671, respectively that extends from the previous level node. For example, if the color value of the 24-bit word shown in FIG. 24 includes a value of 000 for the third nibble, a value of 111 for the fourth nibble, a value of 111 for the fifth nibble, a value of 001 for the sixth nibble, a value of 011 for the seventh nibble and a value of 011 for the eighth nibble, the tree for that particular 24-bit color word will contain the additional branches 641, 652, 662, 672 and 681, resulting in the tree 600 shown in FIG. 24 ending in the leaf 2. If the 24-bit color value for each other identified blob is similarly added to the tree 600, the tree 600 will contain one path from the root or zeroth level node 600 down to a particular seventh level leaf 681, such as the leaf 2 shown in FIG. 24, for each different color that is present in the identified blobs. However, because some blobs may have the exact same 24-bit color value, there will not necessarily be as many different leaves 681 as there are different identified blobs.

Furthermore, it should be appreciated that, if two different blobs share the same path through the tree 600 except for the seventh level leaf 681 or the sixth level branch 672, or even the fourth or fifth level branches 651 or 661, those colors may be sufficiently similar that the leaves and/or branches for those two or more blobs should be combined. This is shown in greater detail in FIGS. 25 and 26.

As outlined above with respect to the map blobs module 2840, the blobs remaining in the modified gross table of blocks single GTB, after the gross table of blocks single GTB has been thinned by the mark graphics module, the filter marked blobs module and the mark inner blobs module 810, 820 and 830, are analyzed as outlined above, one blob at a time to form a path in the tree 600 that extends from the root node 610 down to a specific leaf node 681. It should be appreciated that the number of leaves 681 in the tree 600 determines the number of different binary foreground planes used to store the image data of the input image in the multiple binary foreground planes format.

However, it should be appreciated that it is generally not appropriate to allow as many as $2^{24}$ different binary foreground planes to be used. This is especially true since the human eye is often unable to discern differences in colors represented by the eighth nibble, and possibly even the seventh, sixth or even fifth nibbles, of the 24-bit color associated with each blob. Thus, the number of allowable layers is usually limited to some number, generally a power of two number such as 128, 256 or the like. Then, if the number of layers initially in the Octal tree 600 exceeds this limit, the Octal tree 600 must be pruned. It should be appreciated that, in various exemplary embodiments, the Octal tree 600 can be pruned by finding two or more leaves 681 having similar color values and merging those two closest leaves 681 into a single leaf 681. This is shown in FIG. 25, where a particular node 690 representing one of the nibbles 604 has three active leaves 691, 692 and 693. As shown in FIG. 25, the number of binary foreground layers can be reduced by one by merging the leaves 691 and 692 into a combined leaf 694.

It should also be appreciated that the Octal tree 600 can be pruned by merging two or more leaves 681 into their parent node 671 and/or changing a parent node into a leaf when all of its leaves or branches are otherwise pruned. As a result, for the corresponding blobs, the entire Octal tree 600 will be shorter by one level for those blobs. This is shown in greater detail in FIG. 26.

As shown in FIG. 26, the nodes 694 and 693 of FIG. 25 are to be merged such that the node 690 will have a single leaf comprising each of the original leaves 1, 2 and 3. However, because the node 690 has a single leaf, that leaf can be merged into the node 690 resulting in the leaf 696 extending from the node 695 that is one level higher in the tree 600. Once all of the leaves and branches of the Octal tree 600 have been examined and merged as appropriate to ensure that the number of layers does not exceed the leaf limit for the Octal tree 600, the remaining leaves are each assigned an identification number, which will later become the layer identification number. Finally, the map bobs module 2840 creates a color to index CTI table, which maps the colors of the blobs to the layer ID assigned to the corresponding final leaves in the Octal tree 600.

It should also be appreciated that, in various exemplary embodiments, while various leaves and nodes may be combined, as shown in FIG. 25 and FIG. 26, the different colors associated with each of the merged nodes are not combined at that time. Rather, in such exemplary embodiments, the colors are combined when the blobs associated with a particular index are clustered into a single layer by the cluster blobs module 2850.

Figure 27:
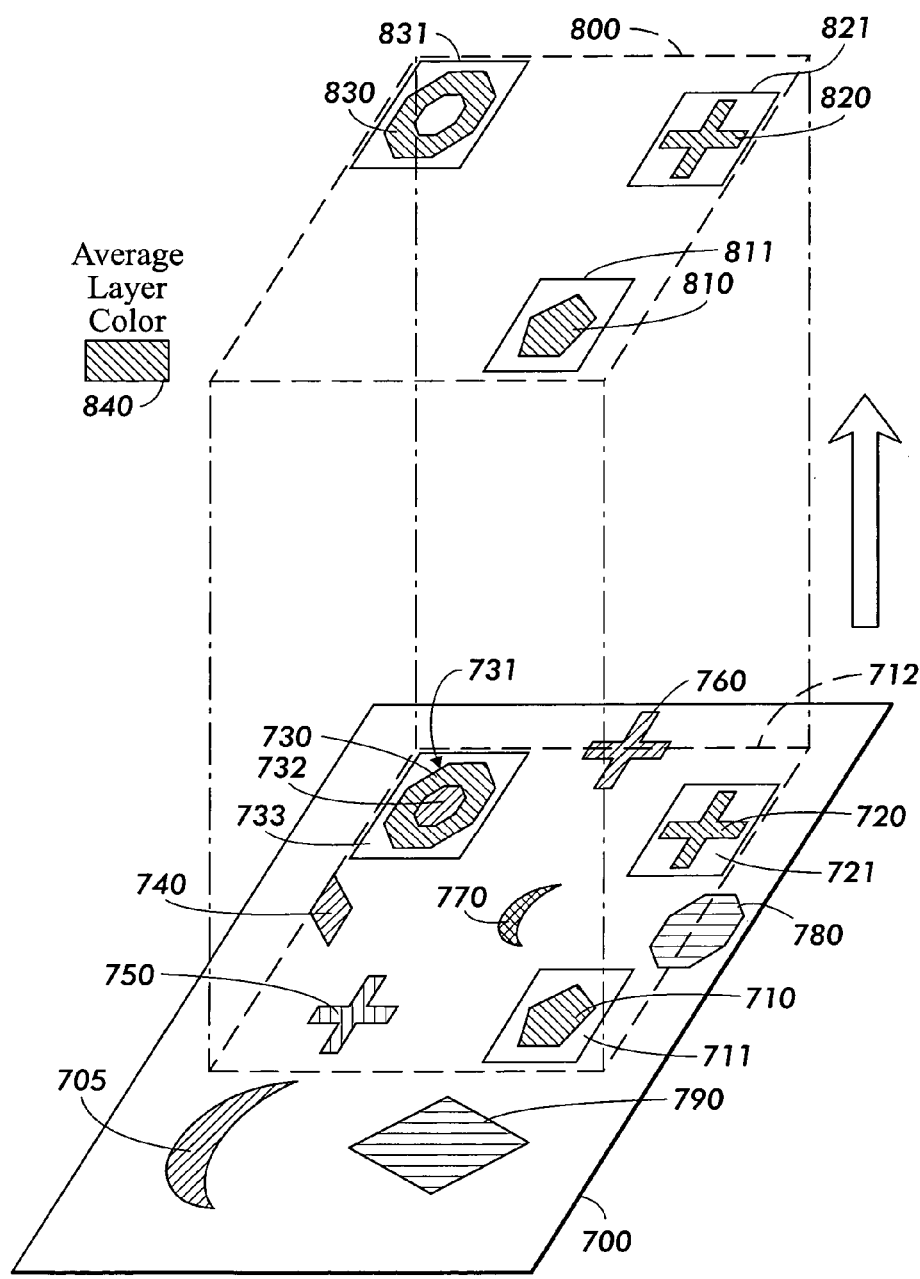
FIG. 27 illustrates one exemplary embodiment of the original image data after the various blobs of an image have been identified and techniques for gathering the identified blobs into a particular binary foreground plane based on color data of the various blobs and of the particular binary foreground plane.

FIG. 27 shows this process in greater detail. As shown in FIG. 27, an original image 700 contains a plurality of blobs 705-790. It should be appreciated that in FIG. 27, each of the different cross hatching styles represents a different index value. Thus, the blobs 705 and 760 have the same index value, while the blobs 780 and 790 have the same index value. The blobs 750 and 770 are the only blobs having their particular index values. The blobs 710, 720 and 731 of the pair of blobs 730 also each have the same index value. Finally, the blobs 732 and 740 have the same index value. However, it should be appreciated that, while different blobs have the same index value, they do not necessarily have the same color value.

As shown in FIG. 27, each of the blobs 710, 720 and 731 are shown with a bounding box 711, 721 or 733, respectively, formed around those blobs. The bounding boxes 711, 721 and 733 represent the extents along the document axes of the left-most, right-most, top-most and bottom-most points of those blobs. In addition, an overall bounding box 712 that represents the left-most, right-most, top-most and bottom-most extents along the document axes for the blobs 710, 720 and 731 that have the same index is also shown relative to the full size of the document 700.

Because the blobs 710, 720 and 731 all have the same index due to pruning of the tree 600, all of these blobs will be lifted onto the same binary foreground layer 800, as shown in FIG. 27. Thus, shown in FIG. 27, the binary foreground plane 800 includes the blobs 810, 820 and 830, which are bounded by the bounding boxes 811, 821 and 831, respectively. It should be appreciated that, while each of the blobs 810, 820 and 830 have the same index, they do not necessarily have exactly the same color value. Accordingly, the color value 840 that is associated with the binary foreground layer 800 is the average color for the various blobs 810, 820 and 830 incorporated into the binary foreground layer 800. It should also be appreciated that the size of the binary foreground layer 800 and its position relative to the background grayscale layer and other ones of the multiple binary foreground layers correspond to the bounding box 712. Thus, the binary foreground layer 800 does not need to be equal in extent to the original image 700 or the background grayscale layer.

Figure 28:
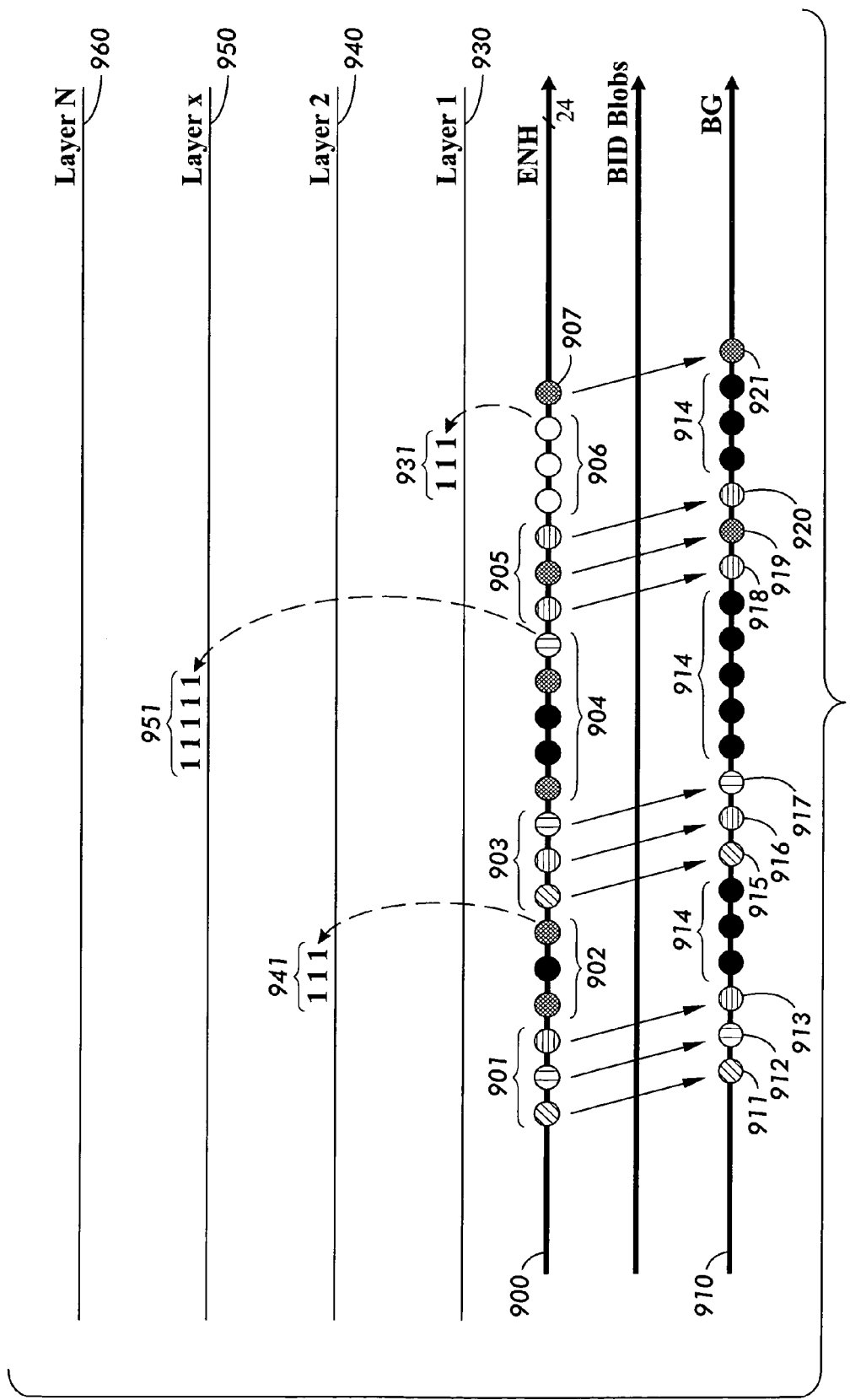
FIG. 28 illustrates how the processed image data is distributed among the background and the multiple foreground planes.

FIG. 28 illustrates another way of visualizing this process. As shown in FIG. 28, the enhanced image data signal ENH, the blob index signal BID and the blob information is input on a line-by-line basis. This is represented by the line 900 shown in FIG. 28. As shown in FIG. 28, for the pixels on the scan line 900 portion of the enhanced image data signal ENH, the pixels are divided into seven sections 901-907 where the sections 901, 903, 905 and 907 are marked as background pixels and are copied over to the background layer 910 as the background pixels 911-921. At the same time, based on the layer ID of each of the pixel regions 902, 904, 906 to be lifted, a binary value of "1" is written into each of the layers 930, 940, 950 or 960 depending on the layer ID of each of those pixels to be lifted. Thus, shown in FIG. 28, a set 941 of "1"s are written in the layer 940 for the set of pixels 902. Likewise, a set 951 of "1"s is written in the layer 950 for the set of pixels 904. Finally, a set 931 of "1"s is written in the layer 930 for the set 906 of pixels. At the same time, when the sets of pixels 902, 904 and 906 are lifted into the various layers 930-960, the corresponding pixels 914 in the background layer are set to 0.

It should be appreciated that, in various exemplary embodiments, the layers 930-960 have a resolution of 300 dpi. In general, because the layers are binary data and binary data is usually compressed using one-dimensional compression techniques, each line of each layer is output at a time and compressed. In contrast, depending on the block sizes of the blocks used for the JPEG compression of the background, as soon as enough lines of the background layer have been produced, which is usually as many lines as necessary to fill one swath of the background image that is one JPEG MCU high, the background compression cycle begins.

In this background compression cycle, the background grayscale image data is first filtered and then is subsampled to reduce its resolution to 150 dpi. Next, the JPEG blocks are averaged over the non-zero pixels to identify an average color for that block. That determined average color is then used to fill any of the pixels that were set to 0 because their corresponding data was actually lifted into one of the binary layers 930-960. Each of the JPEG blocks is then JPEG compressed as in the three-layer process outlined above in the incorporated applications.

It should be appreciated that the above outlined process of FIG. 28 for the background layer is generally performed by the background adjust module 2900 and the compression of the background layer and the various binary foreground layers is performed by the compress module 3000.

Figure 29:
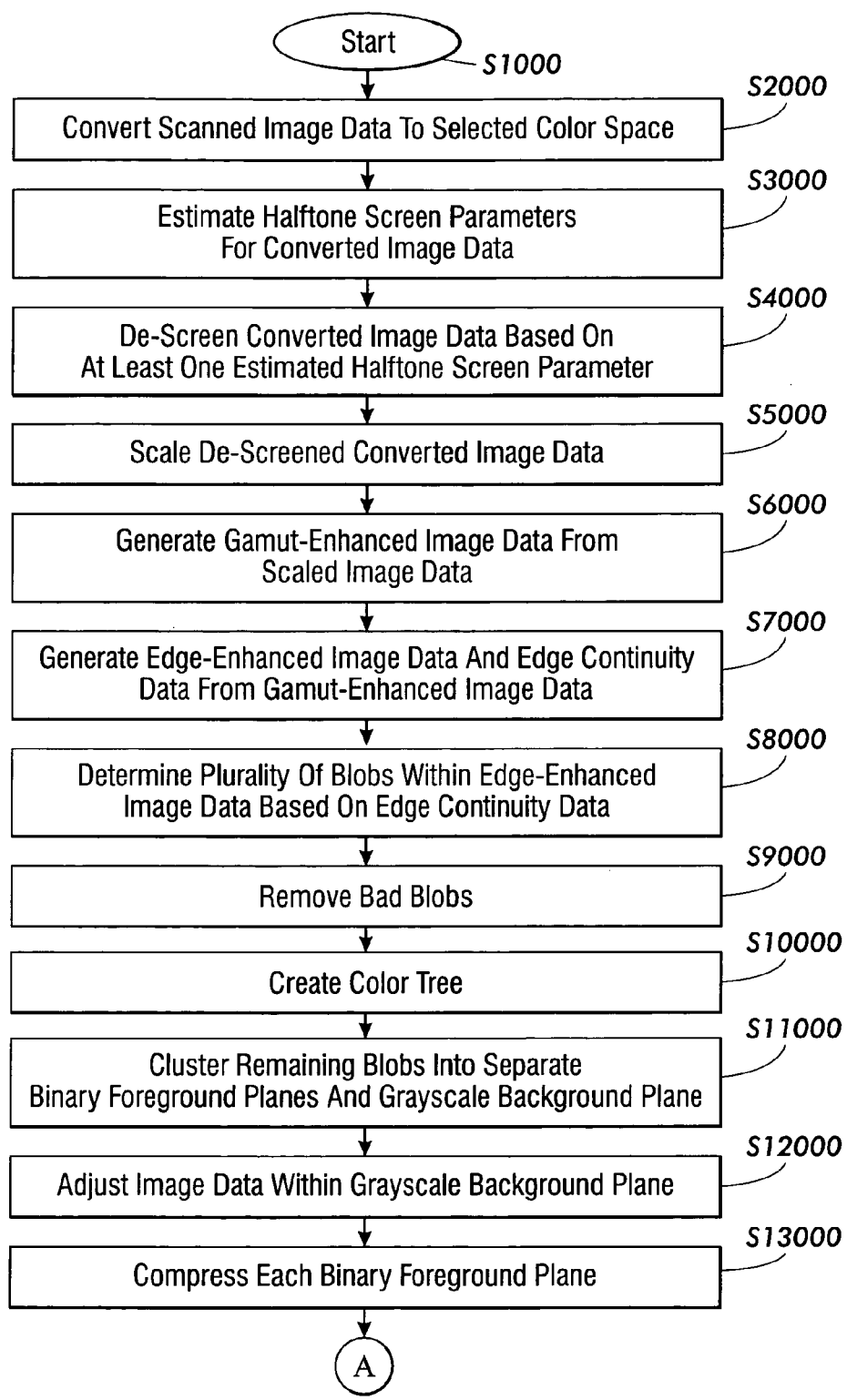
FIGS. 29 and 30 are a flowchart illustrating one exemplary embodiment of a method for converting scanned image data into a portable document format (PDF) document file using multiple binary foreground layers according to this invention.
Figure 30:
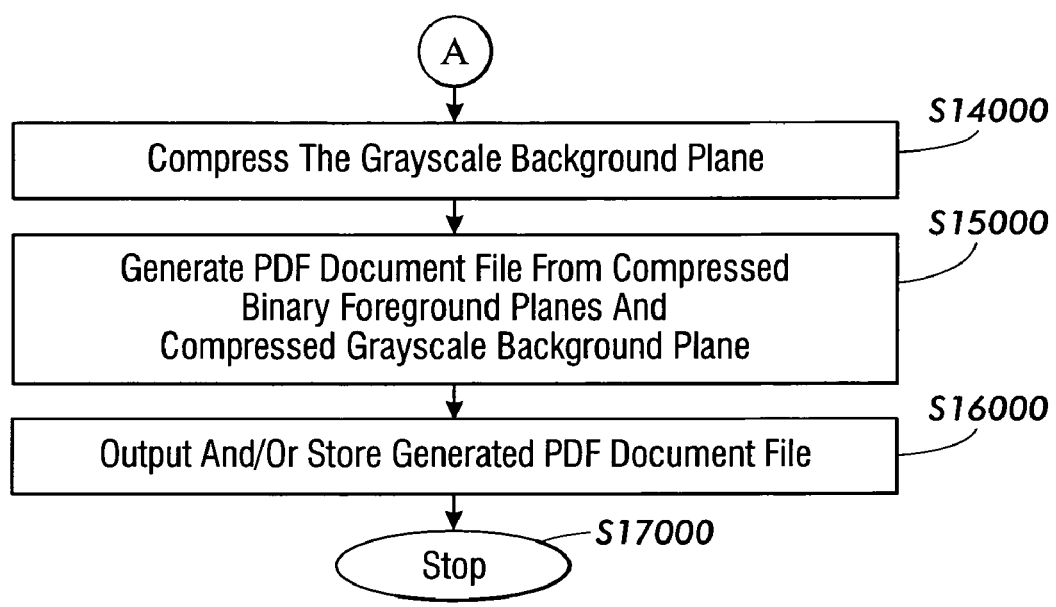

FIGS. 29 and 30 are a flowchart illustrating one exemplary embodiment of a method for converting scanned image data into a portable document format (PDF) document file using multiple binary foreground layers. As shown in FIGS. 29 and 30, operation of the method begins in step S1000 and continues to step S2000, where scanned image data is converted to a selected color space. Then, in step S3000, halftone screen parameters, such as screen frequency and screen magnitude, are estimated for the converted image data. Next, in step S4000, the converted image data is descreened to remove the halftone screening from the converted image data based on the at least one estimated halftone screen parameter. That is, the descreening converts the image data from halftone image data back into true continuous tone grayscale image data. Operation then continues to step S5000.

In step S5000, the descreened converted image data is scaled. Next, in step S6000, gamut enhanced image data is generated from the scaled descreened image data. Then, in step S7000, edge-enhanced image data and edge continuity data are generated from the gamut enhanced image data. Operation then continues to step S8000.

In step S8000, a plurality of blobs of image data that will be distributed among the multiple binary foreground layers that occur within the edge-enhanced image data are determined based on the edge continuity data. Then, in step S9000, any poorly defined blobs, such as, for example, "bad" blobs, are removed. Next, in step S10000, a color tree is created from the remaining blobs after the "bad" blobs are removed from the determined blobs. Operation then continues to step S11000.

In step S11000, the remaining blobs are clustered into separate binary foreground planes or layers and a grayscale background plane. Next, in step S12000, the image data within the grayscale background plane is adjusted to improve the compressibility of the grayscale background plane. Then, in step S13000, each of the separate binary foreground planes determined in step S111000 are compressed using a compression technique that is appropriate to such binary foreground planes. Operation then continues to step S14000.

In step S14000, the grayscale background plane is compressed using a compression technique that is appropriate for such grayscale data. Then, in step S15000, a portable document format (PDF) document file is generated from the compressed binary foreground planes and the decompressed grayscale background plane. Next, in step S16000, the generated portable document format (PDF) document file is output to a downstream processor and/or stored in a memory. Operation then continues to step S17000, where operation of the method ends.

It should be appreciated that, in step S2000, the scanned image data, which is typically in RGB format, is converted to a selected color space to simplify the downstream processing. For example, converting the scanned image data to YCC or LAB color spaces allows the luminance values to be detected directly, rather than having to be derived. However, it should be appreciated that any desired color space could be used, including the original RGB or other color space of the scanned image data as scanned. In this case, step S2000 can be omitted.

It should also be appreciated that, in various exemplary embodiments, any known or later-developed document format, in place of the portable document format (PDF) can be used in steps S15000 and S16000.

Figure 31:
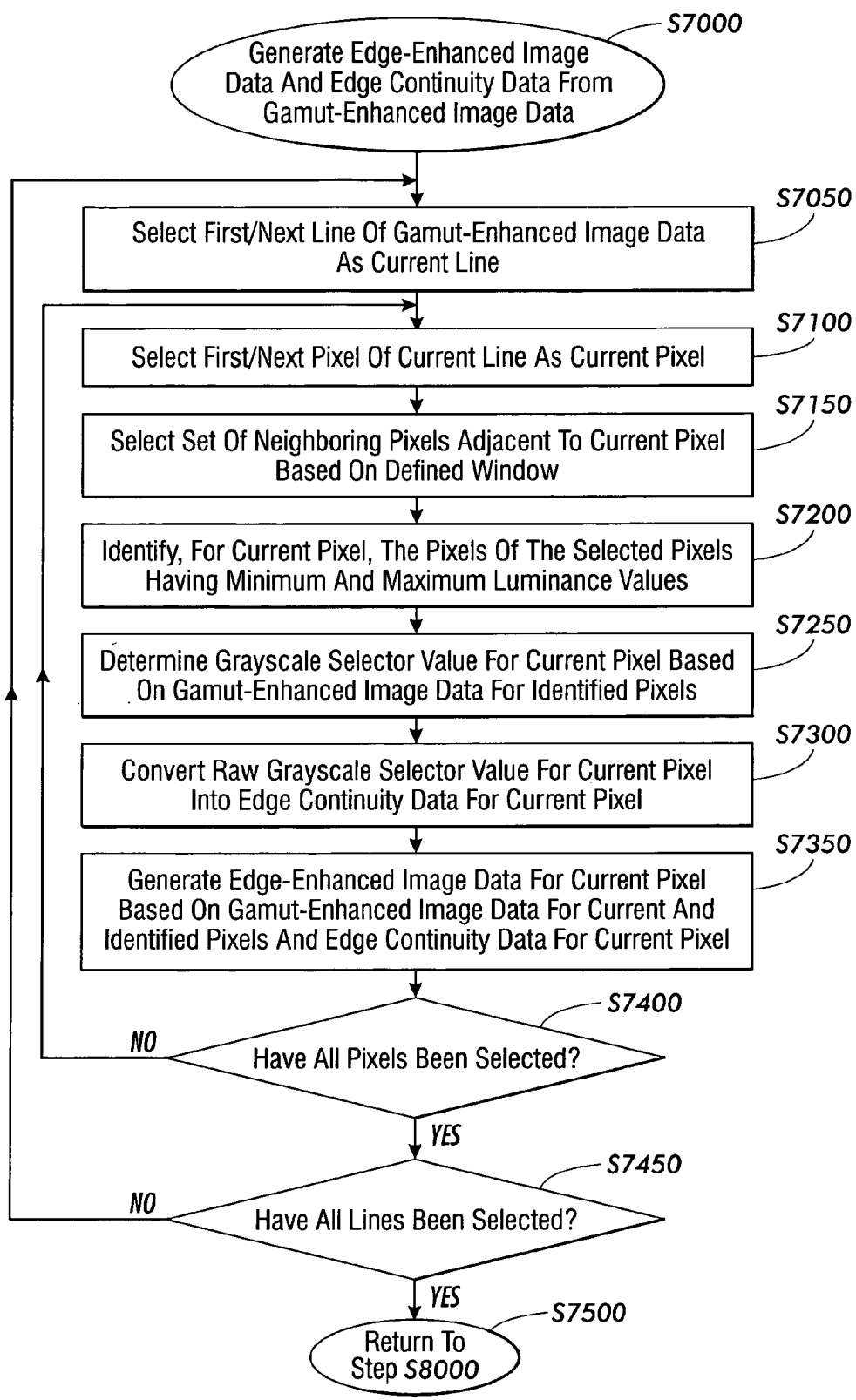
FIG. 31 is a flowchart outlining in greater detail one exemplary embodiment of a method for generating edge-enhanced image data and edge continuity data from the gamut enhanced image data according to this invention.

FIG. 31 is a flowchart outlining in greater detail one exemplary embodiment of a method for generating edge-enhanced image data and edge continuity data from the gamut enhanced image data of step S7000. As shown in FIG. 31, beginning in step S7000, operation continues to step S7050, where a first or next line of the gamut enhanced image data is selected as a current line. Then, in step S7100, a first and/or next pixel of the current line selected in step S7050 is selected as a current pixel. Next, in step S7150, a set of neighboring pixels that are adjacent to the current pixel is selected based on a defined window. As outlined above, the defined window can be, for example, a 7×7 window centered on the current pixel. Operation then continues to step S7200.

In step S7200, the pixels appearing in the window around the current pixel are reviewed to identify, for the current pixel, a pixel appearing in the window that has a maximum luminance value and a pixel appearing in the window that has a minimum luminance value. Next, in step S7250, a grayscale selector value is determined for the current pixel based on the full three-component gamut-enhanced image data of the pixels identified in step S7200. Then, in step S7300, the raw grayscale selector value is converted into edge continuity data for the current pixel. As outlined above, in various exemplary embodiments, the edge continuity data indicates whether there is an edge in the window or on the current pixel that can be associated with the current pixel and the relationship of that edge to the current pixel. Operation then continues to step S7350.

In step S7350, edge-enhanced image data is generated for the current pixel based on the gamut-enhanced image data for the current pixel and the gamut-enhanced image data for the pixels identified in step S7200, as well as the edge continuity data for the current pixel. Then, in step S7350, a determination is made whether all pixels of the current line have been selected as the current pixel. If not, operation returns to step S7100, where a next pixel of the current line is selected as the current pixel. Otherwise, if all of the pixels of the current line have been selected as the current pixel, operation continues to step S7450. In step S7450, a determination is made whether all lines of the image data have been selected. If not, operation returns to step S7050, where a next line of the gamut-enhanced image data is selected as the current line. Otherwise, if all of the lines of the image data have been selected, such that the entire image has been analyzed and edge-enhanced image data and edge continuity data has been generated for each pixel in the scanned image data, operation continues to step S7500 where operation returns to step S8000.

Figure 32:
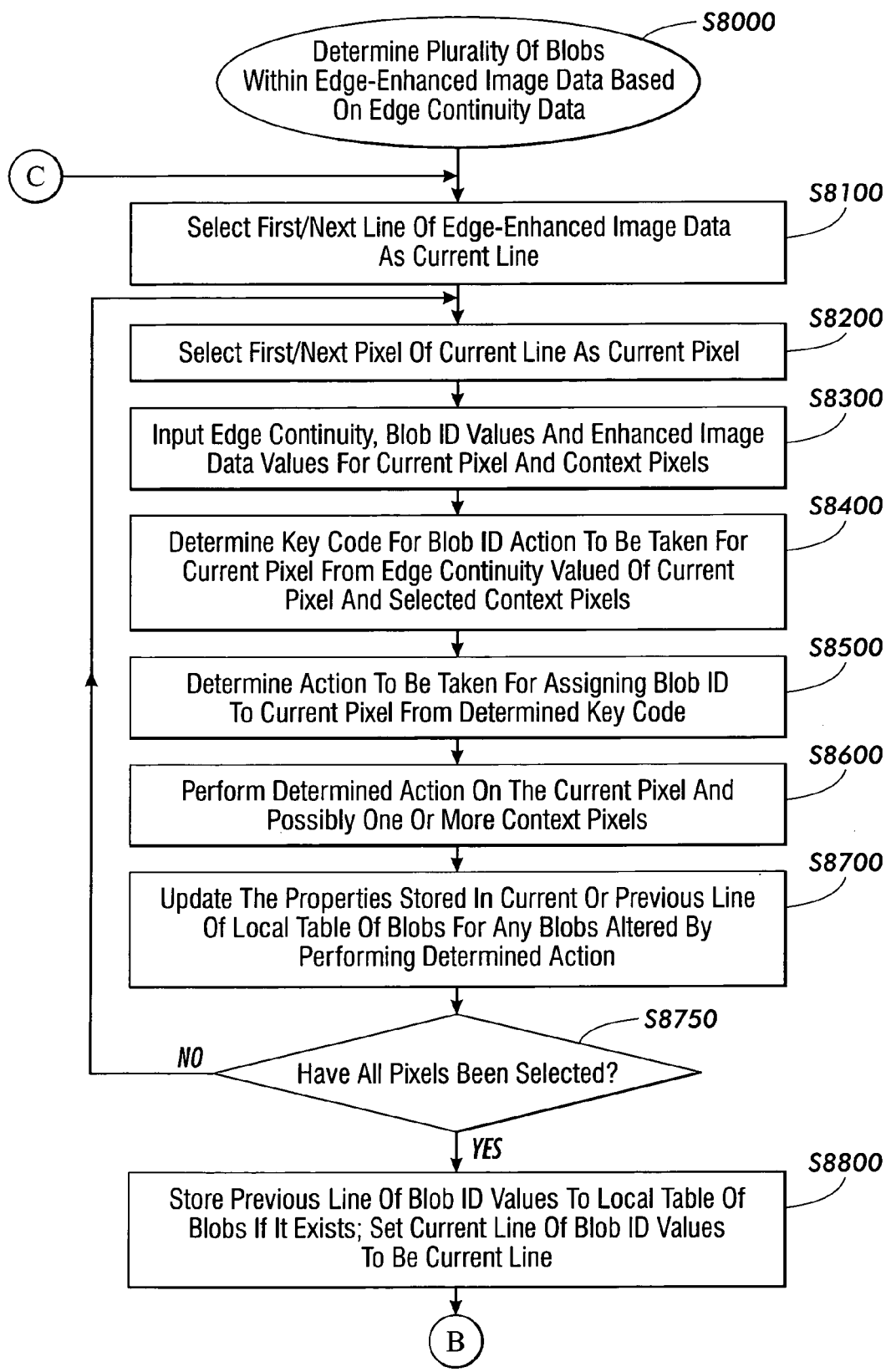
FIGS. 32 and 33 outline in greater detail one exemplary embodiment of a method for determining the plurality of blobs within the edge-enhanced image data based on the edge continuity data according to this invention.
Figure 33:
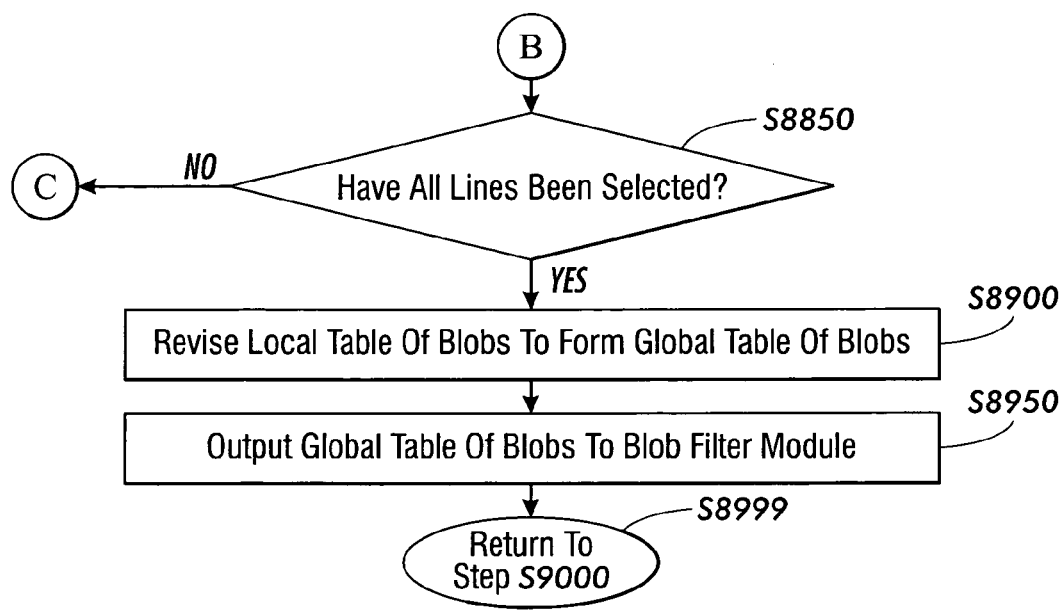

FIGS. 32 and 33 outline in greater detail one exemplary embodiment of a method for determining the plurality of blobs within the edge-enhanced image data based on the edge continuity data of step S8000. As shown in FIGS. 32 and 33, beginning at step S8000, operation continues to step S8100, where a first or next line of edge-enhanced image data and corresponding tri-state edge continuity data is selected as a current line. Then, in step S8200, a first or next pixel of the current line of edge-enhanced image data and corresponding tri-state edge continuity data is selected as a current pixel. Next, in step S8300, the tri-state edge continuity values, the previously assigned blob ID values and the enhanced image data values for the current pixel, if present, and for a plurality of context pixels surrounding the current pixel are input. Operation then continues to step S8400.

In step S8400, a key code is determined for the blob identification action to be taken for the current pixel from the tri-state edge continuity values of the current pixel and selected ones of the surrounding context pixels. Next, in step S8500, a merge action to be taken for assigning a blob identification value to the current pixel is determined from the determined key code. Then, in step S8600, the determined action is performed on the current pixel and possibly one or more of the surrounding context pixels to assign a blob ID value to the current pixel and possibly to update the blob ID values assigned to those surrounding context pixels. Operation then continues to step S8700.

In step S8700, various properties stored in an entry of a local table of blobs for the current line that is associated with the blob ID that has been assigned to the current pixel are updated, as are various properties stored in any entries of the local table of blobs for the current line or for a previous line for any blobs that have been altered in step S8600. Then, in step S8750, a determination is made whether all pixels of the current line have been selected. If not, operation returns to step S8200, where a next pixel of the current line is selected as the current pixel. Steps S8200-S8750 are then repeated for the new current pixel. Once all of the pixels of the current line have been selected, operation continues from step S8750 to step S8800, where, if a local table of blobs for the previous line exists, the previous line's local table of blobs is stored, the local table of blobs for the current line is set to be the local table of blobs for the previous line and the current line is set to the previous line. Operation then continues to step S8850.

In step S8850, a determination is made whether all lines have been selected. If not, operation returns to step S8100, where the next line of edge enhanced image data and corresponding tri-state edge continuity data is selected as the current line. Then, steps S8200-S8850 are repeated. Once all of the lines have been selected, operation continues to step S8900, where the local tables of blobs are refined in a bottom-to-top process to form a global table of blobs. Then, in step S8950, the global table of blobs is output. Operation then continues to step S8999, where operation returns to step S9000.

It should be appreciated that, in step S8600, the various actions outlined above with respect to Tables 2 and 3 can be performed to assign a particular blob ID value to the current pixel, to merge the current pixel and/or one or more of the previously defined blobs into the background image plane or assign the current pixel a new blob ID value.

It should also be appreciated that, in a second exemplary embodiment of the method for determining the plurality of blobs within the edge-enhanced image data based on the tri-state edge continuity data of step S8000, in step S8100, only the tri-state edge continuity data is selected for the current line. Likewise, in step S8200, only a first or next pixel of the current line of tri-state edge continuity data is selected for the current pixel. Thus, in the second exemplary embodiment, the edge-enhanced image data is not selected in steps S8100 or S8200. Likewise, because the edge-enhanced image data is not selected at this time, step S8700 is omitted. Thus, operation continues directly from step S8600 to step S8750 in this second exemplary embodiment. It should also be appreciated that, in this second exemplary embodiment of the method for determining the plurality of blobs within the edge-enhanced image data based on the edge continuity data of step S8000, the edge enhanced image data is used in step S8900 when refining the local tables of blobs in the bottom-to-top process to form the global table of blobs.

Finally, it should be appreciated that the above-outlined first and second exemplary embodiments of the method for determining the plurality of blobs within the edge-enhanced image data based on the tri-state edge continuity data of step S8000 assumes steps S8100-S8850 are performed in a top-to-bottom order, while step S8900 is performed in a bottom-to-top order. However, in yet other exemplary embodiments of the method for determining the plurality of blobs within the edge-enhanced image data based on the tri-state edge continuity data, steps S8100-S8850 can be performed in a bottom-to-top order, while step S8900 is performed in a top-to-bottom order. Thus, it should be appreciated that, in various exemplary embodiments, it is only desirable to perform steps S8100-S8850 in the opposite direction that step S8900 is performed, or vice versa.

Figure 34:
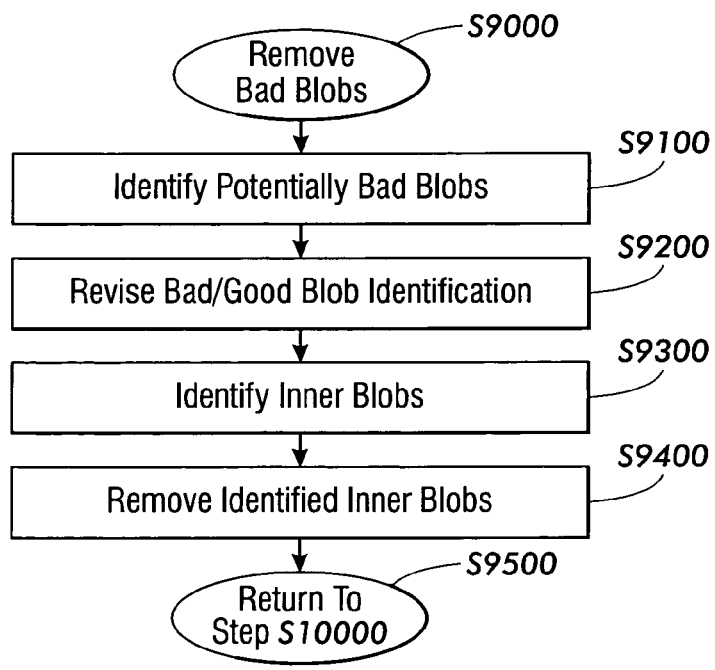
FIG. 34 is a flowchart outlining in greater detail one exemplary embodiment of a method for removing bad blobs according to this invention.

FIG. 34 is a flowchart outlining in greater detail one exemplary embodiment of a method for removing bad blobs of step S9000. As shown in FIG. 34, operation of the method begins in step S9000 and continues to step S9100, where potentially bad blobs are identified. Next, in step S9200, the blobs that are identified as bad but which are surrounded by good blobs, and the blobs that are good but which are surrounded by bad blobs, are further analyzed to determine if the good or bad blob identification should be revised. It should be appreciated that, in various exemplary embodiments, identifying the bad or good blobs as being surrounded by the opposite type blob is sufficient to determine that the good/bad blob identification should be reversed. Operation then continues to step S9300.

In step S9300, any inner blobs, i.e., any blobs that are completely contained within other blobs, are identified. In various exemplary embodiments, such inner blobs are automatically removed as blobs and their image data merged onto the grayscale background plane. In various other exemplary embodiments, the inner blobs are analyzed to determine if they truly represent the background image data or if they should be maintained as valid blobs. Then, in step S9400, any inner blobs that are identified are removed. As indicated, in various exemplary embodiments, any identified inner blobs are automatically removed to the grayscale background plane. In various other exemplary embodiments, only those inner blobs that truly represent the background image data are removed to the grayscale background plane. Operation then continues to step S9500, where operation returns to step S10000.

Figure 35:
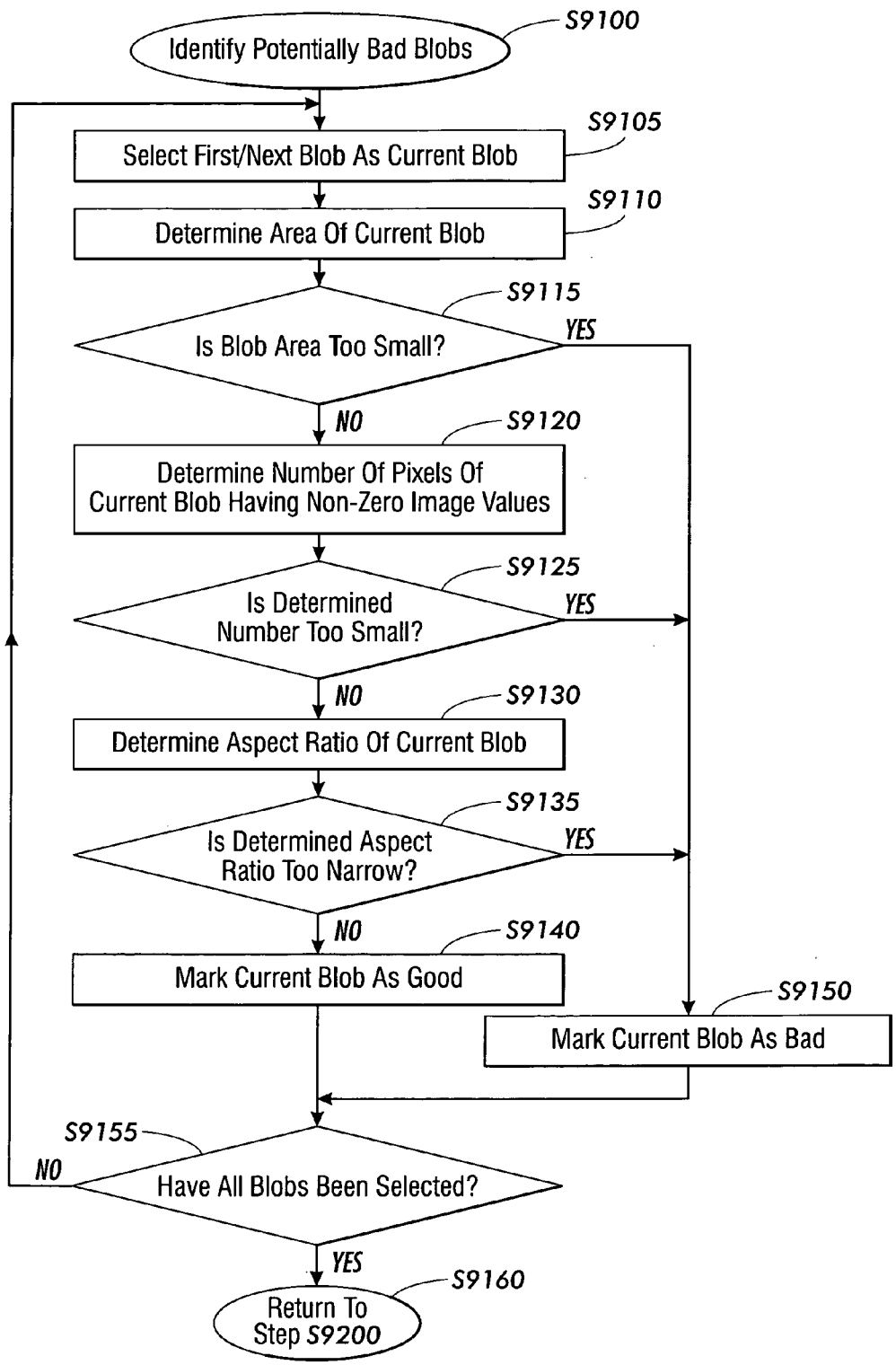
FIG. 35 is a flowchart outlining in greater detail one exemplary embodiment of a method for identifying potentially bad blobs according to this invention.

FIG. 35 is a flowchart outlining in greater detail one exemplary embodiment of a method for identifying potentially bad blobs of step S9100. As shown in FIG. 35, operation of the method begins in step S9100 and continues to step S9105, where a first or next blob of the determined plurality of blobs is selected as a current blob. Then, in step S9110, the two-dimensional area of the current blob is determined. Next, in step S9115, a determination is made whether the determined area of the current blob is too small. If so, operation jumps to step S9150. Otherwise, operation continues to step S9120.

In step S9120, a number of "on" pixels, i.e., the number of pixels having non-zero image values, of the current blob is determined. Next, in step S9125, a determination is made whether the determined number of "on" pixels is too small. If so, operation again jumps to step S9145. Otherwise, operation continues to step S9130.

In step S9130, the aspect ratio of the current blob is determined. The aspect ratio is the ratio of the height to the width of the current blob. It should be appreciated that the aspect ratio is normalized so that it does not matter whether the blob is horizontally or vertically oriented. Then, in step S9135, a determination is made whether the aspect ratio of the current blob is too narrow. If so, operation again jumps to step S9145. Otherwise, because the blob has passed all of the tests, the blob is good and operation continues to step S9140, where the current blob is marked as good. Operation then jumps to step S9150.

In contrast, in step S9145, because the current blob has failed at least one of the tests, the current blob is marked as bad. Then, in step S9150, a determination is made whether all of the determined blobs have been selected. If not, operation returns to step S9105. Otherwise, operation continues to step S9155, where operation returns to step S9200.

Figure 36:
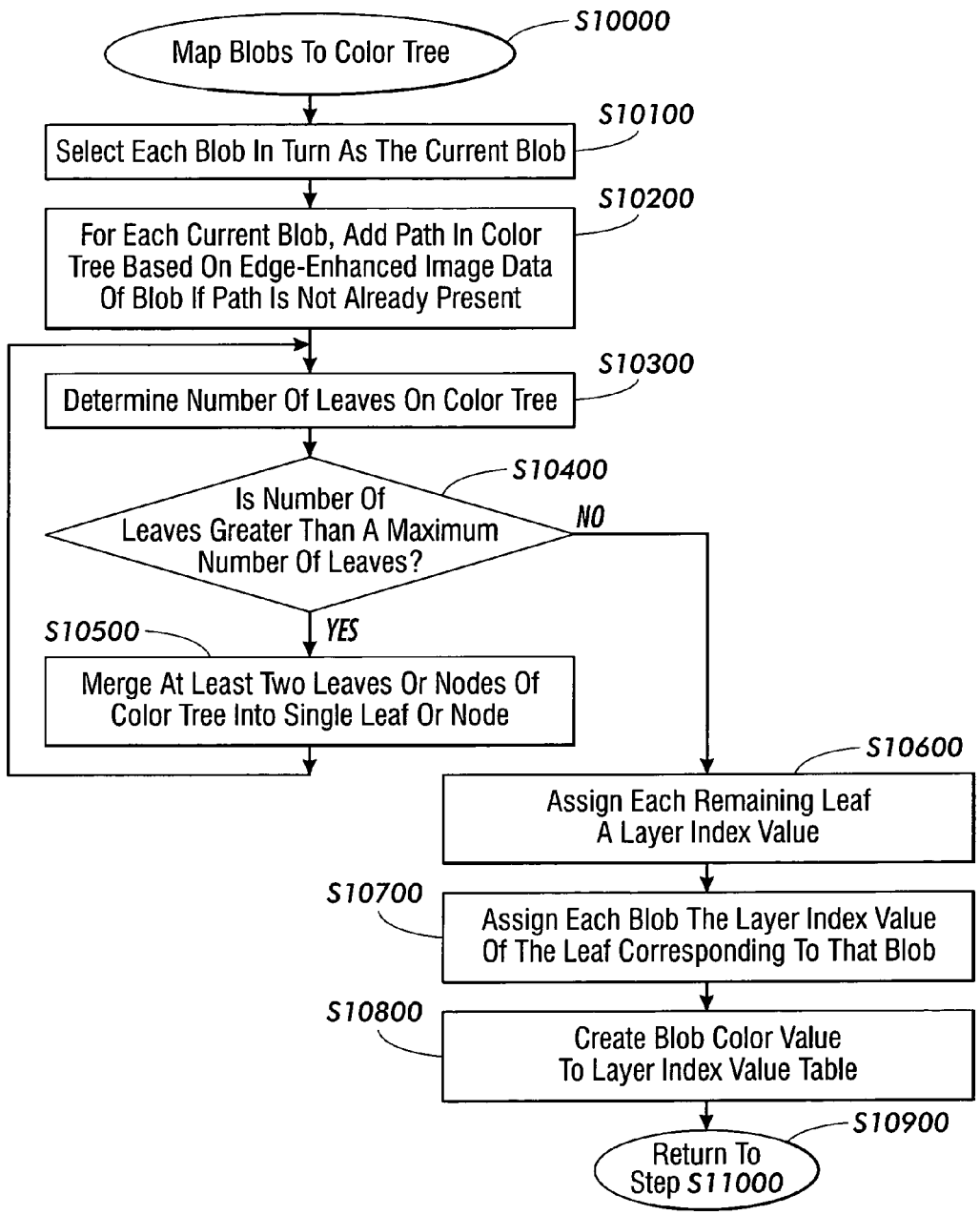
FIG. 36 is a flowchart outlining in greater detail one exemplary embodiment of a method for creating a color tree according to this invention.

FIG. 36 is a flowchart outlining in greater detail one exemplary embodiment of a method for creating a color tree of step S10000. As shown in FIG. 36, operation begins in step S10000 and continues to step S10100, where each blob remaining after the bad blobs are removed from the set of determined blobs is selected in turn as the current blob. Then, in step S10200, for each blob, as it is selected in turn, a path is added in a color tree based on the edge-enhanced image data of the current blob, so long as the path corresponding to that edge-enhanced image data is not already present in the color tree. Next, in step S10300, after all of the paths for all of the blobs remaining after step S9000 are analyzed, a convenient number of leaves on the color tree are determined. Operation then continues to step S10400.

In step S10400, a determination is made whether the number of leaves on the color tree is greater than a maximum allowable number of leaves. If so, operation continues to step S10500. Otherwise, operation jumps to step S10600. In step S10500, at least two trees of a single node are merged together or a node having no leaves is merged into its parent node, or the like is performed, to reduce the number of leaves in the color tree. Operation then returns to step S10300 to determine the remaining number of leaves on the color tree.

Once the number of leaves is at most equal to the maximum number of leaves, operation continues to step S110600, where each remaining leaf in the color tree is assigned a layer index value. Next, in step S10700, each blob is assigned the layer index of the leaf to which that blob corresponds. Next, in step S10800, a blob color value to layer index value table is created. Operation then continues to step S10900, where operation returns to step S11000.

Figure 37:
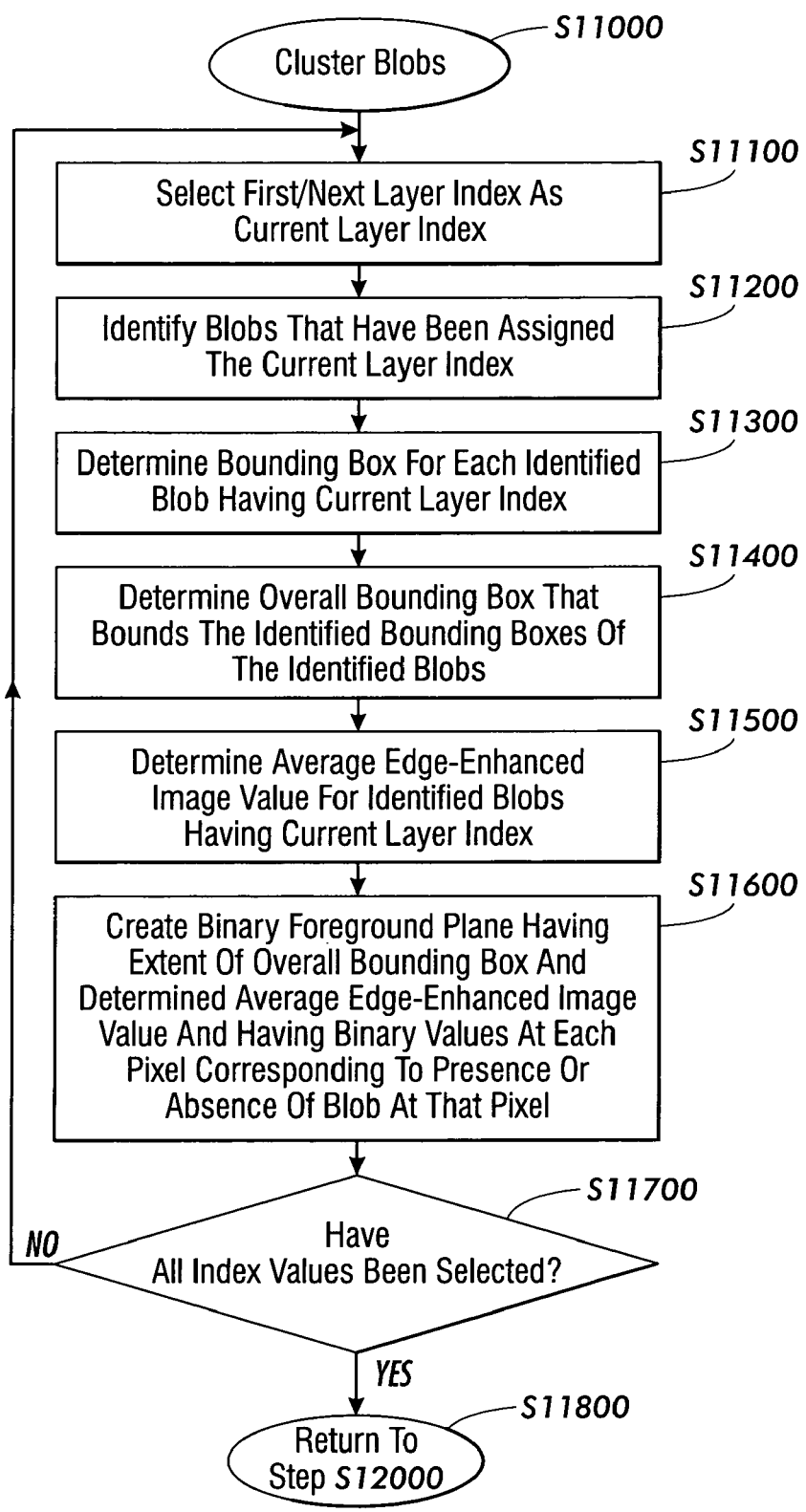
FIG. 37 is a flowchart outlining in greater detail one exemplary embodiment of a method for clustering the blobs according to this invention.

FIG. 37 is a flowchart outlining in greater detail one exemplary embodiment of a method for clustering the blobs of step S11000. As shown in FIG. 37, beginning in step S11000, operation continues to step S11100, where the first or next layer index value is selected as the current layer index value. Then, in step S11200, blobs that have been assigned the current index layer are identified. Next, in step S11300, a bounding box is determined for each identified blob having the current layer index. Operation then continues to step S11400.

In step S11400, an overall bounding box that bounds all of the determined bounding boxes of the identified blobs is itself determined. Next, in step S11500, an average image value is determined for the identified blobs having the current layer index. Then, in step S11600, for the current layer index, a binary foreground plane is created, with this binary foreground plane having an extent corresponding to the overall bounding box and having a color corresponding to the determined average image value. Furthermore, the binary foreground plane has a binary value at each pixel that corresponds to the presence or absence of one of the identified blobs at that pixel. Operation then continues to step S11700.

In step S11700, a determination is made whether all of the layer index values have been selected. If so, operation returns to step S11100. Otherwise, operation continues to step S11800, where operation returns to step S12000.

While the invention has been described in conjunction with various exemplary embodiments, these embodiments should be viewed as illustrative, not limiting. Various modifications, substitutes, or the like are possible within the spirit and scope of the invention.

What is claimed is:

1. An apparatus, comprising:
   a first comparator that compares an edge continuity value of a current pixel of each line of pixels to edge continuity values of pixels within a first neighborhood of the current pixel, wherein the first neighborhood comprises at least 3 adjacent pixels to generate compare results;
   a blob identifier; and
   an assigner that assigns a blob identification of a blob to the current pixel based on the compare results to associate the current pixel with the blob;
   wherein the blob identifier includes a top-to-bottom module for analyzing each pixel in turn in raster scan order;
   a gradient parameter generator that generates a gradient parameter value for the current pixel based on luminance and chroma values of a second neighborhood of the current pixel;
   a quantizer that quantizes the gradient parameter value to set an edge continuity value of the pixel;

the gradient parameter generator is a grayscale selector generator that includes a second comparator that compares luminance values of pixels within the second neighborhood of the current pixel to output a maximum luminance value and a minimum luminance value of the second neighborhood, the second comparator further outputs first chroma values and second chroma values that correspond to a location of the respective maximum luminance and minimum luminance values, wherein a dependent maximum value is a combination of the first chroma values and the maximum luminance value, and a dependent minimum value is a combination of the second chroma values and the minimum luminance value;

the grayscale selector generator generating a grayscale selector value based on the dependent maximum value and the dependent minimum value; and the quantizer quantizing the grayscale selector value by comparing the grayscale selector value with one or more threshold values and assigning the grayscale selector value to a finite set of values.

2. The apparatus of claim 1, wherein the first neighborhood of the current pixel includes pixels within a line of pixels including the current pixel and a top line of pixels previous to the line of pixels including the current pixel, the top line including pixels having positions that are aligned to positions of pixels of the line of pixels including the current pixel, a pixel in the top line having a corresponding position of the current pixel being a top-adjacent pixel, a pixel to a left side of the top adjacent pixel being a top-left adjacent pixel, and a pixel to a left side of the current pixel in the line of pixels being a left-adjacent pixel.

3. The apparatus of claim 1, wherein the second neighborhood of the current pixel includes a window of pixels surrounding the current pixel.

4. The apparatus of claim 2, wherein the first comparator compares the edge continuity value of the current pixel with the edge continuity value of a top-adjacent pixel and/or a left-adjacent pixel and/or a top-left adjacent pixel; and the assigner assigns the current pixel a blob identification associated with the top-adjacent pixel or a blob identification associated with the top-left adjacent pixel or a blob identification associated with the left-adjacent pixel or a new blob identification or to a background plane based on the comparison of the edge continuity values.

5. The apparatus of claim 4, wherein the assigner uses an action table to determine whether to assign the current pixel the blob identification associated with the top-adjacent pixel or the blob identification associated with the top-left adjacent pixel or the blob identification associated with the left-adjacent pixel or the new blob identification or to the background plane, based on a pattern of the edge continuation values of the top-adjacent pixel, the top left adjacent pixel and the left adjacent pixel.

6. The apparatus of claim 1, wherein the apparatus outputs a table that contains a list of blob identifications associated with pixels of the line of pixels including the current pixel.

7. A xerographic marking device incorporating the apparatus of claim 1.

8. A marking device incorporating the apparatus of claim 1.

9. A digital photocopier incorporating the apparatus of claim 1.

10. A method, comprising:

analyzing each pixel in turn in raster scan order;

comparing an edge continuity value of a current pixel of each line of pixels to edge continuity values of pixels within a first neighborhood of the current pixel wherein the first neighborhood comprises at least 3 adjacent pixels, to generate compare results;

identifying a blob; and assigning the identification of the blob to the current pixel based on the compare results to associate the current pixel with the blob;

generating a gradient parameter value for the current pixel based on luminance and chroma values of a second neighborhood of the current pixel; and quantizing the gradient parameter value to set an edge continuity value of the current pixel;

comparing luminance values of pixels within the second neighborhood of the current pixel to output a maximum luminance value and a minimum luminance value of the second neighborhood;

further outputting first chroma values and second chroma values that correspond to a location of the respective maximum luminance value and the minimum luminance value, wherein a dependent maximum value is a combination of the first chroma values and the maximum luminance value and a dependent minimum value is a combination of the second chroma values and the minimum luminance value;

generating a grayscale selector value based on the dependent maximum value and the dependent minimum value; and quantizing the grayscale selector value by comparing the grayscale selector value with one or more threshold values and assigning the grayscale selector value to one of a finite set of values.

11. The method of claim 10, wherein the first neighborhood of the current pixel includes pixels within a line of pixels including the current pixel and a top line of pixels previous to the line of the pixels including the current pixel, the top line including pixels having positions that are aligned to positions of pixels of the line of pixels including the current pixel, a pixel in the top line having a corresponding position of the current pixel being a top-adjacent pixel, a pixel to a left side of the top adjacent pixel being a top-left adjacent pixel, and a pixel to a left side of the current pixel in the line of pixels being a left-adjacent pixel, the method further comprising:

comparing the edge continuity value of the current pixel with the edge continuity value of a top-adjacent pixel and/or a left-adjacent pixel and/or a top-left adjacent pixel;

assigning the current pixel to a blob identification associated with the top-adjacent pixel or to a blob identification associated with the top-left adjacent pixel or a blob identification associated with the left-adjacent pixel or a new blob identification or to a background plane based on the comparison of the edge continuity values.

12. The method of claim 11, further comprising:

using an action table to determine whether to assign the current pixel the blob identification associated with the top-adjacent pixel or the blob identification associated with the top-left adjacent pixel or the blob identification associated with the left-adjacent pixel or the new blob identification or to the background plane based on a pattern of the edge continuation values of the top-adjacent pixel, the top-left adjacent pixel and the left-adjacent pixel.

13. The method of claim 10, further comprising:
outputting a table that contains a list of blob identifications associated with pixels of the line of pixels including the current pixel.

14. A blob identifier, comprising:
a top-to-bottom module for analyzing each pixel in turn in raster scan order
means for comparing an edge continuity value of a current pixel of each line of pixels to edge continuity values of pixels within a first neighborhood of the current pixel comprising at least three adjacent pixels to generate compare results,
wherein the first neighborhood of the current pixel includes pixels within a line of pixels including the current pixel and a top line of pixels previous to the line of the current pixel, the top line including pixels having positions that are aligned to positions of pixels of the line of pixels including the current pixel, a pixel in the top line having a corresponding position of the current pixel being a top-adjacent pixel, a pixel to a left side of the top adjacent pixel being a top-left adjacent pixel, and a pixel to a left side of the current pixel in the line of pixels being a left-adjacent pixel; and
means for assigning a blob identification of a blob to the current pixel based on the compare results to associate the current pixel with the blob;
means for generating a gradient parameter value for the current pixel based on luminance and chroma values of a second neighborhood of the current pixel; and
means for quantizing the gradient parameter value to set an edge continuity value of the current pixel;
means for comparing luminance values of pixels within the second neighborhood of the current pixel to output a maximum luminance value and a minimum luminance value of the second neighborhood;
means for further outputting first chroma values and second chroma values that correspond to a location of the respective maximum luminance value and the minimum luminance value, wherein a dependent maximum value is a combination of the first chroma values and the maximum luminance value and a dependent minimum value is a combination of the second chroma values and the minimum luminance value;
means for generating a grayscale selector value based on the dependent maximum value and the dependent minimum value; and
means for quantizing the grayscale selector value by comparing the grayscale selector value with one or more threshold values and assigning the grayscale selector value to one of a finite set of values.

15. The blob identifier of claim 14, wherein the means for assigning further comprises:
table means for determining whether to assign the current pixel to the blob identification associated with the top-adjacent pixel or the blob identification associated with the top-left adjacent pixel or the blob identification associated with the left-adjacent pixel or the new blob identification or to a background plane based on the pattern of the edge continuation values of the top-adjacent pixel, the top-left adjacent pixel and the left-adjacent pixel.

16. A computer readable storage medium storing a set of program instruction executable on a data processing device, the set of program instructions comprising:
instructions for analyzing each pixel in turn in raster scan order to identify a blob;
instructions for comparing an edge continuity value of a current pixel of each line of pixels to edge continuity values of pixels within a first neighborhood of the current pixel, wherein the first neighborhood comprises at least 3 adjacent pixels, to generate compare results; and
instructions for assigning the blob identification of the blob to the current pixel based on the compare results to associate the current pixel with the blob;
instructions for generating a gradient parameter value for the current pixel based on luminance and chroma values of a second neighborhood of the current pixel; and
instructions for quantizing the gradient parameter value to set an edge continuity value of the current pixel;
instructions for comparing luminance values of pixels within the second neighborhood of the current pixel to output a maximum luminance value and a minimum luminance value of the second neighborhood;
instructions for further outputting first chroma values and second chroma values that correspond to a location of the respective maximum luminance value and the minimum luminance value, wherein a dependent maximum value is a combination of the first chroma values and the maximum luminance value and a dependent minimum value is a combination of the second chroma values and the minimum luminance value;
instructions for generating a grayscale selector value based on the dependent maximum value and the dependent minimum value; and
instructions for quantizing the grayscale selector value by comparing the grayscale selector value with one or more threshold values and assigning the grayscale selector value to one of a finite set of values.

* * * * *